United States Patent
Gamei et al.

(10) Patent No.: US 10,205,941 B2
(45) Date of Patent: *Feb. 12, 2019

(54) MODE-DEPENDENT COEFFICIENT SCANNING AND DIRECTIONAL TRANSFORMS FOR DIFFERENT COLOUR SAMPLING FORMATS

(71) Applicant: SONY CORPORATION, Tokyo (JP)

(72) Inventors: James Alexander Gamei, Surrey (GB); Nicholas Ian Saunders, Basingstoke (GB); Karl James Sharman, Newbury (GB); Paul James Silcock, Swindon (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,059

(22) Filed: Jun. 14, 2017

(65) Prior Publication Data

US 2017/0339402 A1    Nov. 23, 2017

Related U.S. Application Data

(63) Continuation of application No. 14/396,979, filed as application No. PCT/GB2013/051071 on Apr. 26, 2013, now Pat. No. 9,686,547.

(30) Foreign Application Priority Data

Apr. 26, 2012 (GB) .................................. 1207459.7
Jun. 29, 2012 (GB) .................................. 1211623.2
(Continued)

(51) Int. Cl.
*H04N 19/103* (2014.01)
*H04N 19/176* (2014.01)
(Continued)

(52) U.S. Cl.
CPC ........... *H04N 19/103* (2014.11); *H04N 19/11* (2014.11); *H04N 19/117* (2014.11);
(Continued)

(58) Field of Classification Search
CPC combination set(s) only.
See application file for complete search history.

(56) References Cited

U.S. PATENT DOCUMENTS 9,049,444 B2 *   6/2015   Zheng .................. H04N 19/176
2005/0053141 A1   3/2005   Holcomb et al.
(Continued)

FOREIGN PATENT DOCUMENTS

CA    2 383 036 A1    12/2005
EP    2 608 544 A1    6/2013
(Continued)

OTHER PUBLICATIONS

Combined Chinese Office Action and Search Report dated Oct. 18, 2017 in Patent Application No. 2013800224218 (submitting English language translation only).
(Continued)

*Primary Examiner* — Janese Duley
(74) *Attorney, Agent, or Firm* — Oblon, McClelland, Maier & Neustadt, L.L.P.

(57) ABSTRACT

A method of coding 4:2:2 or 4:4:4 video data comprises predicting luminance and/or chrominance samples of an image from other respective reference samples derived from the same image according to a prediction mode associated with a sample to be predicted, the prediction mode being selected for each of a plurality of blocks of samples, from a set of two or more candidate prediction modes; detecting differences between the samples and the respective predicted samples; selecting a frequency-separation transform from two or more candidate frequency separation transforms according to the prediction mode associated with a current block of samples using a mapping between transform and prediction mode, the mapping between different, as between chrominance and luminance samples, for at least the 4:4:4 format; and encoding the detected differences by frequency-
(Continued)

separating the differences, using the selected frequency-separation transform.

19 Claims, 27 Drawing Sheets

(30) Foreign Application Priority Data

Jun. 29, 2012 (GB) .................................. 1211628.1
Jun. 29, 2012 (GB) .................................. 1211629.9

(51) Int. Cl.

| | |
|---|---|
| H04N 19/119 | (2014.01) |
| H04N 19/129 | (2014.01) |
| H04N 19/593 | (2014.01) |
| H04N 19/11 | (2014.01) |
| H04N 19/117 | (2014.01) |
| H04N 19/12 | (2014.01) |
| H04N 19/124 | (2014.01) |
| H04N 19/136 | (2014.01) |
| H04N 19/186 | (2014.01) |
| H04N 19/157 | (2014.01) |
| H04N 19/82 | (2014.01) |
| H04N 19/523 | (2014.01) |
| H04N 19/60 | (2014.01) |
| H04N 19/50 | (2014.01) |
| H04N 19/80 | (2014.01) |
| H04N 19/122 | (2014.01) |
| H04N 19/52 | (2014.01) |
| H04N 19/44 | (2014.01) |
| H04N 19/13 | (2014.01) |

(52) U.S. Cl.
CPC .......... *H04N 19/119* (2014.11); *H04N 19/12* (2014.11); *H04N 19/122* (2014.11); *H04N 19/124* (2014.11); *H04N 19/129* (2014.11); *H04N 19/136* (2014.11); *H04N 19/157* (2014.11); *H04N 19/176* (2014.11); *H04N 19/186* (2014.11); *H04N 19/44* (2014.11); *H04N 19/50* (2014.11); *H04N 19/52* (2014.11); *H04N 19/523* (2014.11); *H04N 19/593* (2014.11); *H04N 19/60* (2014.11); *H04N 19/649* (2014.11); *H04N 19/80* (2014.11); *H04N 19/82* (2014.11); *H04N 19/13* (2014.11)

(56) References Cited

U.S. PATENT DOCUMENTS

| | | |
|---|---|---|
| 2005/0271288 A1 | 12/2005 | Suzuki et al. |
| 2008/0170615 A1* | 7/2008 | Sekiguchi .............. H04N 19/70 375/240.14 |
| 2008/0175490 A1 | 7/2008 | Cho |
| 2009/0003447 A1* | 1/2009 | Christoffersen ....... H04N 19/61 375/240.16 |
| 2011/0090955 A1 | 4/2011 | Liu et al. |
| 2011/0249726 A1 | 10/2011 | Nguyen et al. |
| 2012/0008675 A1 | 1/2012 | Karczewicz et al. |
| 2012/0008682 A1 | 1/2012 | Karczewicz et al. |
| 2012/0263238 A1 | 10/2012 | Miyoshi et al. |
| 2013/0121423 A1 | 5/2013 | Gamei et al. |
| 2013/0128958 A1 | 5/2013 | Gamei et al. |
| 2013/0266068 A1 | 10/2013 | Seo et al. |
| 2014/0286417 A1 | 9/2014 | Gamei et al. |
| 2014/0307807 A1 | 10/2014 | Gamei et al. |

FOREIGN PATENT DOCUMENTS

| | | |
|---|---|---|
| JP | 2005-39743 A | 2/2005 |
| JP | 2008-172599 A | 7/2008 |
| JP | 2009-513056 A | 3/2009 |
| JP | 2013-534794 A | 9/2013 |
| WO | WO 91/20159 A1 | 12/1991 |
| WO | WO 2007/046644 A1 | 4/2007 |
| WO | WO 2011/080806 A1 | 7/2011 |
| WO | WO 2011/137814 A1 | 11/2011 |

OTHER PUBLICATIONS

English translation of Japanese Search Report dated Oct. 15, 2015 in Patent Application No. 2015-507602.
English translation of Office Action issued Nov. 4, 2015 in Japanese Patent Application No. 2015-507602.
Yunfei Zheng, et al., "CE11: Mode Dependent Coefficient Scanning" Joint Collaborative Team on Video Coding (JCT-VC) of ITU-T SG16 WP3 and ISO/IEC JTC1/SC29/WG11 JCTVC-D393, Jan. 2011, 7 pages.
Thomas Wiegand, et al., "WDl: Working Draft 1 of High-Efficiency Video Coding" Joint Collaborative Team on Video Coding (JCT-VC) of ITU-T SG16 WP3 and ISO/IEC JTC1/SC29/WG11 JCTVC-C403, Oct. 2010, 11 pages.
International Search Report dated Sep. 30, 2013, in PCT/GB13/051071 filed Apr. 26, 2013.
United Kingdom Search Report dated Dec. 12, 2012, in Great Britain Patent Application No. 1211628.1 filed Jun. 29, 2012.
Zheng, et al., "CE11: Mode Dependent Coefficient Scanning", Joint Collaborative Team on Video Coding (JCT-VC) of ITU-T SG16 WP3 and ISO/IEC JTC1/SC29/WG11, 4th Meeting, Jan. 20-28, 2011, XP030008432, 4 pages.
Silcock, et al., "Extension of HM7 to Support Additional Chroma Formats", Joint Collaborative Team on Video Coding (JCT-VC) of ITU-T SG16 WP3 and ISO/IEC JTC1/SC 29/WG11, 10th Meeting, Jul. 11-20, 2012, XP030112553, 16 pages.
Hsu, et al., "Non-CE11: Extending MDCS to 16×16 and 32×32 TUs", Joint Collaborative Team on Video Coding (JCT-VC) of ITU-T SG16 WP3 and ISO/IEC JTC1/SC29/WG11, 7th Meeting, Nov. 21-30, 2011, XP030050348, 7 pages.
Zhao, et al., "CE11: Extended Mode Dependent Coefficient Scanning", Joint Collaborative Team on Video Coding (JCT-VC) of ITU-T SG16 WP3 and ISO/IEC JTC1/SC29/WG11, 7th Meeting, Nov. 21-30, 2011, XP030050409, 8 pages.
Yang, et al., "CE7: Simplified MDDT scheme using symmetry-based scanning orders", Joint Collaborative Team on Video Coding (JCT-VC) of ITU-T SG16 WP3 and ISO/IEC JTC1/SC29/WG11, 4th Meeting, Jan. 20-28, 2011, XP030047638, 5 pages.
Sullivan, et al., "Overview of the High Efficiency Video Coding (HEVC) Standard", Pre-Publication Draft, to appear in IEEE Trans. on Circuits and Systems for Video Technology, Dec. 2012, 19 pages.
AHG 14: Color Format extension for HEVC, JCTVC-Ixxxx, Sugimoto et al, Apr. 25, 2012.
Australian Office Action issued Jun. 24, 2015 in Patent Application No. 2013254443.
Office Action dated Jan. 21, 2016 in Canadian Patent Application No. 2,870,596.
Japanese Office Action dated Jun. 21, 2016 in Patent Application No. 2015-507602 (English translation only).
Benjamin Bross et al., "WD4: Working Draft 4 of High-Efficiency Video Coding" Joint Collaborative Team on Video Coding (JCT-VC) of ITU-T SG16 WP3 and ISO/IEC JTC1/SC29/WG11, JCTVC-F803_d6, Nov. 2011, pp. 18-20, 43-45, 76, 127-128 and cover pages.
Office Action dated Jun. 15, 2016 in Australian Patent Application No. 2013254443.
Yung-Lyul Lee, et al., "Adaptive scanning for H.264/AVC intra coding", Etri Journal, vol. 28, No. 5, Oct. 2006, pp. 668-671.

\* cited by examiner

| CU Size | PU options for given CU size<br>All TUs within a PU have the same prediction modes | TU options, given PU and CU size<br>TUs can be recursively split down to 2 levels<br>n=2; N=4 for 4:2:0    n=4; N=8 for 4:2:20 | | |
|---|---|---|---|---|
| | | LEVEL 0 | LEVEL 1 | LEVEL 2 |
| 64x64 Y | 64x64 Y | | 32x32Y (4x) | 16² (4x) Y |
| 1100 | 64x32 Y / 64x32 Y (ONLY FOR INTER); 64x16 Y / 64x48 Y, 64x48 Y / 64x16 Y (ONLY FOR INTER AND AMP ENABLED) | NSQT enabled: (use 64x64 case when disabled) | 32x32Y (4x) | Each block is 32x8 Y |
| | 32x64Y/32x64Y (ONLY FOR INTER); 16x64Y/48x64Y, 48x64Y/16x64Y (ONLY FOR INTER AND AMP ENABLED) | NSQT enabled: (use 64x64 case when disabled) | 16x16Y (4x) | Each block is 8x32 Y |
| 32x32 Y | 32x32 Y | 32x32 Y | 16x16Y (4x) | 8² (4x) Y |
| 1110 | 32x16 Y / 32x16 Y (ONLY FOR INTER); 32x8 Y / 32x24 Y, 32x24 Y / 32x8 Y (ONLY FOR INTER AND AMP ENABLED) | NSQT Enabled: (use 32x32 case when disabled) | 32x8 Y (4x) | 4:2:0 or 4:2:2: Each block is 16x4 Y + Each block is 4xN Cb+Cr; 4:2:2: Each block is 16x4 Y + Each block is 8x4 Cb+Cr |
| | 16x32Y/16x32Y (ONLY FOR INTER); 8x32Y/24x32Y, 24x32Y/8x32Y (ONLY FOR INTER AND AMP ENABLED) | NSQT enabled: (use 32x32 case when disabled) | 8x32Y (4x) | Each block is 4x16 Y; Each block is 4xN Cb+Cr |

Chroma channel block sizes cover the same area as the corresponding Luma block sizes (unless shown otherwise), but the number of samples depends on the format (4:2:2, 4:2:0)
For 4:4:4, the Chroma channels have the same block structure as the Luma structure shown.
For 4:2:2, the rectangular TUs may be split further into square TUs prior to transform/quantisation.

FIG. 18A

| Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Value | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| Index | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| Value | 26 | 27 | 28 | 29 | 29 | 30 | 31 | 32 | 32 | 33 | 34 | 34 | 35 | 35 | 36 | 36 | 37 | 37 | 37 | 38 | 38 | 38 | 39 | 39 | 39 | 39 |

FIG. 29A (4:2:0)

| Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Value | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| Index | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| Value | 26 | 27 | 28 | 29 | 30 | 31 | 32 | 33 | 33 | 34 | 35 | 36 | 37 | 37 | 38 | 39 | 40 | 40 | 41 | 42 | 42 | 43 | 44 | 44 | 45 | 45 |

FIG. 29B (4:2:2)

| Index | 0 | 1 | 2 | 3 | 4 | 5 | 6 | 7 | 8 |
|---|---|---|---|---|---|---|---|---|---|
| inverseQStep | 26214 | 23302 | 20560 | 18396 | 16384 | 14564 | 12945 | 11523 | 10280 |
| scaledQStep | 40 | 45 | 51 | 57 | 64 | 72 | 81 | 91 | 102 |

FIG. 30

| Index | -3 | -2 | -1 | 0 | 1 | 2 | 3 | 4 | 5 |
|---|---|---|---|---|---|---|---|---|---|
| inverseQStep | 36158 | 32768 | 29127 | 26214 | 23302 | 20560 | 18396 | 16384 | 14564 |
| scaledQStep | 29 | 32 | 36 | 40 | 45 | 51 | 57 | 64 | 72 |

FIG. 31

☐ Current pixel being predicted
▦ Derived reference sample

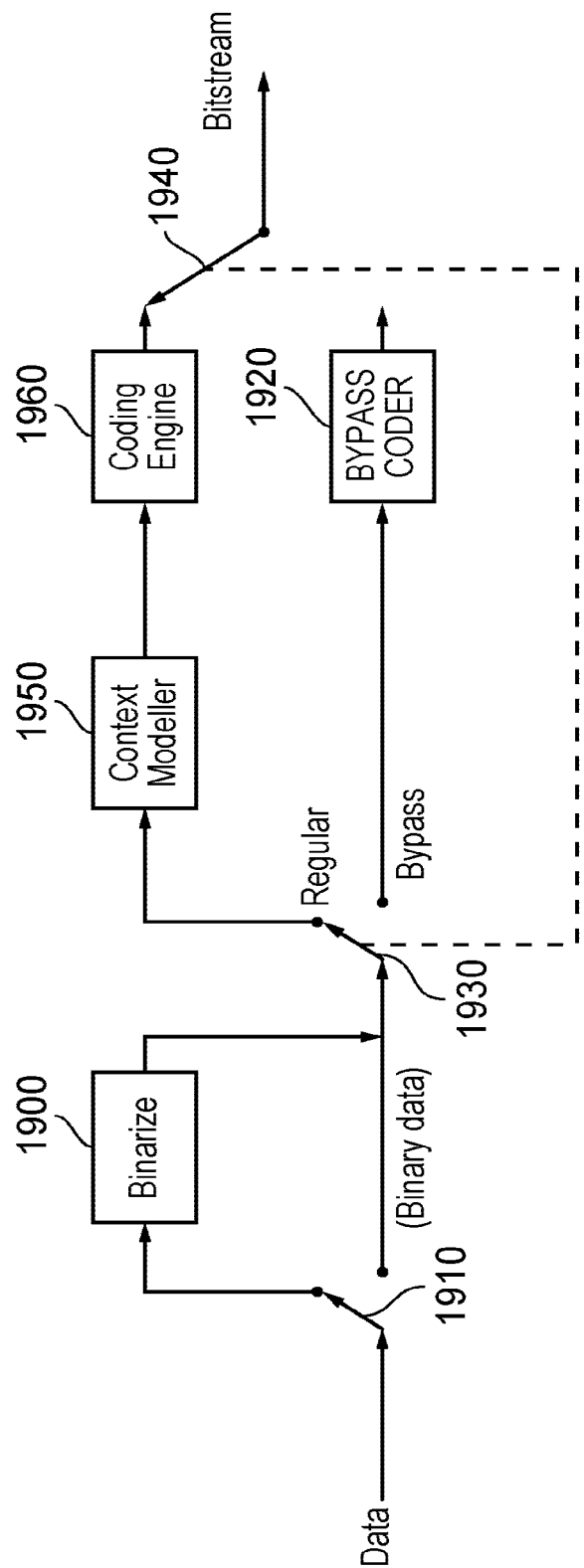

Right group not significant

Below group does not exist, but is assumed to be significant

FIG. 43A

Right group significant

Below group does not exist, but is assumed not to be significant

FIG. 43B

Right group does not exist, but is assumed not to be significant

Below group significant

MODE-DEPENDENT COEFFICIENT SCANNING AND DIRECTIONAL TRANSFORMS FOR DIFFERENT COLOUR SAMPLING FORMATS

CROSS REFERENCE TO RELATED APPLICATIONS

This application is a continuation of U.S. patent application Ser. No. 14/396,979, filed Oct. 24, 2014, which is a 371 national stage of International App. No. PCT/GB2013/051071, filed Apr. 26, 2013, which claims the benefit of the earlier filing date of GB1211628.1 and GB 1207459.7 filed in the United Kingdom Intellectual Property Office on 29 Jun. 2012 and 26 Apr. 2012, respectively, and of GB1211629.9 and GB1211623.2, both filed in the United Kingdom Intellectual Property Office on 29 Jun. 2012, the entire contents of each of which applications are incorporated herein by reference.

BACKGROUND

Field

This disclosure relates to data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

Current video codecs (coder-decoders) such as those used in H.264/MPEG-4 Advanced Video Coding (AVC) achieve data compression primarily by only encoding the differences between successive video frames. These codecs use a regular array of so-called macroblocks, each of which is used as a region of comparison with a corresponding macroblock in a previous video frame, and the image region within the macroblock is then encoded according to the degree of motion found between the corresponding current and previous macroblocks in the video sequence, or between neighbouring macroblocks within a single frame of the video sequence.

High Efficiency Video Coding (HEVC), also known as H.265 or MPEG-H Part 2, is a proposed successor to H.264/MPEG-4 AVC. It is intended for HEVC to improve video quality and double the data compression ratio compared to H.264, and for it to be scalable from 128×96 to 7680×4320 pixels resolution, roughly equivalent to bit rates ranging from 128 kbit/s to 800 Mbit/s.

In HEVC a so-called 4:2:0 block structure is proposed for consumer equipment, in which the amount of data used in each chroma channel is one quarter that in the luma channel. This is because subjectively people are more sensitive to brightness variations than to colour variations, and so it is possible to use greater compression and/or less information in the colour channels without a subjective loss of quality.

HEVC replaces the macroblocks found in existing H.264 and MPEG standards with a more flexible scheme based upon coding units (CUs), which are variable size structures.

Consequently, when encoding the image data in video frames, the CU sizes can be selected responsive to the apparent image complexity or detected motion levels, instead of using uniformly distributed macroblocks. Consequently far greater compression can be achieved in regions with little motion between frames and with little variation within a frame, whilst better image quality can be preserved in areas of high inter-frame motion or image complexity.

Each CU contains one or more variable-block-sized prediction units (PUs) of either intra-picture or inter-picture prediction type, and one or more transform units (TUs) which contain coefficients for spatial block transform and quantisation.

Moreover, PU and TU blocks are provided for each of three channels; luma (Y), being a luminance or brightness channel, and which may be thought of as a greyscale channel, and two colour difference or chrominance (chroma) channels; Cb and Cr. These channels provide the colour for the greyscale image of the luma channel. The terms Y, luminance and luma are used interchangeably in this description, and similarly the terms Cb and Cr, chrominance and chroma, are used interchangeably as appropriate, noting that chrominance or chroma can be used generically for "one or both of Cr and Cb", whereas when a specific chrominance channel is being discussed it will be identified by the term Cb or Cr.

Generally PUs are considered to be channel independent, except that a PU has a luma part and a chroma part. Generally, this means that the samples forming part of the PU for each channel represent the same region of the image, so that there is a fixed relationship between the PUs between the three channels. For example, for 4:2:0 video, an 8×8 PU for Luma always has a corresponding 4×4 PU for chroma, with the chroma parts of the PU representing the same area as the luma part, but containing a smaller number of pixels because of the subsampled nature of the 4:2:0 chroma data compared to the luma data in 4:2:0 video. The two chroma channels share intra-prediction information; and the three channels share inter-prediction information. Similarly, the TU structure also has a fixed relationship between the three channels.

However, for professional broadcast and digital cinema equipment, it is desirable to have less compression (or more information) in the chroma channels, and this may affect how current and proposed HEVC processing operates.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 18a and 18b schematically illustrate possible block sizes;

FIGS. 29a and 29b schematically illustrates quantisation parameter tables for 4:2:0 and 4:2:2 respectively;

FIGS. 30 and 31 schematically illustrate quantisation variation tables;

FIG. 40 schematically illustrates a CABAC encoder;

FIGS. 42A to 45 schematically illustrate context variable allocation according to embodiments of the disclosure.

DESCRIPTION OF THE EMBODIMENTS

Figure 1:
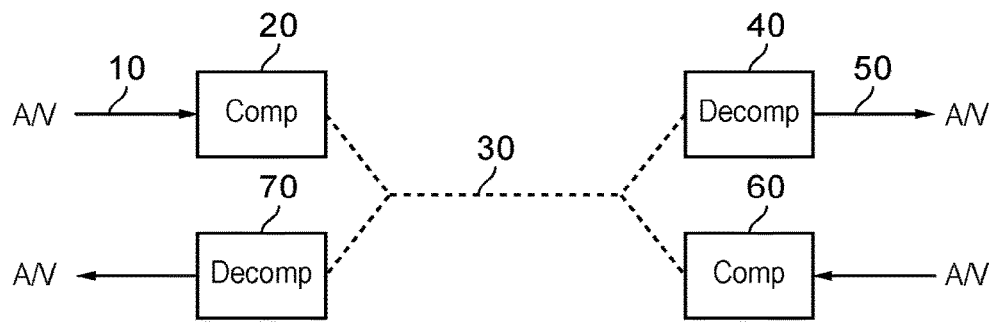
FIG. 1 schematically illustrates an audio/video (A/V) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the disclosure.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present disclosure.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unit-directional, only one of the nodes would require a compression apparatus and the other node would only require a decompression apparatus.

Figure 2:
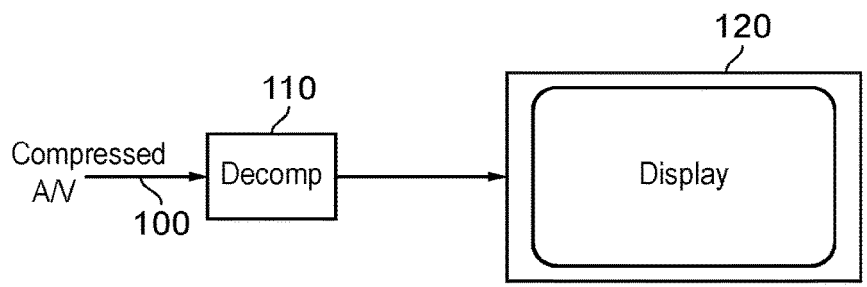
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 may be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
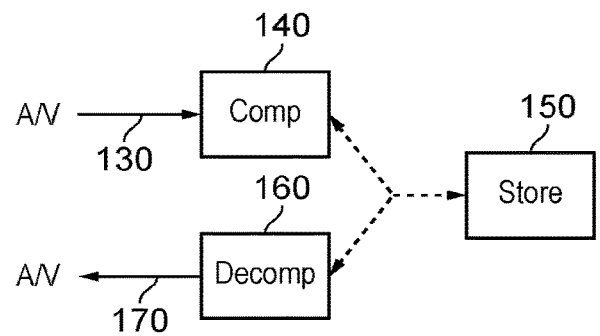
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium storing that signal, are considered as embodiments of the present disclosure.

Figure 4:
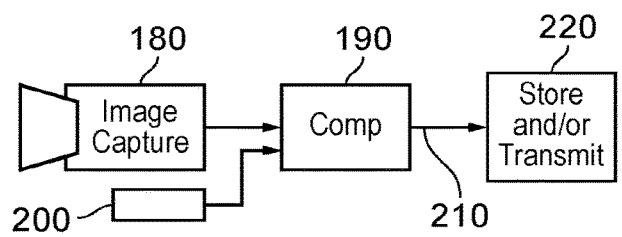
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 5:
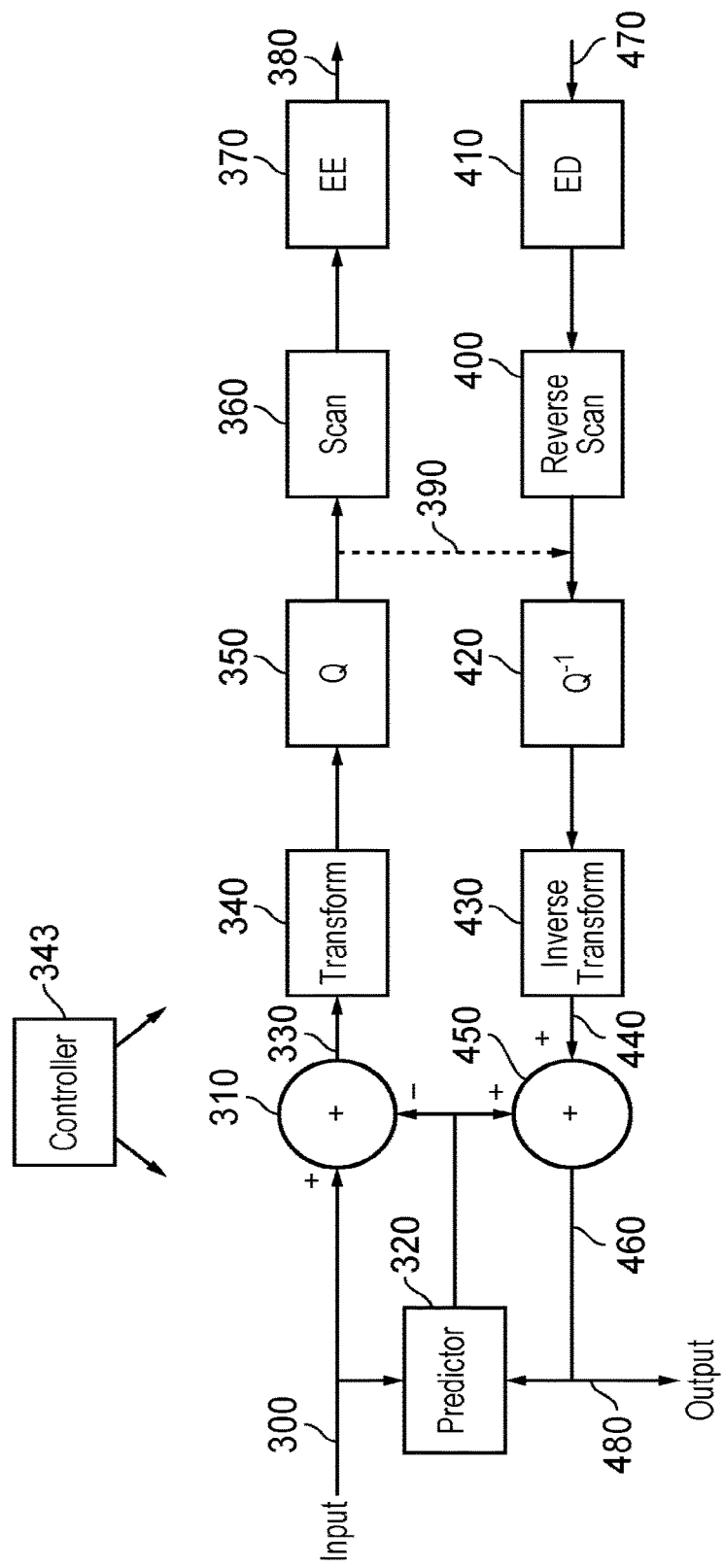
FIG. 5 provides a schematic overview of a video data compression and decompression apparatus.

FIG. 5 provides a schematic overview of a video data compression and decompression apparatus.

A controller 343 controls the overall operation of the apparatus and, in particular when referring to a compression mode, controls the trial encoding processes (to be described below) to select various modes of operation such as CU, PU and TU block sizes.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and predicted images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here. There are however aspects of the techniques used in the present apparatus which will be described in more detail below, in particular relating to the selection of different blocks of data to which the DCT operation is applied. These will be discussed with reference to FIGS. 7-12 below. In some embodiments, a different frequency-separation transform may selectively be used instead of the DCT, under a system known as MDDT (Mode Dependent Directional Transform), which will be described below. For now, it will be assumed that the DCT transform is in use.

The output of the transform unit 340, which is to say, a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" or scan pattern so that (a) all of the coefficients are selected once as part of the scan, and (b) the scan tends to provide the desired reordering. One example scanning order which can tend to give useful results is a so-called up-right diagonal scanning order. In some embodiments, a so called MDCS (Mode Dependent Coefficient Scanning) system may be used, such that the scan pattern may vary from block to block. Such arrangements will be described in more detail below. For now, it is assumed that the up-right diagonal scan is used.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below. Note that the current HEVC documents under consideration at the time of filing no longer include the possibility of a CAVLC coefficient encoder.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output.

Figure 6:
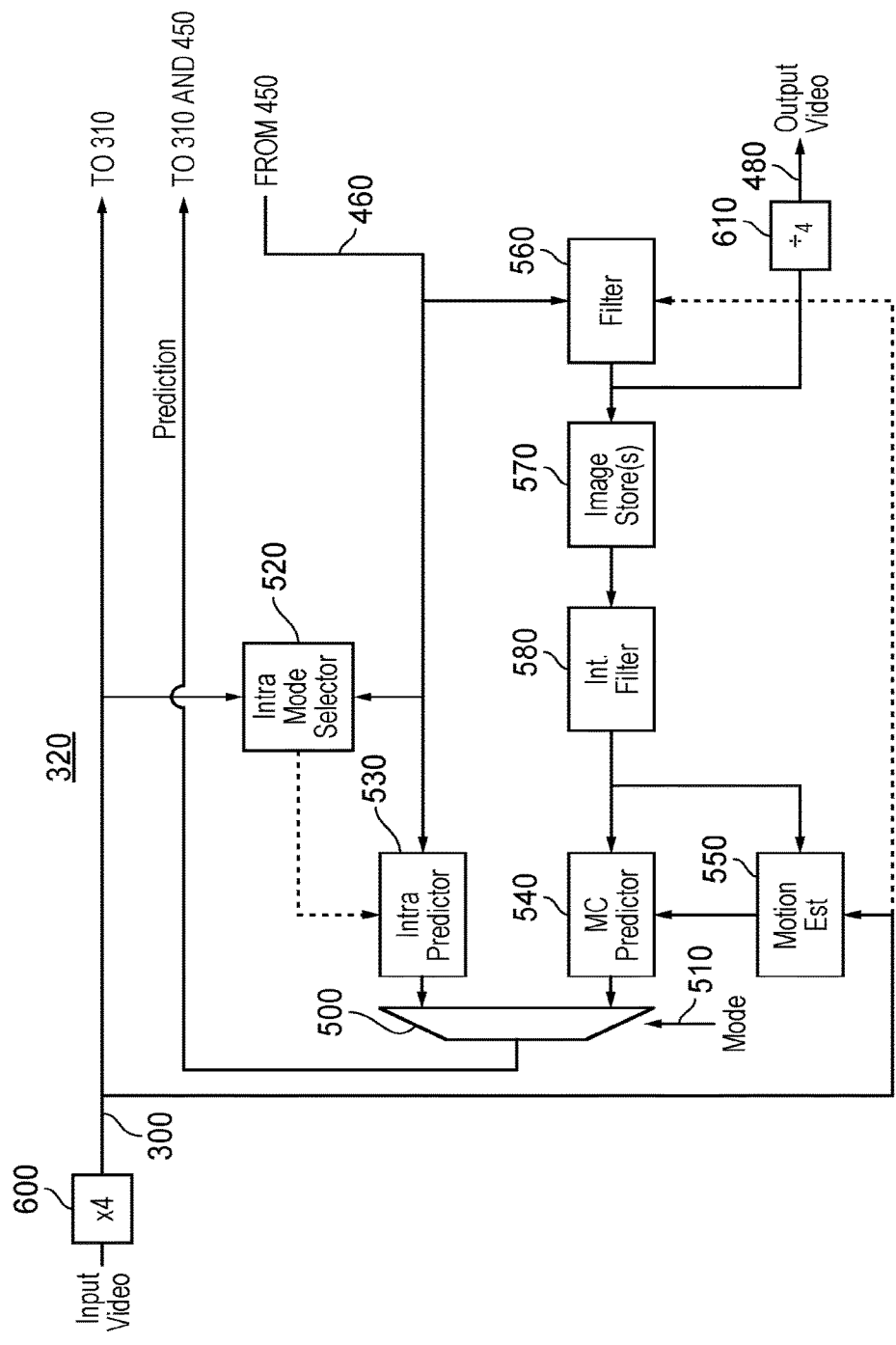
FIG. 6 schematically illustrates the generation of predicted images.
Figure 7:
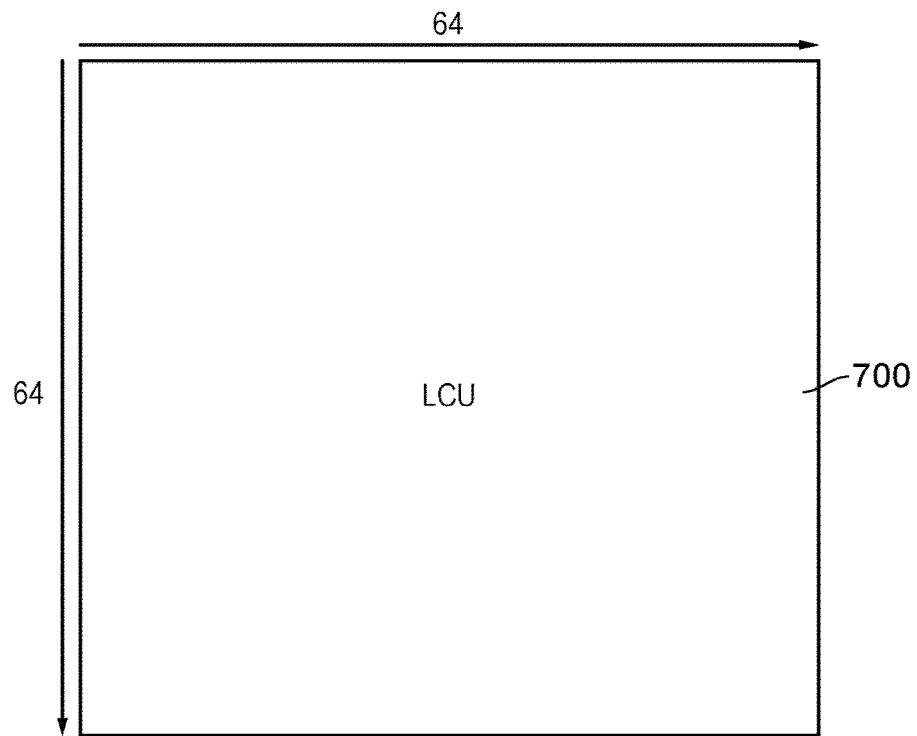
FIG. 7 schematically illustrates a largest coding unit (LCU)

So, the apparatus of FIGS. 5 and 6 can act as a compression apparatus or a decompression apparatus. The functions of the two types of apparatus overlap very heavily. The scan unit 360 and entropy encoder 370 are not used in a decompression mode, and the operation of the predictor 320 (which will be described in detail below) and other units follow mode and parameter information contained in or otherwise associated with the received compressed bitstream rather than generating such information themselves.

FIG. 6 schematically illustrates the generation of predicted images, and in particular the operation of the image predictor 320.

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments of the disclosure the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

The processing applied to the signal 460 will now be described. Firstly, the signal is filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter (described further below) may also be used. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output datastream.

Adaptive filtering represents in-loop filtering for image restoration. An LCU can be filtered by up to 16 filters, with a choice of filter and an ALF on/off status being derived in respect of each CU within the LCU. Currently the control is at the LCU level, not the CU level.

The filtered output from the filter unit 560 in fact forms the output video signal 480 when the apparatus is operating as a compression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

In embodiments of the disclosure, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

The way in which an image is partitioned for compression processing will now be described. At a basic level, an image to be compressed is considered as an array of blocks of samples. For the purposes of the present discussion, the largest such block under consideration is a so-called largest coding unit (LCU) 700, which represents a square array of typically 64×64 samples (the LCU size is configurable by the encoder, up to a maximum size such as defined by the HEVC documents). Here, the discussion relates to luminance samples. Depending on the chrominance mode, such as 4:4:4, 4:2:2, 4:2:0 or 4:4:4:4 (GBR plus key data), there will be differing numbers of corresponding chrominance samples corresponding to the luminance block.

Three basic types of blocks will be described: coding units, prediction units and transform units. In general terms, the recursive subdividing of the LCUs allows an input picture to be partitioned in such a way that both the block sizes and the block coding parameters (such as prediction or residual coding modes) can be set according to the specific characteristics of the image to be encoded.

Figure 8:
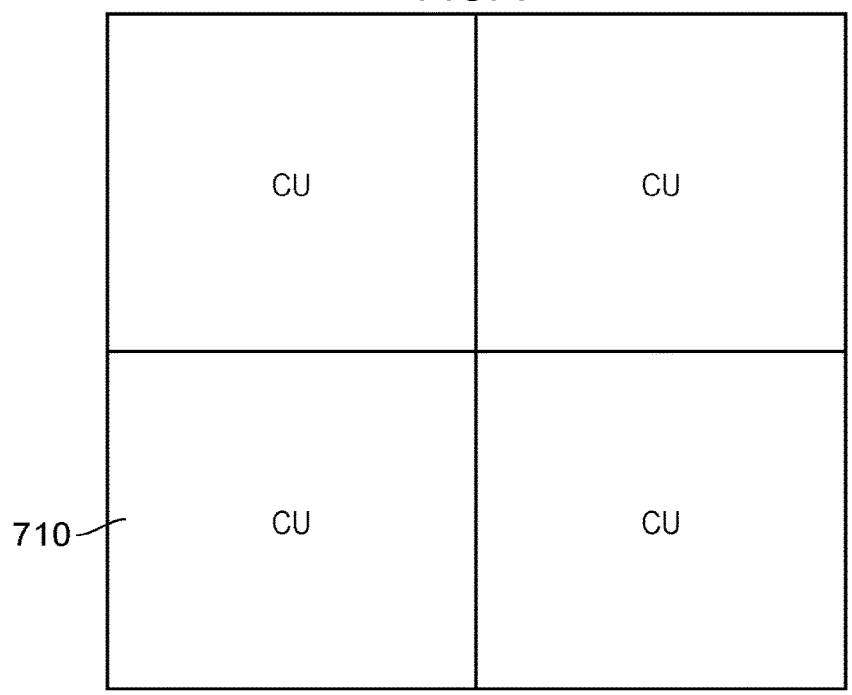
FIG. 8 schematically illustrates a set of four coding units (CU)
Figure 9:
FIGS. 9 and 10 schematically illustrate the coding units of FIG. 8 sub-divided into smaller coding units.
Figure 10:
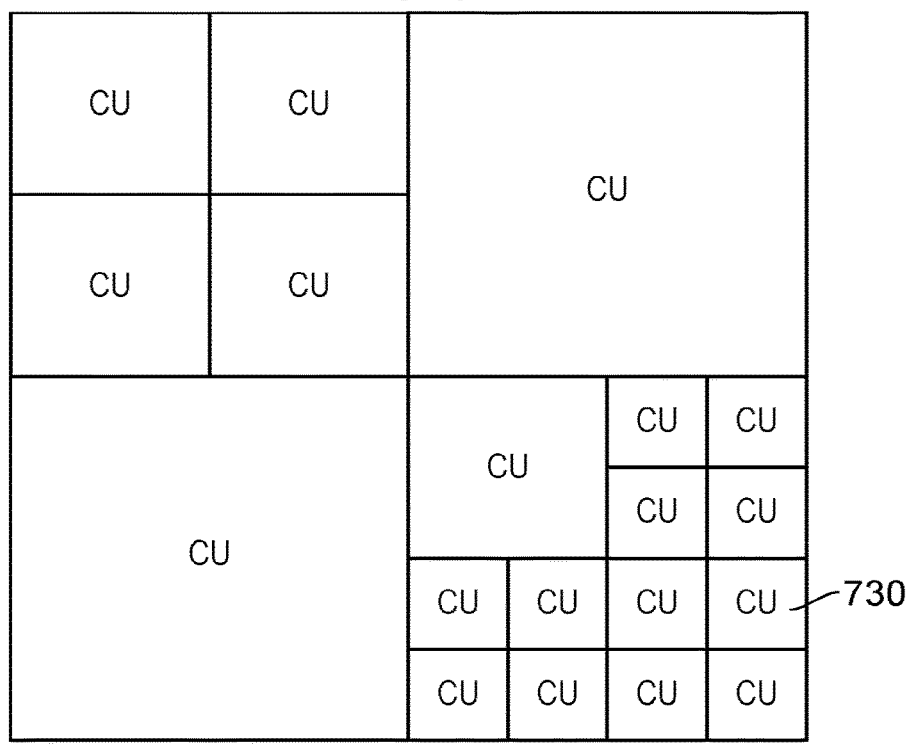

The LCU may be subdivided into so-called coding units (CU). Coding units are always square and have a size between 8×8 samples and the full size of the LCU 700. The coding units can be arranged as a kind of tree structure, so that a first subdivision may take place as shown in FIG. 8, giving coding units 710 of 32×32 samples; subsequent subdivisions may then take place on a selective basis so as to give some coding units 720 of 16×16 samples (FIG. 9) and potentially some coding units 730 of 8×8 samples (FIG. 10). Overall, this process can provide a content-adapting coding tree structure of CU blocks, each of which may be as large as the LCU or as small as 8×8 samples. Encoding of the output video data takes place on the basis of the coding unit structure, which is to say that one LCU is encoded, and then the process moves to the next LCU, and so on.

Figure 11:
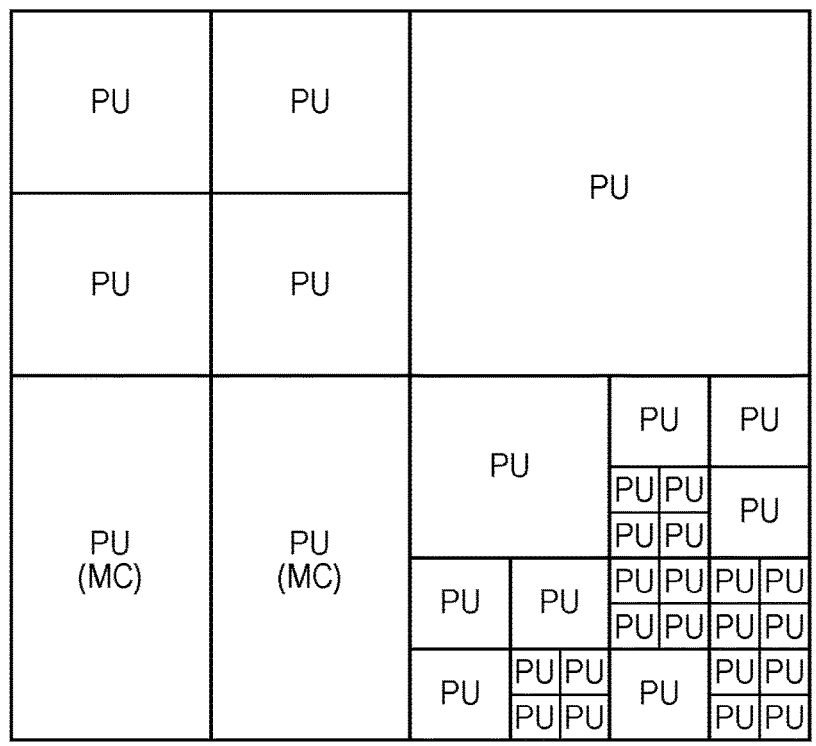
FIG. 11 schematically illustrates an array of prediction units (PU)

FIG. 11 schematically illustrates an array of prediction units (PU). A prediction unit is a basic unit for carrying information relating to the image prediction processes, or in other words the additional data added to the entropy encoded residual image data to form the output video signal from the apparatus of FIG. 5. In general, prediction units are not restricted to being square in shape. They can take other shapes, in particular rectangular shapes forming half of one of the square coding units (for example, 8×8 CUs can have 8×4 or 4×8 PUs). Employing PUs which align to image features is not a compulsory part of the HEVC system, but the general aim would be to allow a good encoder to align the boundary of adjacent prediction units to match (as closely as possible) the boundary of real objects in the picture, so that different prediction parameters can be applied to different real objects. Each coding unit may contain one or more prediction units.

Figure 12:
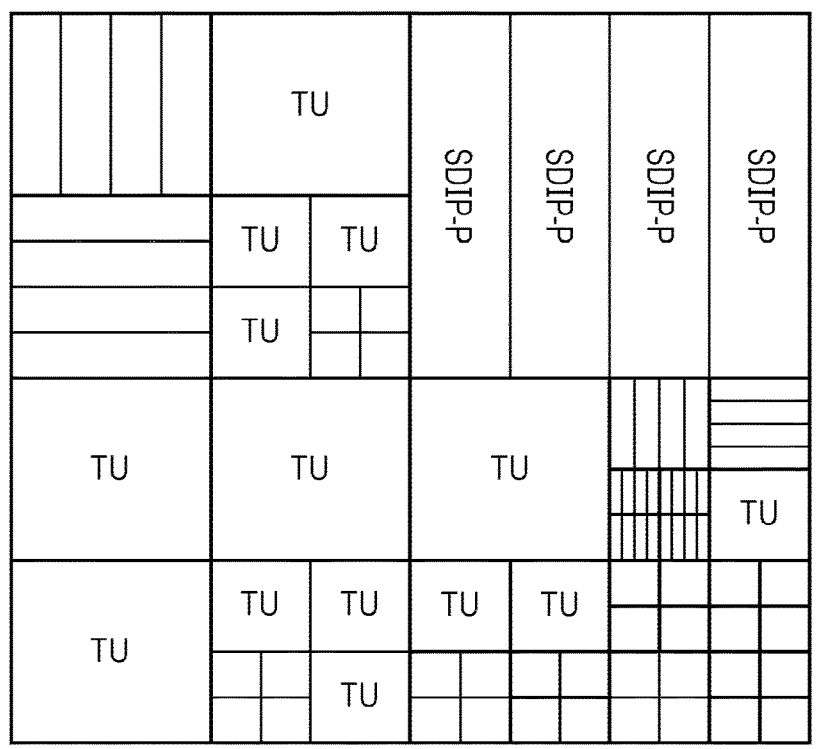
FIG. 12 schematically illustrates an array of transform units (TU)

FIG. 12 schematically illustrates an array of transform units (TU). A transform unit is a basic unit of the transform and quantisation process. Transform units may or may not be square and can take a size from 4×4 up to 32×32 samples. Each coding unit can contain one or more transform units. The acronym SDIP-P in FIG. 12 signifies a so-called short distance intra-prediction partition. In this arrangement only one dimensional transforms are used, so a 4×N block is passed through N transforms with input data to the transforms being based upon the previously decoded neighbouring blocks and the previously decoded neighbouring lines within the current SDIP-P. SDIP-P is currently not included in HEVC at the time of filing the present application.

As mentioned above, coding takes place as one LCU, then a next LCU, and so on. Within an LCU, coding is carried out CU by CU. Within a CU, coding is carried out for one TU, then a next TU and so on.

Figure 13:
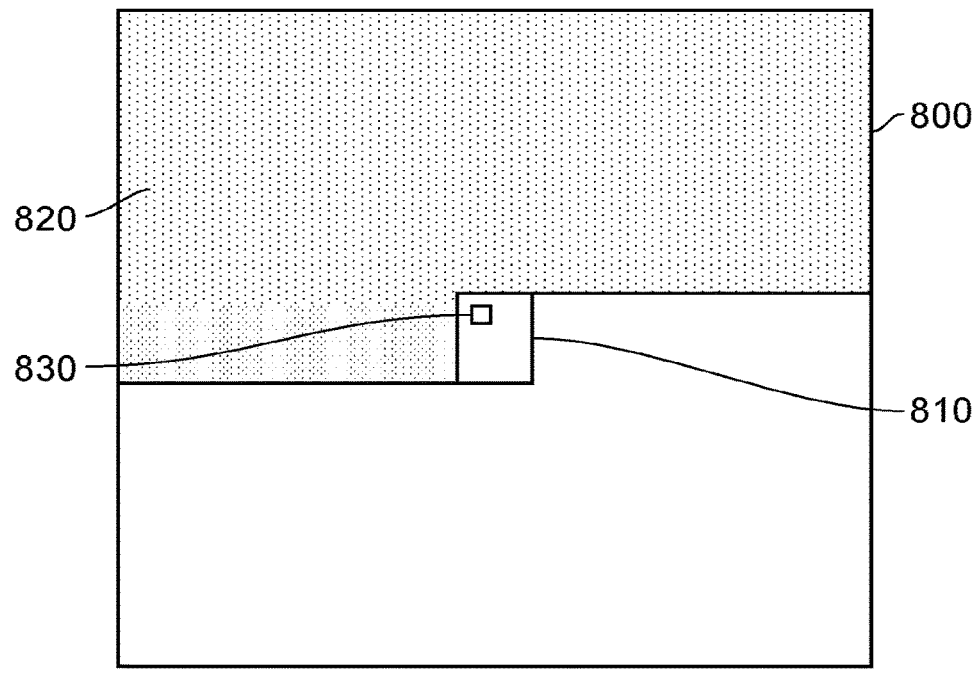
FIG. 13 schematically illustrates a partially-encoded image.

The intra-prediction process will now be discussed. In general terms, intra-prediction involves generating a prediction of a current block (a prediction unit) of samples from previously-encoded and decoded samples in the same image. FIG. 13 schematically illustrates a partially encoded image 800. Here, the image is being encoded from top-left to bottom-right on an LCU basis. An example LCU encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that. Note however that for an individual TU within the current LCU, the hierarchical order of encoding (CU by CU then TU by TU) discussed above means that there may be previously encoded samples in the current LCU and available to the coding of that TU which are, for example, above-right or below-left of that TU.

The block 810 represents an LCU; as discussed above, for the purposes of intra-image prediction processing, this may be subdivided into a set of smaller prediction units and transform units. An example of a current TU 830 is shown within the LCU 810.

The intra-image prediction takes into account samples coded prior to the current TU being considered, such as those above and/or to the left of the current TU. Source samples, from which the required samples are predicted, may be located at different positions or directions relative to the current TU. To decide which direction (prediction mode) from the candidate prediction modes is appropriate for a current prediction unit, the mode selector 520 of an example encoder may test all combinations of available TU structures for each candidate direction and select the PU direction and TU structure with the best compression-efficiency.

The picture may also be encoded on a "slice" basis. In one example, a slice is a horizontally adjacent group of LCUs. But in more general terms, the entire residual image could form a slice, or a slice could be a single LCU, or a slice could be a row of LCUs, and so on. Slices can give some resilience to errors as they are encoded as independent units. The encoder and decoder states are completely reset at a slice boundary. For example, intra-prediction is not carried out across slice boundaries; slice boundaries are treated as image boundaries for this purpose.

Figure 14:
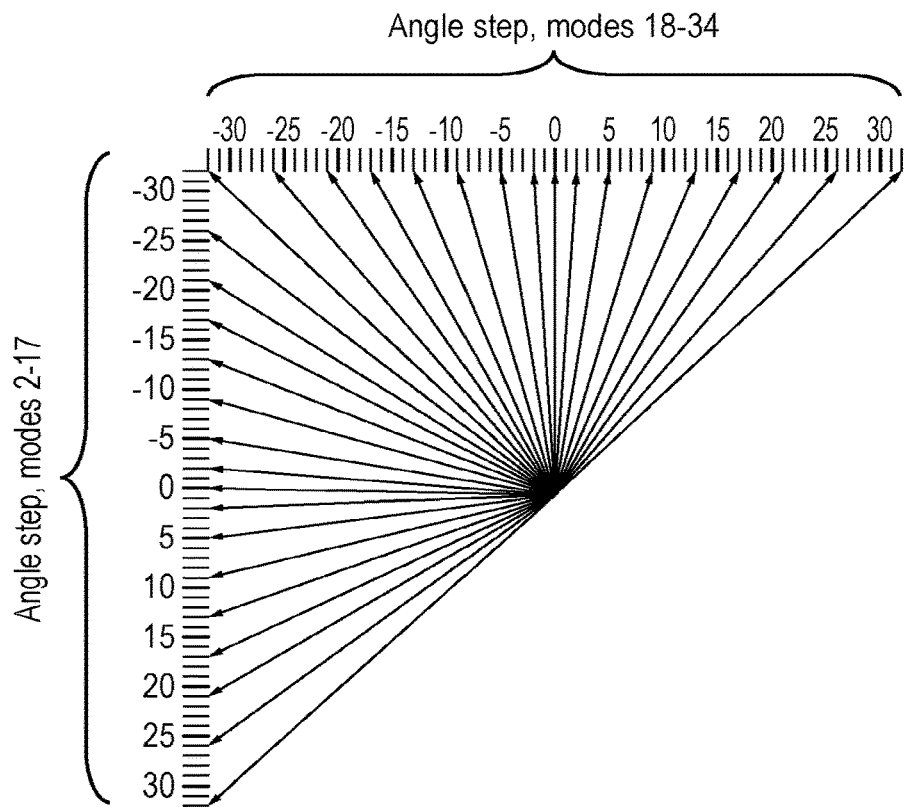
FIG. 14 schematically illustrates a set of possible intra-prediction directions.
Figure 15:
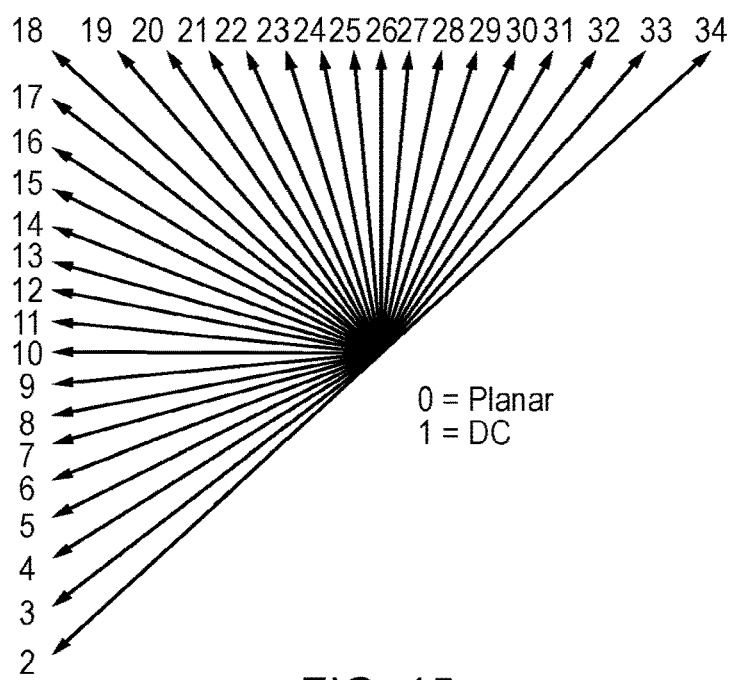
FIG. 15 schematically illustrates a set of prediction modes.

FIG. 14 schematically illustrates a set of possible (candidate) prediction directions. The full set of 34 candidate directions is available to a prediction unit of 8×8, 16×16 or 32×32 samples. The special cases of prediction unit sizes of 4×4 and 64×64 samples have a reduced set of candidate directions available to them (17 candidate directions and 5 candidate directions respectively). The directions are determined by horizontal and vertical displacement relative to a current block position, but are encoded as prediction "modes", a set of which is shown in FIG. 15. Note that the so-called DC mode represents a simple arithmetic mean of the surrounding upper and left-hand samples.

Figure 16:
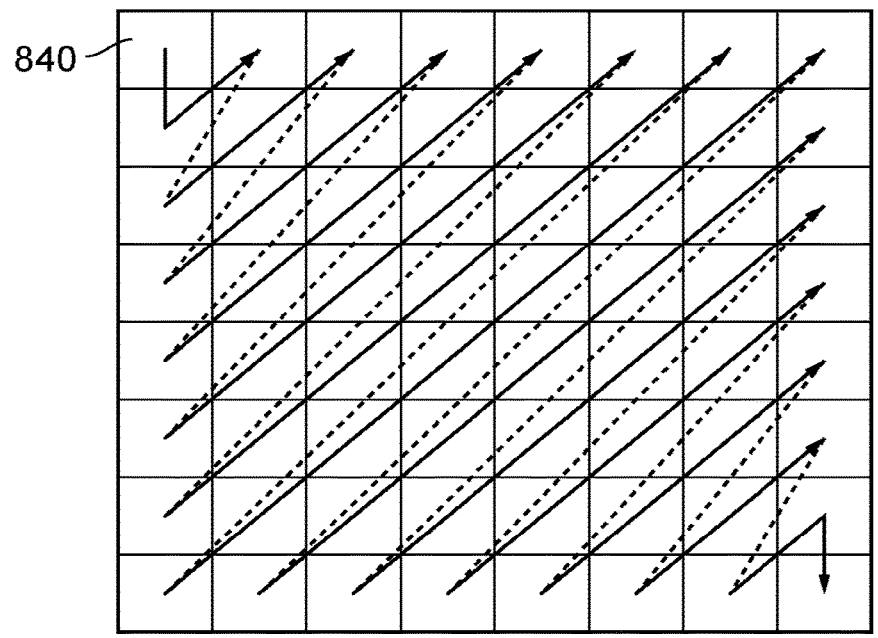
FIG. 16 schematically illustrates an up-right diagonal scan.

FIG. 16 schematically illustrates a so-called up-right diagonal scan, being an example scan pattern which may be applied by the scan unit 360. In FIG. 16, the pattern is shown for an example block of 8×8 DCT coefficients, with the DC coefficient being positioned at the top left position 840 of the block, and increasing horizontal and vertical spatial frequencies being represented by coefficients at increasing distances downwards and to the right of the top-left position 840. Other alternative scan orders may be used instead.

Variations of the block arrangements and of the CU, PU and TU structures will be discussed below. These will be discussed in the context of the apparatus of FIG. 17, which is similar in many respects to that illustrated in FIGS. 5 and 6 discussed above. Indeed, many of the same reference numerals have been used, and these parts will not be discussed further.

Figure 17:
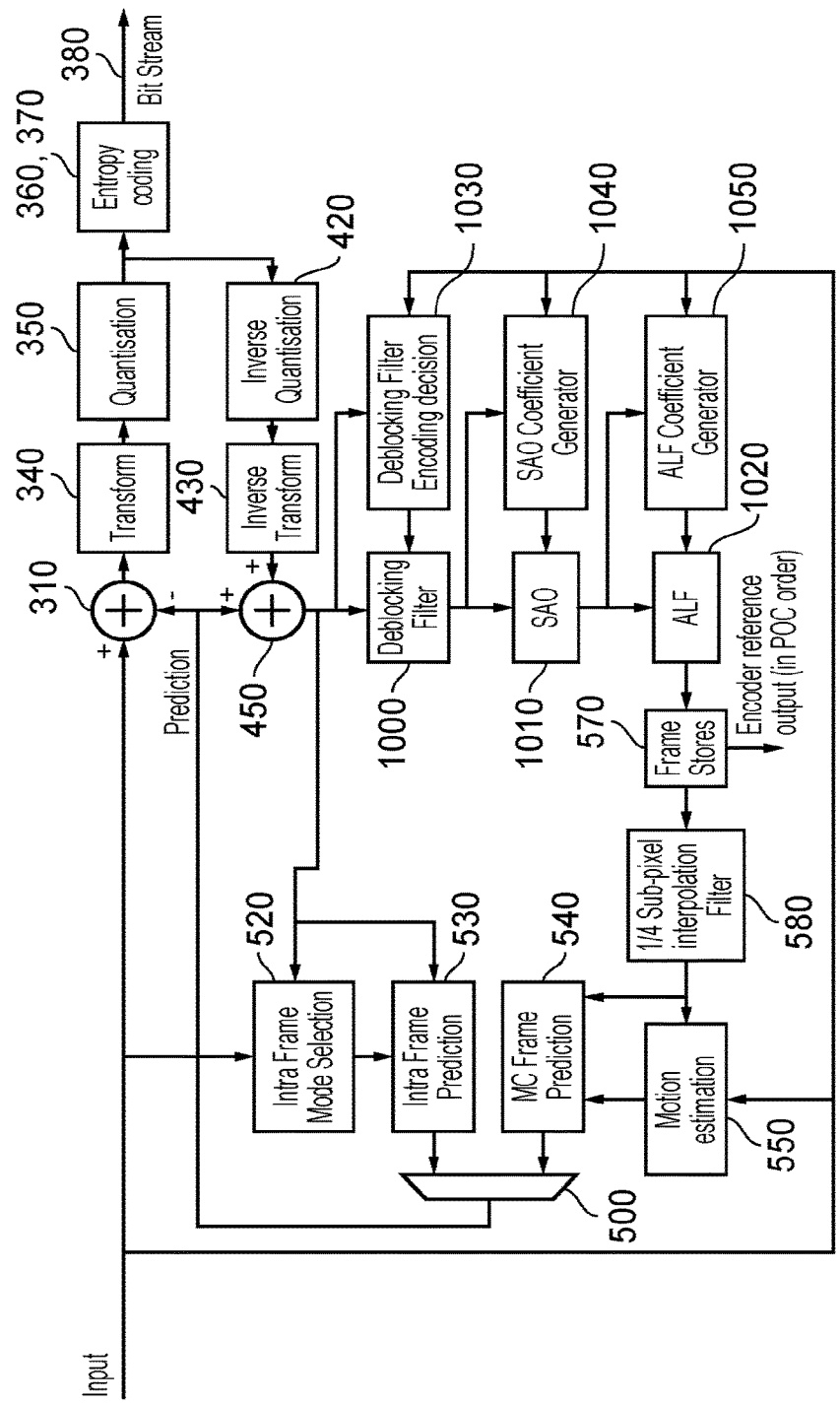
FIG. 17 schematically illustrates a video compression apparatus.

The main substantive differences with respect to FIGS. 5 and 6 relate to the filter 560 (FIG. 6), which in FIG. 17 is shown in more detail as comprising a deblocking filter 1000 and associated encoding decision block 1030, a sample adaptive offsetting (SAO) filter 1010 and associated coefficient generator 1040, and an adaptive loop filter (ALF) 1020 and associated coefficient generator 1050.

The deblocking filter 1000 attempts to reduce distortion and to improve visual quality and prediction performance by smoothing the sharp edges which can form between CU, PU and TU boundaries when block coding techniques are used.

The SAO filter 1010 classifies reconstructed pixels into different categories and then attempts to reduce distortion by simply adding an offset for each category of pixels. The pixel intensity and edge properties are used for pixel classification. To further improve the coding efficiency, a picture can be divided into regions for localization of offset parameters.

The ALF 1020 attempts to restore the compressed picture such that the difference between the reconstructed and source frames is minimized. The coefficients of ALF are calculated and transmitted on a frame basis. The ALF can be applied to the entire frame or to local areas.

As noted above, the proposed HEVC documents use a particular chroma sampling scheme known as the 4:2:0 scheme. The 4:2:0 scheme can be used for domestic/consumer equipment. However, several other schemes are possible.

In particular, a so-called 4:4:4 scheme would be suitable for professional broadcasting, mastering and digital cinema, and in principle would have the highest quality and data rate.

Similarly, a so-called 4:2:2 scheme could be used in professional broadcasting, mastering and digital cinema with some loss of fidelity.

These schemes and their corresponding possible PU and TU block structures are described below.

In addition, other schemes include the 4:0:0 monochrome scheme.

In the 4:4:4 scheme, each of the three Y, Cb and Cr channels have the same sample rate. In principle therefore, in this scheme there would be twice as much chroma data as luma data.

Hence in HEVC, in this scheme each of the three Y, Cb and Cr channels would have corresponding PU and TU blocks that are the same size; for example an 8×8 luma block would have corresponding 8×8 chroma blocks for each of the two chroma channels.

Consequently in this scheme there would generally be a direct 1:1 relationship between block sizes in each channel.

In the 4:2:2 scheme, the two chroma components are sampled at half the sample rate of luma (for example using vertical or horizontal subsampling, but for the purposes of the present description, horizontal subsampling is assumed). In principle therefore, in this scheme there would be as much chroma data as luma data, though the chroma data would be split between the two chroma channels.

Hence in HEVC, in this scheme the Cb and Cr channels would have different size PU and TU blocks to the luma channel; for example an 8×8 luma block could have corresponding 4 wide×8 high chroma blocks for each chroma channel.

Notably therefore in this scheme the chroma blocks could be non-square, even though they correspond to square luma blocks.

In the currently proposed HEVC 4:2:0 scheme, the two chroma components are sampled at a quarter of the sample rate of luma (for example using vertical and horizontal subsampling). In principle therefore, in this scheme there is half as much chroma data as luma data, the chroma data being split between the two chroma channels.

Hence in HEVC, in this scheme again the Cb and Cr channels have different size PU and TU blocks to the luma channel. For example an 8×8 luma block would have corresponding 4×4 chroma blocks for each chroma channel.

The above schemes are colloquially known in the art as 'channel ratios', as in 'a 4:2:0 channel ratio'; however it will be appreciated from the above description that in fact this does not always mean that the Y, Cb and Cr channels are compressed or otherwise provided in that ratio. Hence whilst referred to as a channel ratio, this should not be assumed to be literal. In fact, the correct ratios for the 4:2:0 scheme are 4:1:1 (the ratios for the 4:2:2 scheme and 4:4:4 scheme are in fact correct).

Figure 18B:
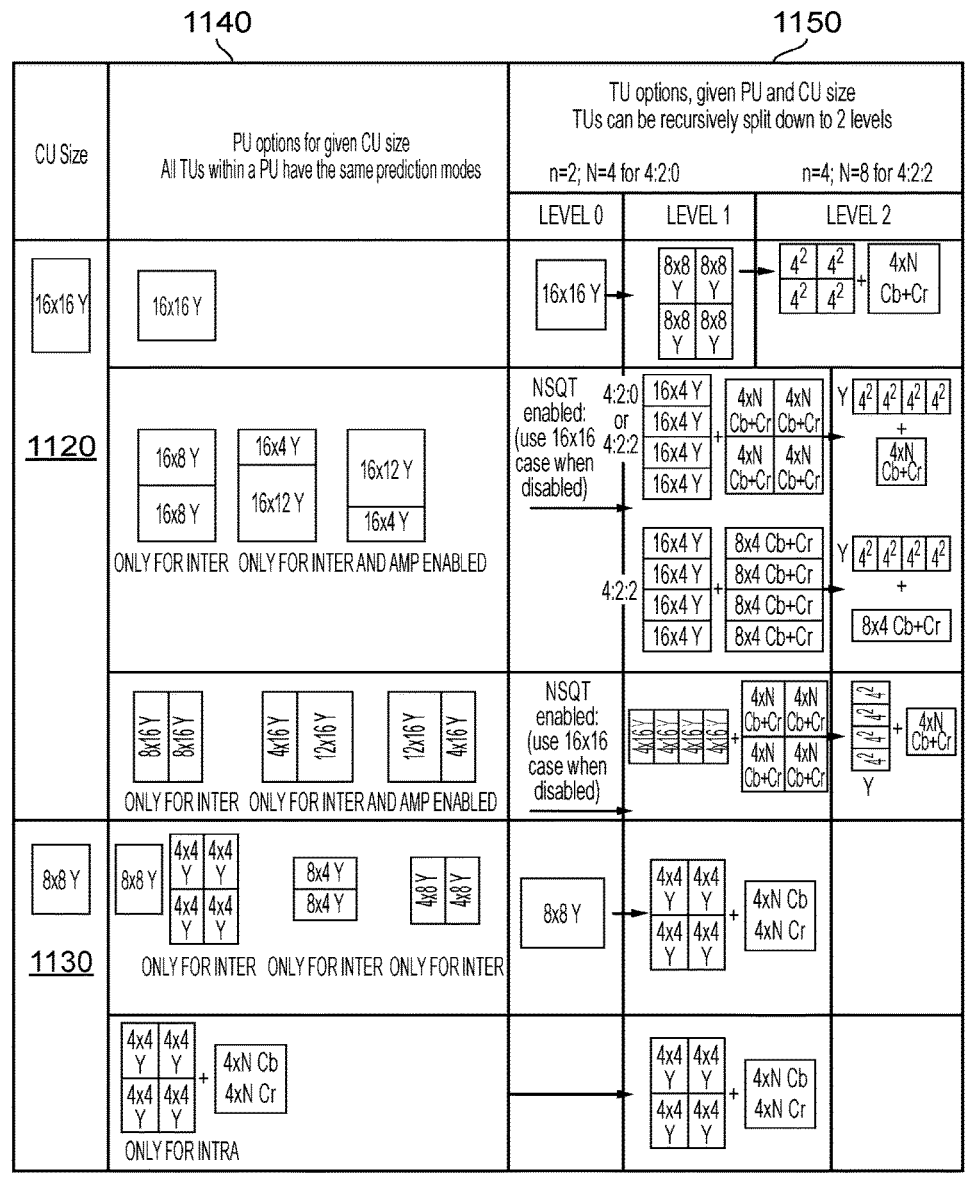

Before discussing particular arrangements with reference to FIGS. 18a and 18b, some general terminology will be summarised or revisited.

A Largest Coding Unit (LCU) is a root picture object. Typically, it covers the area equivalent to 64×64 luma pixels. It is recursively split to form a tree-hierarchy of Coding Units (CUs). In general terms, the three channels (one luma channel and two chroma channels) have the same CU tree-hierarchy. Having said this, however, depending upon the channel ratio, a particular luma CU may comprise a different number of pixels to the corresponding chroma CUs.

The CUs at the end of the tree-hierarchy, which is to say, the smallest CUs resulting from the recursive splitting process (which may be referred to as leaf CUs) are then split into Prediction Units (PUs). The three channels (luma and two chroma channels) have the same PU structure, except when the corresponding PU for a chroma channel would have too few samples, in which case just one PU for that channel is available. This is configurable, but commonly the minimum dimension of an intra PU is 4 samples; the minimum dimension of an inter PU is 4 luma samples (or 2 chroma samples for 4:2:0). The restriction on the minimum CU size is always large enough for at least one PU for any channel.

The leaf CUs are also split into Transform Units (TUs). The TUs can—and, when they are too big (for example, over 32×32 samples), must—be split into further TUs. A limit is applied so that TUs can be split down to a maximum tree depth, currently configured as 2 levels. i.e. there can be no more than 16 TUs for each CU. An illustrative smallest allowable TU size is 4×4 samples and the largest allowable TU size is 32×32 samples. Again, the three channels have the same TU structure wherever possible, but if a TU cannot be split to a particular depth for a given channel due to the size restriction, it remains at the larger size. The so-called non-square quad-tree transform arrangement (NSQT) is similar, but the method of splitting into four TUs need not be 2×2, but can be 4×1 or 1×4.

Referring to FIGS. 18a and 18b, the different block sizes possible are summarised for CU, PU and TU blocks, with 'Y' referring to luma blocks and 'C' referring in a generic sense to a representative one of the chroma blocks, and the numbers referring to pixels. 'Inter' refers to inter-frame prediction PUs (as opposed to intra-frame prediction PUs). In many cases, only the block sizes for the luma blocks are shown. The corresponding sizes of the associated chroma blocks are related to the luma block sizes according to the channel ratios. So, for 4:4:4, the chroma channels have the same block sizes as the luma blocks shown in FIGS. 18a and 18b. For 4:2:2 and 4:2:0, the chroma blocks will each have fewer pixels than the corresponding luma block, according to the channel ratio.

The arrangements shown in FIGS. 18a and 18b concern four possible CU sizes: 64×64, 32×32, 16×16 and 8×8 luma pixels respectively. Each of these CUs has a corresponding row of PU options (shown in a column 1140) and TU options (shown in a column 1150). For the possible CU sizes defined above, the rows of options are referenced as 1100, 1110, 1120 and 1130 respectively.

Note that 64×64 is currently a maximum CU size but this restriction could change.

Within each row 1100 . . . 1130, different PU options are shown applicable to that CU size. The TU options applicable to those PU configurations are shown horizontally aligned with the respective PU option(s).

Note that in several cases, multiple PU options are provided. As discussed above, the aim of the apparatus in selecting a PU configuration is to match (as closely as possible) the boundary of real objects in the picture, so that different prediction parameters can be applied to different real objects.

The block sizes and shapes and PUs are an encoder based decision, under the control of the controller 343. The current method involves conducting trials of many TU tree structures for many directions, getting the best "cost" at each level. Here, the cost may be expressed as a measure of the distortion, or noise, or errors, or bit rate resulting from each block structure. So, the encoder may try two or more (or even all available) permutations of block sizes and shapes within those allowed under the tree structures and hierarchies discussed above, before selecting the one of the trials which gives the lowest bit rate for a certain required quality measure, or the lowest distortion (or errors, or noise, or combinations of these measures) for a required bit rate, or a combination of these measures.

Given the selection of a particular PU configuration, various levels of splitting may be applied to generate the corresponding TUs. Referring to the row 1100, in the case of a 64×64 PU, this block size is too large for use as a TU and so a first level of splitting (from "level 0" (not split) to "level 1") is compulsory, resulting in an array of four 32×32 luma TUs. Each of these may be subjected to further splitting in a tree hierarchy (from "level 1" to "level 2") as required, with the splitting being carried out before transforming or quantising that TU is performed. The maximum number of levels in the TU tree is limited by (for example) the HEVC documents.

Other options are provided for PU sizes and shapes in the case of a 64×64 luma pixel CU. These are restricted to use only with inter-coded pictures and, in some cases, with the so-called AMP option enabled. AMP refers to Asymmetric Motion Partitioning and allows for PUs to be partitioned asymmetrically.

Similarly, in some cases options are provided for TU sizes and shapes. If NQST (non-square quad-tree transform, basically allowing a non-square TU) is enabled, then splitting to level 1 and/or level 2 can be carried out as shown, whereas if NQST is not enabled, the TU sizes follow the splitting pattern of the respective largest TU for that CU size.

Similar options are provided for other CU sizes.

In addition to the graphical representation shown in FIGS. 18a and 18b, the numerical part of the same information is provided in the following table, though the presentation in FIGS. 18a and 18b is considered definitive. "n/a" indicates a mode which is not allowed. The horizontal pixel size is recited first. If a third figure is given, it relates to the number of instances of that block size, as in (horizontal)×(vertical)×(number of instances) blocks. N is an integer.

| CU | | TU Options | | |
|---|---|---|---|---|
| Size | PU Options | Level 0 | Level 1 | Level 2 |
| 64 × 64 | 64 × 64 | n/a | 32 × 32 × 4 | 16 × 16 × 4 |
| | 64 × 32 × 2 (horizontal configuration) | n/a | 32 × 32 × 4 | 32 × 8 × 4 |
| | 64 × 16 + 64 × 48 (2 horizontal configurations) | | | |
| | 32 × 64 × 2 (vertical configuration) | n/a | 32 × 32 × 4 | 8 × 32 × 4 |
| | 16 × 64 + 48 × 64 (2 vertical configurations) | | | |
| | 32 × 32 | 32 × 32 | 16 × 16 × 4 | 8 × 8 × 4 |
| 32 × 32 | 32 × 16 × 2 (horizontal configuration) | n/a | 32 × 8 × 4 | 16 × 4 × 4 (luma) + 4 × 4 × 4 (chroma, 4:2:0 or 4:2:2) or 8 × 4 × 4 (chroma, 4:2:2) |
| | 32 × 8 + 32 × 24 (2 horizontal configurations) | | | |
| | 16 × 32 × 2 (vertical configuration) | n/a | 8 × 32 × 4 | 4 × 16 × 4 (luma) + 4 × 4 × 4 (chroma) |
| | 8 × 32 + 24 × 32 (2 vertical configurations) | | | |
| 16 × 16 | 16 × 16 | 16 × 16 | 8 × 8 × 4 | 4 × 4 × 4 (luma) + 4 × 8 × 4 (chroma) |
| | 16 × 8 × 2 (horizontal configuration) | n/a | 16 × 4 × 4 (luma) + 4 × 8 × 4 (chroma) (4:2:0 or 4:2:2) | 4 × 4 × 4 (luma) + 4 × 8 × 1 (chroma) (4:2:0 or 4:2:2) |
| | 16 × 4 + 16 × 12 (2 horizontal configurations) | | 16 × 4 × 4 (luma) + 8 × 4 × 4 (chroma) (4:2:2) | 4 × 4 × 4 (luma) + 8 × 4 × 1 (chroma) (4:2:2) |
| | 8 × 16 × 2 (vertical configuration) | n/a | | |
| | 4 × 16 + 12 × 16 (2 vertical configurations) | | | |
| 8 × 8 | 8 × 8 | 8 × 8 | 4 × 4 × 4 (luma) + 4 × 8 × 1 (chroma) | n/a |
| | 4 × 4 × 4 | | | |
| | 8 × 4 × 2 (horizontal configuration) | | | |
| | 4 × 8 × 2 (vertical configuration) | | | |
| | 4 × 4 × 4 (luma) + 4 × N (chroma) | n/a | 4 × 4 × 4 (luma) + 4 × 8 × 1 (chroma) | n/a |

4:2:0, 4:2:2 and 4:4:4 Block Structure Variants

It has been appreciated that both 4:2:0 and 4:4:4 schemes have square PU blocks for intra-prediction coding. Moreover, currently the 4:2:0 scheme permits 4×4 pixel PU & TU blocks.

In embodiments of the present disclosure, it is consequently proposed that for the 4:4:4 scheme the recursion for CU blocks is permitted down to 4×4 pixels rather than 8×8 pixels, since as noted above in the 4:4:4 mode the luma and chroma blocks will be the same size (i.e. the chroma data is not subsampled) and so for a 4×4 CU no PU or TU will need to be less than the already allowed minimum of 4×4 pixels.

Similarly, in the 4:4:4 scheme, in an embodiment of the present disclosure each of the Y, Cr, Cb channels, or the Y and the two Cr, Cb channels together, could have respective CU tree-hierarchies. A flag may then be used to signal which hierarchy or arrangement of hierarchies is to be used. This approach could also be used for a 4:4:4 RGB colour space scheme. However, in an alternative, the tree hierarchies for chroma and luma may instead be independent.

In the example of an 8×8 CU in the 4:2:0 scheme, this results in four 4×4 luma PUs and one 4×4 chroma PU. Hence in the 4:2:2 scheme, having twice as much chroma data, one option is in this case is to have two 4×4 chroma PUs, where (for example) the bottom chroma block would correspond in position to the bottom left luma block. However, it is has been appreciated that using one non-square 4×8 chroma PU in this case would be more consistent with arrangements for the 4:2:0 chroma format.

In the 4:2:0 scheme there are in principle some non-square TU blocks permitted for certain classes of inter-prediction coding, but not for intra-prediction coding. However in inter-prediction coding, when non-square quad-tree transforms (NSQT) are disabled (which is the current default for the 4:2:0 scheme), all TUs are square. Hence in effect the 4:2:0 scheme currently enforces square TUs. For example, a 16×16 4:2:0 luma TU would correspond with respective Cb & Cr 8×8 4:2:0 Chroma TUs.

However, as noted previously, the 4:2:2 scheme can have non-square PUs. Consequently in an embodiment of the present disclosure it is proposed to allow non-square TUs for the 4:2:2 scheme.

For example, whilst a 16×16 4:2:2 luma TU could correspond with two respective Cb & Cr 8×8 4:2:2 Chroma TUs, in this embodiment it could instead correspond with respective Cb & Cr 8×16 4:2:2 Chroma TUs.

Similarly, four 4×4 4:2:2 luma TUs could correspond with two respective 4×4 Cb+Cr 4:2:2 TUs, or in this embodiment could instead correspond with respective 4×8 Cb & Cr 4:2:2 TUs.

Having non-square chroma TUs, and hence fewer TUs, may be more efficient as they are likely to contain less information. However this may affect the transformation and scanning processes of such TUs, as will be described later.

For 4:4:4, it is possible in embodiments of the disclosure to prevent the luma blocks splitting down to (for example) 4×4 blocks, if that is a further split than the chroma blocks undergo. This can lead to more efficient coding.

Finally, for the 4:4:4 scheme it may be preferable to have the TU structure channel-independent, and selectable at the sequence, picture, slice or finer level.

As noted above, NSQT is currently disabled in the 4:2:0 scheme of HEVC. However, if for inter-picture prediction, NSQT is enabled and asymmetric motion partitioning (AMP) is permitted, this allows for PUs to be partitioned asymmetrically; thus for example a 16×16 CU may have a 4×16 PU and a 12×16 PU. In these circumstances, further considerations of block structure are important for each of the 4:2:0 and 4:2:2 schemes.

For the 4:2:0 scheme, in NSQT the minimum width/height of a TU may be restricted to 4 luma/chroma samples:

Hence in a non-limiting example a 16×4/16×12 luma PU structure has four 16×4 luma TUs and four 4×4 chroma TUs, where the luma TUs are in a 1×4 vertical block arrangement and the chroma TUs are in a 2×2 block arrangement.

In a similar arrangement where the partitioning was vertical rather than horizontal, a 4×16/12×16 luma PU structure has four 4×16 luma TUs and four 4×4 chroma TUs, where the luma TUs are in a 4×1 horizontal block arrangement and the chroma TUs are in a 2×2 block arrangement.

For the 4:2:2 scheme, in NSQT as a non-limiting example a 4×16/12×16 luma PU structure has four 4×16 luma TUs and four 4×8 chroma TUs, where the luma TUs are in a 4×1 horizontal block arrangement; the chroma TUs are in a 2×2 block arrangement.

However, it has been appreciated that a different structure can be considered for some cases. Hence in an embodiment of the present disclosure, in NSQT as a non-limiting example 16×4/16×12 luma PU structure has four 16×4 luma TUs and four 8×4 chroma TUs, but now the luma and chroma TUs are in a 1×4 vertical block arrangement, aligned with the PU layout (as opposed to the 4:2:0 style arrangement of four 4×8 chroma TUs in a 2×2 block arrangement).

Similarly 32×8 PU can have four 16×4 luma TUs and four 8×4 chroma TUs, but now the luma and chroma TUs are in a 2×2 block arrangement.

Hence more generally, for the 4:2:2 scheme, in NSQT the TU block sizes are selected to align with the asymmetric PU block layout. Consequently the NSQT usefully allows TU boundaries to align with PU boundaries, which reduces high frequency artifacts that may otherwise occur.

In general terms, embodiments of the disclosure can relate to a video coding method, apparatus or program operable in respect of images of a 4:2:2 format video signal. An image to be encoded is divided into coding units, prediction units and transform units for encoding, a coding unit being a square array of luminance samples and the corresponding chrominance samples, there being one or more prediction units in a coding unit, and there being one or more transform units in a coding unit; in which a prediction unit is an elementary unit of prediction so that all samples within a single prediction unit are predicted using a common prediction technique, and a transform unit is a basic unit of transformation and quantisation.

A Non-square transform mode (such as an NSQT mode) is enabled so as to allow non-square prediction units. Optionally, asymmetric motion partitioning is enabled so as to allow asymmetry between two or more prediction units corresponding to a single coding unit.

The controller 343 controls the selection of transform unit block sizes to align with the prediction unit block layout, for example by detecting image features in the portion of the image corresponding to a PU and selecting TU block sizes in respect of that PU so as to align TU boundaries with edges of image features in the portion of the image.

The rules discussed above dictate which combinations of block sizes are available. The encoder may just try different combinations. As discussed above, a trial may include two or more, through to all available options. The trial encode processes can be carried out according to a cost function metric and a result selected according to an assessment of the cost function.

Given that there are three levels of variation, according to the CU size and shape, the PU size and shape and the TU size and shape, this could lead to a large number of permutations to be trial-encoded. To reduce this variation, the system could trial encode for a CU size by using an arbitrarily selected one of the PU/TU configurations allowable for each CU size; then, having selected a CU size, a PU size and shape could be selected by trial encoding the different PU options each with a single arbitrarily chosen TU configuration. Then, having selected a CU and PU, the system could try all applicable TU configurations to select a final TU configuration.

Another possibility is that some encoders may use a fixed choice of block configuration, or may allow a limited subset of the combinations set out in the discussions above.

Intra-Prediction

4:2:0 Intra-Prediction

Figure 22:
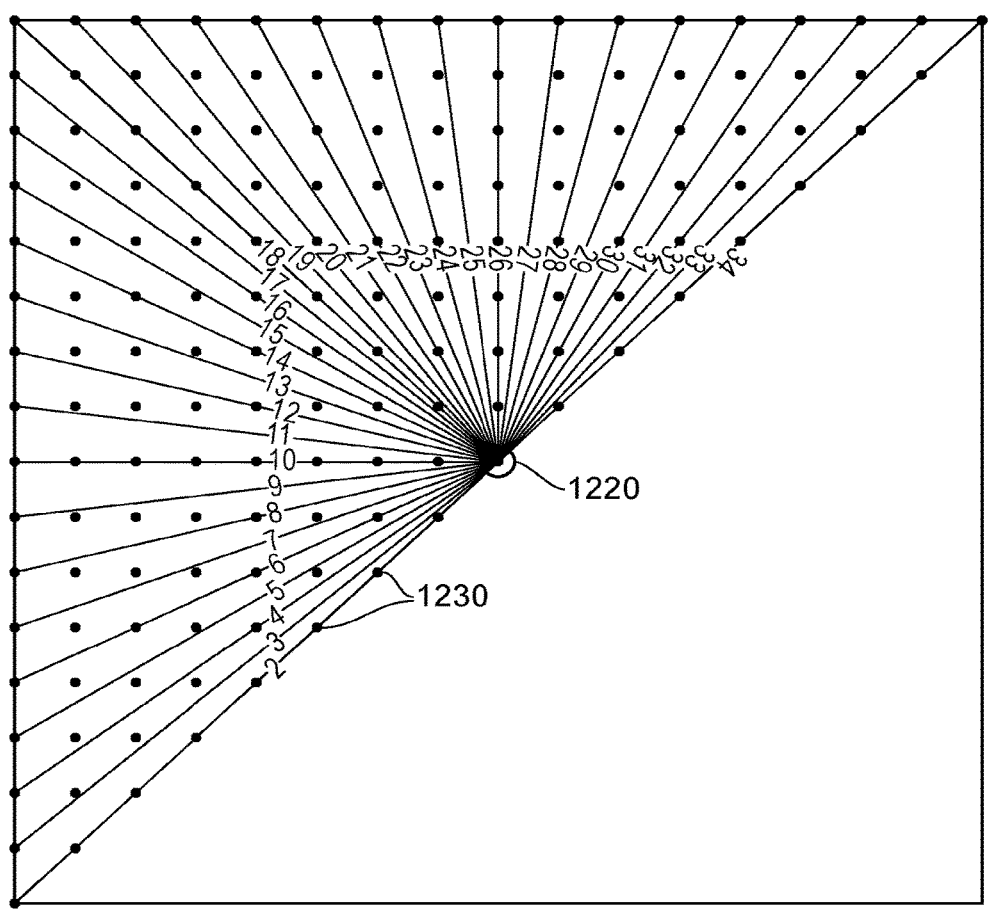
FIG. 22 schematically illustrates a set of luma prediction directions.

Turning now to FIG. 22, for intra-prediction, HEVC allows for angular chroma prediction.

By way of introduction, FIG. 22 illustrates 35 prediction modes applicable to luma blocks, 33 of which specify directions to reference samples for a current predicted sample position 110. The remaining two modes are mode 0 (planar) and mode 1 (dc). A prediction mode is selected for each block from these candidate prediction modes.

HEVC allows chroma to have DC, Vertical, Horizontal, Planar, DM_CHROMA and LM_CHROMA modes.

DM_CHROMA indicates that the prediction mode to be used is the same as that of the co-located luma PU (i.e. one of the 35 shown in FIG. 22).

LM_CHROMA (linear mode chroma) indicates that co-located luma samples (downsampled as appropriate to the channel ratios) are used to derive the predicted chroma samples. In this case, if the luma PU from which the DM_CHROMA prediction mode would be taken selected DC, Vertical, Horizontal or Planar, that entry in the chroma prediction list is replaced using mode 34. In the LM_CHROMA mode, the luma pixels from which the chroma pixels are predicted are scaled (and have an offset applied if appropriate) according to a linear relationship between luma and chroma. This linear relationship is derived from surrounding pixels, and the derivation can be carried out on a block by block basis, with the decoder finishing decoding one block before moving on to the next.

It is notable that the prediction modes 2-34 sample an angular range from 45 degrees to 225 degrees; that is to say, one diagonal half of a square. This is useful in the case of the 4:2:0 scheme, which as noted above only uses square chroma PUs for intra-picture prediction.

4:2:2 Intra-Prediction Variants

However, also as noted above the 4:2:2 scheme could have rectangular (non-square) chroma PUs even when the luma PUs are square. Or indeed, the opposite could be true: a rectangular luma PU could correspond to a square chroma PU. The reason for the discrepancy is that in 4:2:2, the chroma is subsampled horizontally (relative to the luma) but not vertically. So the aspect ratio of a luma block and a corresponding chroma block would be expected to be different. Accordingly the 4:2:2 format represents one example (and there are other such as 4:2:0) of a video format in which the chrominance samples have a lower horizontal and/or vertical sampling rate than the luminance samples so that the ratio of luminance horizontal resolution to chrominance horizontal resolution is different to the ratio of luminance vertical resolution to chrominance vertical resolution so that a block of luminance samples has a different aspect ratio to a corresponding block of chrominance samples.

Consequently, in an embodiment of the present disclosure, for chroma PUs having a different aspect ratio to the corresponding luma block, a mapping table may be required for the direction. Assuming (for example) a 1-to-2 aspect ratio for rectangular chroma PUs, then for example mode 18 (currently at an angle of 135 degrees) may be re-mapped to 123 degrees. Alternatively selection of current mode 18 may be remapped to a selection of current mode 22, to much the same effect.

Hence more generally, for non-square PUs, a different mapping between the direction of the reference sample and the selected intra prediction mode may be provided compared with that for square PUs.

More generally still, any of the modes, including the non-directional modes, may also be re-mapped based upon empirical evidence.

It is possible that such mapping will result in a many-to-one relationship, making the specification of the full set of modes redundant for 4:2:2 chroma PUs. In this case, for example it may be that only 17 modes (corresponding to half the angular resolution) are necessary. Alternatively or in addition, these modes may be angularly distributed in a non-uniform manner.

Similarly, the smoothing filter used on the reference sample when predicting the pixel at the sample position may be used differently; in the 4:2:0 scheme it is only used to smooth luma pixels, but not chroma ones. However, in the 4:2:2 and 4:4:4 schemes this filter may also be used for the chroma PUs. In the 4:2:2 scheme, again the filter may be modified in response to the different aspect ratio of the PU, for example only being used for a subset of near horizontal modes. An example subset of modes is preferably 2-18 and 34, or more preferably 7-14. In 4:2:2, smoothing of only the left column of reference samples may be carried out in embodiments of the disclosure.

In general terms, in embodiments to be described, a first prediction direction is defined in relation to a first grid of a first aspect ratio in respect of a set of current samples to be predicted; and a direction mapping is applied to the prediction direction so as to generate a second prediction direction defined in relation to a second grid of a different aspect ratio. The first prediction direction may be defined with respect to a square block of luminance samples including a current luminance sample; and the second prediction direction may be defined with respect to a rectangular block of chrominance samples including a current chrominance sample.

These arrangements are discussed later in more detail.

4:4:4 Intra-Prediction Variants

In the 4:4:4 scheme, the chroma and luma PUs are the same size, and so the intra-prediction mode for a chroma PU can be either the same as the co-located luma PU (so saving some overhead in the bit stream by not having to encode a separate mode), or alternatively, it can be independently selected.

In this latter case therefore, in an embodiment of the present disclosure one may have 1, 2 or 3 different prediction modes for each of the PUs in a CU;

In a first example, the Y, Cb and Cr PUs may all use the same intra-prediction mode.

In a second example, the Y PU may use one intra-prediction mode, and the Cb and Cr PUs both use another independently selected intra-prediction mode.

In a third example, the Y, Cb and Cr PUs each use a respective independently selected intra-prediction mode.

It will be appreciated that having independent prediction modes for the chroma channels (or each chroma channel) will improve the colour prediction accuracy. But this is at the expense of an additional data overhead to communicate the independent prediction modes as part of the encoded data.

To alleviate this, the selection of the number of modes could be indicated in the high-level syntax (e.g. at sequence, picture, or slice level). Alternatively, the number of independent modes could be derived from the video format; for example, GBR could have up to 3, whilst YCbCr could be restricted to up to 2.

In addition to independently selecting the modes, the available modes may be allowed to differ from the 4:2:0 scheme in the 4:4:4 scheme.

For example as the luma and chroma PUs are the same size in 4:4:4, the chroma PU may benefit from access to all of the 35+LM_CHROMA+DM_CHROMA directions available. Hence for the case of Y, Cb and Cr each having independent prediction modes, then the Cb channel could have access to DM_CHROMA & LM_CHROMA, whilst the Cr channel could have access to DM_CHROMA_Y, DM_CHROMA_Cb, LM_CHROMA_Y and LM_CHROMA_Cb, where these replace references to the Luma channel with references to the Y or Cb chroma channels.

Where the luma prediction modes are signalled by deriving a list of most probable modes and sending an index for that list, then if the chroma prediction mode(s) are independent, it may be necessary to derive independent lists of most probable modes for each channel.

Finally, in a similar manner to that noted for the 4:2:2 case above, in the 4:4:4 scheme the smoothing filter used on the reference sample when predicting the pixel at the sample position may be used for chroma PUs in a similar manner to luma PUs. Currently, a [1,2,1] low-pass filter can be applied to the reference samples prior to intra-prediction. This is only used for luma TUs when using certain prediction modes.

One of the intra-prediction modes available to chroma TUs is to base the predicted samples on co-located luma samples. Such an arrangement is illustrated schematically in FIG. 19, which shows an array of TUs 1200 (from a region of a source image) represented by small squares in the Cb, Cr and Y channels, showing the special alignment between image features (schematically indicated by dark and light shaded boxes 1200) in the Cb and Y channels and in the Cr and Y channels. In this example, it is of benefit to force the chroma TUs to base their predicted samples on co-located luma samples. However, it is not always the case that image features correspond between the three channels. In fact, certain features may appear only in one or two of the channels, and in general the image content of the three channels may differ.

In embodiments of the disclosure, for Cr TUs, LM_Chroma could optionally be based on co-located samples from the Cb channel (or, in other embodiments, the dependence could be the other way around). Such an arrangement is shown in schematic form in FIG. 20. Here, spatially aligned TUs are illustrated between the Cr, Cb and Y channels. A further set of TUs labelled "source" is a schematic representation of the colour picture as seen as a whole. The image features (a top left triangle and a lower right triangle) seen in the source image do not in fact represent changes in the luminance, but only changes in chrominance between the two triangular regions. In this case, basing LM_Chroma for Cr on the luminance samples would produce a poor prediction, but basing it on the Cb samples could give a better prediction.

The decision as to which LM_Chroma mode to be used can be made by the controller 343 and/or the mode selector 520, based on trial encoding of different options (including the option of basing LM_Chroma on the co-located luma or co-located chroma samples), with the decision as to which mode to select being made by assessing a cost function, similar to that described above, with respect to the different trial encodings. Examples of the cost function are noise, distortion, error rate or bit rate. A mode from amongst those subjected to trial encoding which gives the lowest of any one or more of these cost functions is selected.

Figure 21:
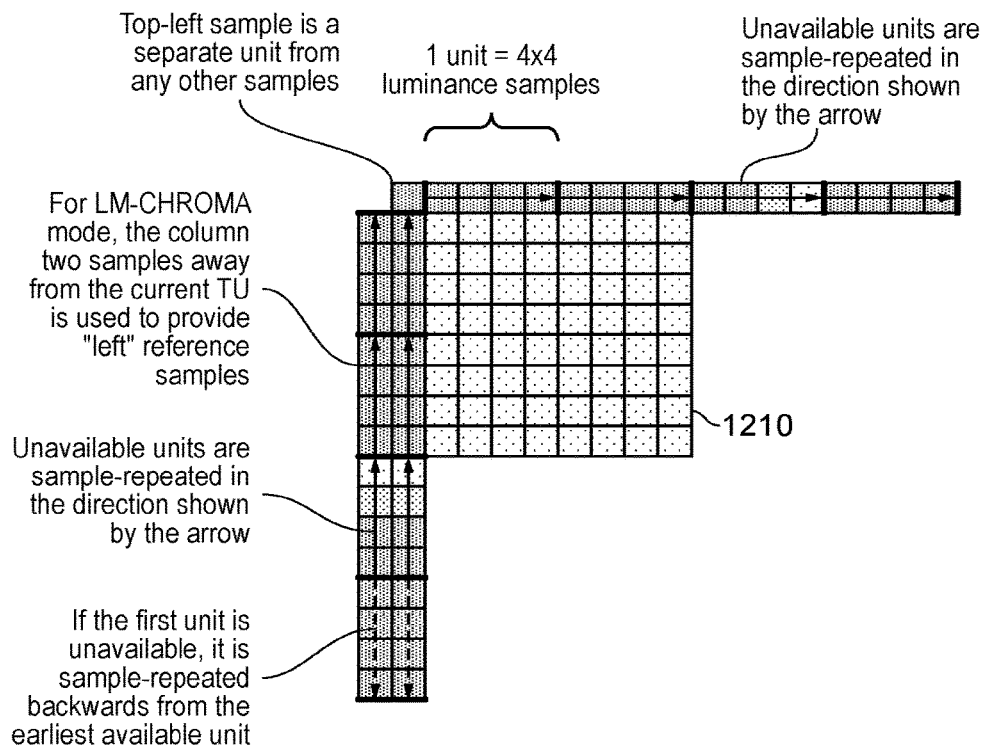
FIG. 21 schematically illustrates pixels used for an LM-CHROMA mode.

FIG. 21 schematically illustrates a method used to obtain reference samples for intra-prediction in embodiments of the disclosure. In viewing FIG. 21, it should be borne in mind that encoding is carried out according to a scanning pattern, so that in general terms encoded versions of the blocks above and to the left of a current block to be encoded are available to the encoding process. Sometimes samples below-left or to the above-right are used, if they have been previously coded as part of other already-encoded TUs within the current LCU. Reference is made to FIG. 13 as described above, for example.

A shaded area 1210 represents a current TU, that is to say, a TU which is currently being encoded.

In 4:2:0 and 4:2:2, the column of pixels immediately to the left of the current TU does not contain co-located luminance and chrominance samples because of horizontal subsampling. In other words, this is because the 4:2:0 and 4:2:2 formats have half as many chrominance pixels as luminance pixels (in a horizontal direction), so not every luminance sample position has a co-sited chrominance sample. Therefore, although luminance samples may be present in the column of pixels immediately to the left of the TU, chrominance samples are not present. Therefore, in embodiments of the disclosure, the column located two samples to the left of the current TU is used to provide reference samples for LM_Chroma. Note that the situation is different in 4:4:4, in that the column immediately to the left of the current TU does indeed contain co-located luma and chroma samples. This column could therefore be used to provide reference samples.

The reference samples are used as follows.

In the LM_Chroma mode, predicted chroma samples are derived from reconstructed luma samples according to a linear relationship. So, in general terms, it can be said that the predicted chrominance values within the TU are given by:

$$P_C = a + bP_L$$

where $P_C$ is a chrominance sample value, $P_L$ is a reconstructed luminance sample value at that sample position, and a and b are constants. The constants are derived for a particular block by detecting the relationship between reconstructed luma samples and chroma samples in the row just above that block and in the column just to the left of that block, these being sample positions which have already been encoded (see above).

In embodiments of the disclosure, the constants a and b are derived as follows:

$$a = R(P_L', P_C')/R(P_L', P_L')$$

where R represents a linear (least squares) regression function, and $P_L'$ and $P_C'$ are luminance and chrominance samples respectively from the adjacent row and column as discussed above, and:

$$b = \text{mean}(P_C') - a \cdot \text{mean}(P_L')$$

For 4:4:4, the $P_L'$ and $P_C'$ values are taken from the column immediately to the left of the current TU, and the row immediately above the current TU. For 4:2:2, the $P_L'$ and $P_C'$ values are taken from the row immediately above the current TU and the column in the adjacent block which is two sample positions away from the left edge of the current TU. For 4:2:0 (which is subsampled vertically and horizontally) the $P_L'$ and $P_C'$ values would ideally be taken from a row which is two rows above the current TU, but in fact are taken from a row in the adjacent block which is one sample positions above the current TU, and the column in the adjacent block which is two sample positions away from the left edge of the current TU. The reason is to avoid having to maintain an additional whole row of data in memory. So in this regard, 4:2:2 and 4:2:0 are treated in a similar way.

Accordingly, these techniques apply to video coding methods having a chrominance prediction mode in which a current block of chrominance samples representing a region of the image is encoded by deriving and encoding a relationship of the chrominance samples with respect to a co-sited block of luminance samples (such as reconstructed luminance samples) representing the same region of the image. The relationship (such as the linear relationship) is derived by comparing co-sited (otherwise expressed as correspondingly-sited) luminance and chrominance samples from adjacent already-encoded blocks. The chrominance samples are derived from luminance samples according to the relationship; and the difference between the predicted chrominance samples and the actual chrominance samples is encoded as residual data.

In respect of a first sampling resolution (such as 4:4:4) where the chrominance samples have the same sampling rate as the luminance samples, the co-sited samples are samples in sample positions adjacent to the current block.

In respect of a second sampling resolution (such as 4:2:2 or 4:2:0) where the chrominance samples have a lower sampling rate than that of the luminance samples, a nearest column or row of co-sited luminance and chrominance samples from the adjacent already-encoded block is used to provide the co-sited samples. Or where, in the case of the second sampling resolution being a 4:2:0 sampling resolution, the correspondingly-sited samples are a row of samples adjacent to the current block and a nearest column or row of correspondingly-sited luminance and chrominance samples, from the adjacent already-encoded blocks.

FIG. 22 schematically illustrates the available prediction angles for luma samples. The current pixel being predicted as shown at the centre of the diagram as a pixel 1220. The smaller dots 1230 represent adjacent pixels. Those located on the top or left sides of the current pixel are available as reference samples to generate a prediction, because they have been previously encoded. Other pixels are currently unknown (at the time of predicting the pixel 1220) and will in due course be predicted themselves.

Each numbered prediction direction points to reference samples 1230 from within a group of candidate reference samples on the top or left edges of the current block that are used to generate the current predicted pixel. In the case of smaller blocks, where the prediction directions point to locations between reference samples, a linear interpolation between adjacent reference samples (either side of the sample position pointed to by the direction indicated by the current prediction mode) is used.

Turning now to intra-angular prediction for chroma samples, for 4:2:0, fewer prediction directions are available because of the relative scarcity of the chroma samples. However, if the DM_CHROMA mode is selected then the current chroma block will use the same prediction direction as the co-located luma block. In turn, this means that the luma directions for intra-prediction are also available to chroma.

However, for chroma samples in 4:2:2, it can be considered counter-intuitive to use the same prediction algorithm and direction as luma when DM_CHROMA is selected, given that chroma blocks now have a different aspect ratio to that of the luma blocks. For example, a 45° line for a square luma array of samples should still map to a 45° line for chroma samples, albeit with an array of rectangular sized samples. Overlaying the rectangular grid onto to a square grid indicates that the 45° line would then in fact map to a 26.6° line.

In embodiments of the disclosure, it may be defined that all regions of an image, or all regions of each image, use the same prediction mode (for example, for at least chrominance samples), such as DM_CHROMA mode.

Figure 23:
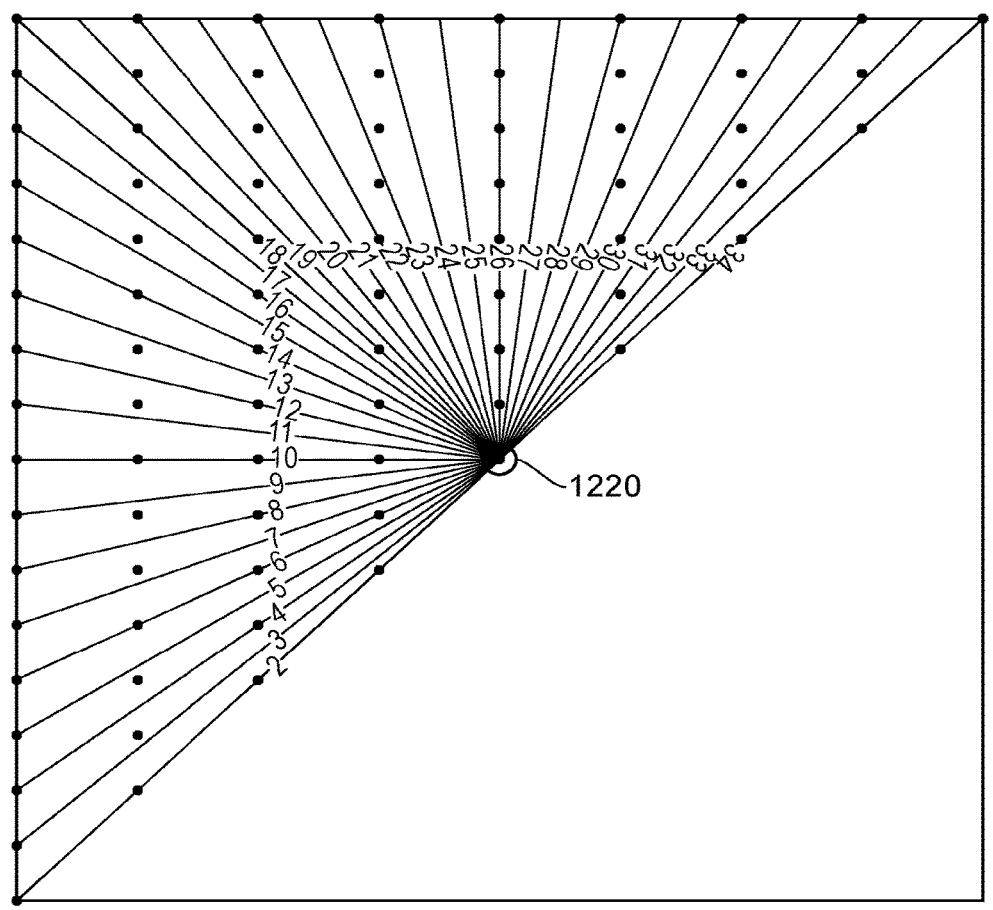
FIG. 23 schematically illustrates the directions of FIG. 22, as applied to a horizontally sparse chroma channel.

FIG. 23 schematically illustrates luma intra-prediction directions as applied to chroma pixels in 4:2:2, in respect of a current pixel to be predicted 1220. Note that there are half as many pixels horizontally as there are vertically, because 4:2:2 has half the horizontal sample rate in the chroma channel as compared to the luma channel.

Figure 24:
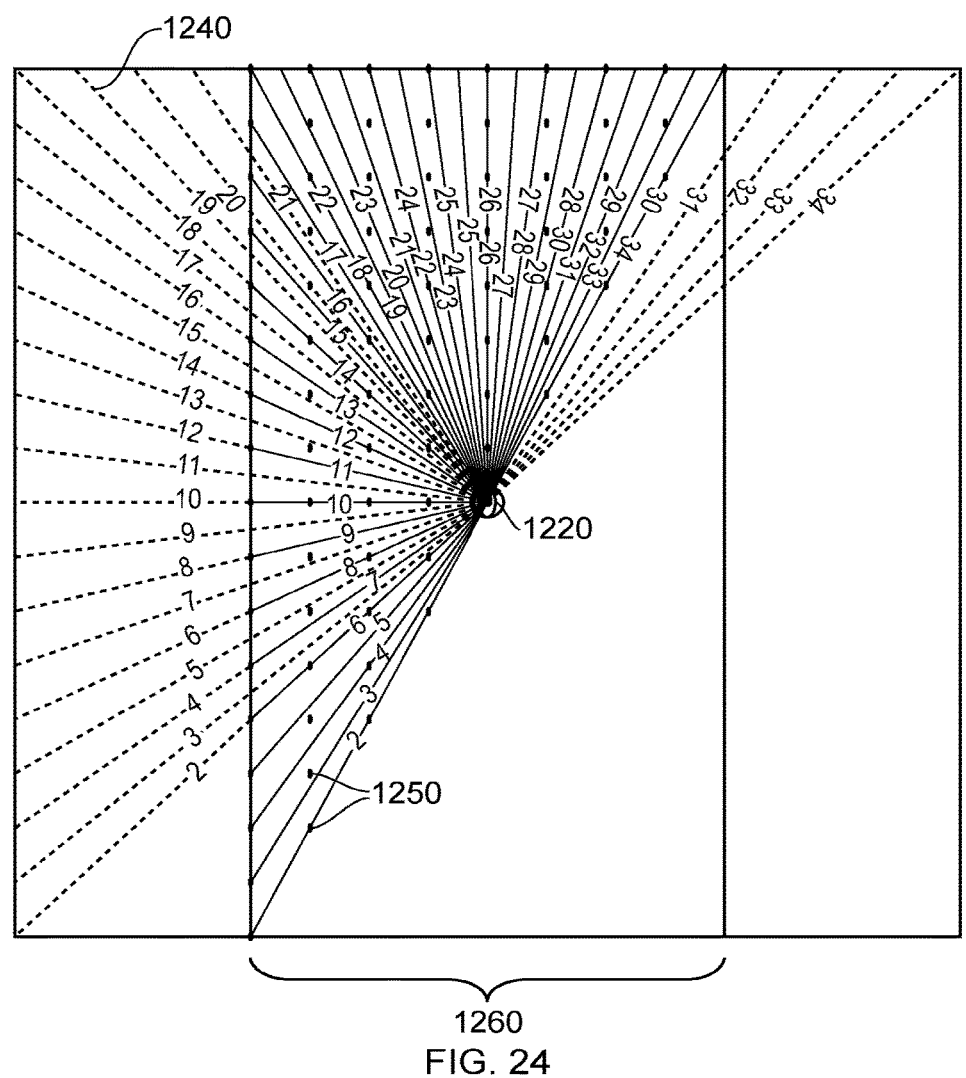
FIG. 24 schematically illustrates the directions of FIG. 22 mapped to a rectangular chroma pixel array.

FIG. 24 schematically illustrates the transformation or mapping of the 4:2:2 chroma pixels to a square grid, and subsequently how this transformation changes the prediction directions.

The luma prediction directions are shown as broken lines 1240. The chroma pixels 1250 are remapped to a square grid giving a rectangular array half the width 1260 of the corresponding luma array (such as that shown in FIG. 22). The prediction directions shown in FIG. 23 have been remapped to the rectangular array. It can be seen that for some pairs of directions (a pair being a luma direction and a chroma direction) there is either an overlap or a close relationship. For example, direction 2 in the luma array substantially overlies the direction 6 in the chroma array. However, it will also be noted that some luma directions, approximately half of them, have no corresponding chroma direction. An example is the luma direction numbered 3. Also, some chroma directions (2-5) have no equivalent in the luma array, and some luma directions (31-34) have no equivalent in the chroma array. But in general, the superposition as shown in FIG. 24 demonstrates that it would be inappropriate to use the same angle for both the luma and chroma channels.

Figure 33:
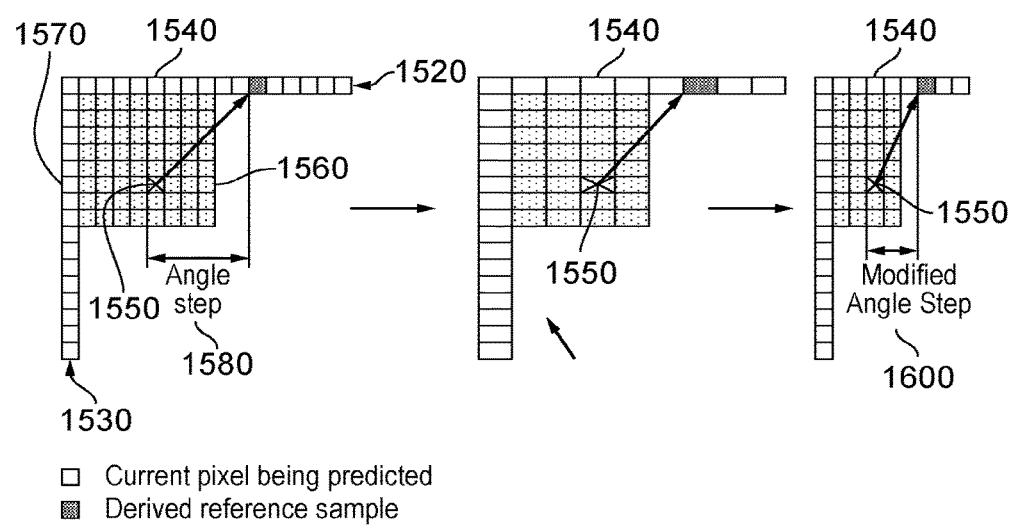
FIG. 33 schematically illustrates the modification of angle steps.
Figure 34:
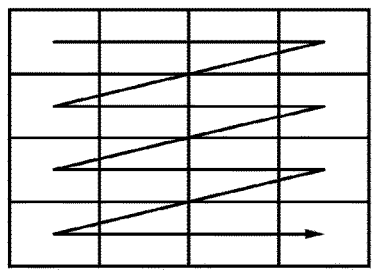
FIGS. 34 and 35 schematically illustrate scan patterns.

FIG. 33 schematically illustrates an arrangement (which may be implemented as part of the function of the controller 343) for modifying an "angle step" defining a prediction direction. In FIG. 33, an angle step is supplied to a modifier 1500 which, by making use of supporting data 1510 such as a look-up table, indexed by an input angle step. mapping input angle steps to output angle steps, or data defining a predetermined modification algorithm or function, maps the direction defined by the input angle step onto a direction defined by the output angle step.

But before discussing the operation of FIG. 33 in detail, some further background on the derivation of prediction angles, and particularly "angle steps", will be provided.

As discussed above, in an intra-prediction operation, samples within a current block may be predicted from one or more reference samples. These are selected from a group of candidate reference samples forming a row above the current block 1560 and a column to the left of the current block. FIG. 33 schematically illustrates such a row 1520 and column 1530 of candidate reference samples.

Within the candidate reference samples, the actual sample to be used for a particular prediction operation is pointed to by the prediction direction. This is expressed as an "angle step". For a predominantly vertical prediction direction (which in this context is one which will address a reference sample in the row 1520), the angle step is an offset to the left or right of a sample position 1540 which is displaced vertically above the position 1550 of a current sample being predicted. For a predominantly horizontal prediction direction (which in this context is one which will address a reference sample in the column 1530), the angle step is an offset above or below a sample position 1570 which is displaced horizontally to the left of the current sample position 1550.

It will therefore be understood that the angle step may be zero (in the case of a pure horizontal or a pure vertical prediction direction), or may represent a displacement in either sense (up/down/left/right).

In fact, for the purposes of calculation within embodiments of the disclosure, the column 1530 and row 1520 may be considered as a single ordered linear array providing a set of candidate reference samples, starting from the bottom of the column 1530 and progressing to the right-end of the row 1520. In embodiments of the disclosure the linear array is filtered (by a filter, forming part of the predictor 530) so as to apply a smoothing or low-pass filtering operation along the linear array. An example of a suitable smoothing filter is a normalized 1-2-1 filter, which is to say that the filter replaces a particular sample (only for the purposes of acting as a reference sample) by the sum of ¼ of the sample to the left (in the linear array), ½ of that sample and ¼ of the sample to the right (in the linear array). The smoothing filter can be applied to all of the array or to a subset of the array (such as the samples originating from the row or the column)

In order to derive the appropriate prediction angle for chroma when (a) DM_CHROMA is selected and (b) the DM_CHROMA mode currently in use indicates that the chroma prediction direction should be that of the co-located luma block, the following procedure is applied by the modifier 1500 to modify the angle step values. Note that the procedure refers to the inverse of the angle step. This value can be used as a convenient feature of the calculations carried out to generate a prediction, but it is the variation of the angle step which is significant to the present discussion.

(i) derive the intra-prediction angle step (and, optionally, its inverse) according to the luma direction (ii) if the luma direction is predominantly vertical (that is, for example, a mode numbered from 18 to 34 inclusive) then the intra-prediction angle step is halved (and its inverse is doubled).

(iii) otherwise, if the luma direction is predominantly horizontal (that is, for example, a mode numbered from 2 to 17 inclusive) then the intra-prediction angle step is doubled (and its inverse halved).

These calculations represent an example of the application by the modifier 1500 of a predetermined algorithm to modify the angle step values, in order to map a direction derived in respect of a luma grid of sample positions onto a direction applicable to a 4:2:2 or other subsampled chroma grid of sample positions. A similar outcome could be obtained by the modifier 1500 referring instead to a look-up table mapping input angle steps to output angle steps.

Accordingly, in these embodiments the prediction direction defines a sample position relative to a group of candidate reference samples comprising a horizontal row and a vertical column of samples respectively disposed above and to the left of the set of current samples to be predicted. The predictor 530 implements a filtering operation which, as discussed above, orders the group of candidate reference samples as a linear array of reference samples; and applies a smoothing filter to the linear array reference samples in a direction along the linear array.

The process of carrying out the mapping can be carried out, for example, with respect to angle steps, in which a prediction direction for a current sample is defined with an associated angle step; the angle step for a predominantly vertical prediction direction is an offset along the horizontal row of sample positions of the group of candidate reference samples, relative to a sample position in that row which is vertically displaced from the current sample; the angle step for a predominantly horizontal prediction direction is an offset along the vertical column of sample positions of the group of candidate reference samples, relative to a sample position in that column which is horizontally displaced from the current sample; and the sample position along the horizontal row or vertical column indicated by the offset provides a pointer to a sample position to be used in prediction of the current sample.

In some embodiments, the step of applying the direction mapping can comprise applying a predetermined function to the angle step corresponding to the first prediction direction. An example of such a function is that described above, namely:

deriving an angle step according to the first prediction direction; and (i) if the first prediction direction is predominantly vertical then halving the respective angle step to generate an angle step of the second prediction direction; or (ii) if the first prediction direction is predominantly horizontal then doubling the respective angle step to generate an angle step of the second prediction direction.

In embodiments of the disclosure, if the angle step (such as the modified step as derived above) is not an integer, the angle step is used to define a group of two or more samples positions within the group of candidate reference samples (for example, the two samples either side of the position pointed to by that direction) for interpolation to provide a prediction of the current sample.

In other embodiments of the disclosure the step of applying the direction mapping comprises using the first prediction direction to index a look-up table, the table providing corresponding values of the second prediction direction.

According to embodiments of the disclosure, the step of detecting the first prediction direction can comprise: in the case of an encoding operation, selecting a prediction direction according to a trial of two or more candidate prediction directions; or in the case of a decoding operation, detecting information defining a prediction direction associated with the video data to be decoded. This is a general point distinguishing embodiments of coding and decoding systems: in a decoder, certain parameters are provided in eth encoded data or associated with it. In an encoder, such parameters are generated for communication with the encoded data to the decoder.

In embodiments of the disclosure, the first prediction direction is used for prediction of luminance samples of a set of samples; and the second prediction direction derived by the applying step from that first prediction direction is used for prediction of chrominance samples of that set of samples.

Embodiments of the disclosure can provide a video coding or decoding method in which luminance and first and second chrominance component samples are predicted according to a prediction mode associated with a sample to be predicted, the method comprising predicting samples of the second chrominance component from samples of the first chrominance component.

Embodiments of the disclosure can provide a video coding or decoding method in which sets of samples are predicted from other respective reference samples according to a prediction direction associated with a sample to be predicted, the prediction direction defining a sample position, relative to a group of candidate reference samples disposed relative to the set of current samples to be predicted, the method comprising:

ordering the group of candidate reference samples as a linear array of reference samples; and applying a smoothing filter to a subset of the linear array of reference samples in a direction along the linear array.

Embodiments of the disclosure can provide a video coding or decoding method in which luminance and chrominance samples of an image are predicted from other respective reference samples derived from the same image according to a prediction direction associated with a sample to be predicted, the chrominance samples having a lower horizontal and/or vertical sampling rate than the luminance samples so that the ratio of luminance horizontal resolution to chrominance horizontal resolution is different to the ratio of luminance vertical resolution to chrominance vertical resolution so that a block of luminance samples has a different aspect ratio to a corresponding block of chrominance samples, the chrominance samples representing first and second chrominance components;

the method comprising:

selecting a prediction mode defining a selection of one or more reference samples or values for predicting a current chrominance sample of the first chrominance component; and selecting a different prediction mode defining a different selection of one or more reference samples or values for predicting a current chrominance sample of the second chrominance component, co-sited with the current chrominance sample of the first chrominance component.

Embodiments of the disclosure can provide a video coding or decoding method in which luminance and chrominance samples are predicted from other respective reference samples according to a prediction direction associated with a sample to be predicted, the chrominance samples having a lower horizontal and/or vertical sampling rate than the luminance samples so that the ratio of luminance horizontal resolution to chrominance horizontal resolution is different to the ratio of luminance vertical resolution to chrominance vertical resolution so that a block of luminance samples has a different aspect ratio to a corresponding block of chrominance samples; the method comprising:

applying a different respective prediction algorithm to the luminance and chrominance samples in dependence upon the difference in aspect ratio.

FIG. 33 shows an example of this technique in use. An angle step 1580 is derived according to the luma grid. (It is possible that it is also used in respect of the luma sample prediction, but it is enough for the present discussion that it is derived according to the luma grid and procedures. In other words, it may not in fact be used for luma prediction). An array of 4:2:2 chroma samples 1580 are shown as being double-width on the same grid; but using the same prediction direction 1590 points to a different reference sample (a different offset from the vertically located sample 1540) in such a case. Therefore, the angle step is modified according to the procedure set out above so as to provide a modified angle step 1600 which points to the correct chroma reference sample to represent the same prediction direction in the chroma grid.

Accordingly these embodiments of the present disclosure relate to video coding or decoding methods, apparatus or programs in which luminance and chrominance samples are predicted from other respective reference samples according to a prediction direction associated with a current sample to be predicted. In modes such as 4:2:2 the chrominance samples have a lower horizontal and/or vertical sampling rate than the luminance samples so that the ratio of luminance horizontal resolution to chrominance horizontal resolution is different to the ratio of luminance vertical resolution to chrominance vertical resolution. In short, this means that a block of luminance samples has a different aspect ratio to a corresponding block of chrominance samples.

The intra frame predictor 530, for example, is operable as a detector to detect a first prediction direction defined in relation to a first grid of a first aspect ratio in respect of a set of current samples to be predicted; and as a direction mapper to apply a direction mapping to the prediction direction so as to generate a second prediction direction defined in relation to a second grid of a different aspect ratio. Accordingly, the predictor 530 represents an example of a direction mapper. The predictor 540 may provide another corresponding example.

In embodiments of the disclosure, the first grid, used to detect the first prediction direction, is defined in respect of sample positions of one of luminance or chrominance samples, and the second grid, used to detect the second prediction direction, is defined in respect of samples positions of the other of luminance or chrominance samples. In the particular examples discussed in the present description, the luminance prediction direction may be modified to provide the chrominance prediction direction. But the other way round could be used.

The technique is particularly applicable to intra-prediction, so that the reference samples are samples derived from (for example, reconstructed from compressed data derived from) the same respective image as the samples to be predicted.

In at least some arrangements the first prediction direction is defined with respect to a square block of luminance samples including the current luminance sample; and the second prediction direction is defined with respect to a rectangular block of chrominance samples including the current chrominance sample.

It is possible to provide independent prediction modes for the two chrominance components. In such an arrangement the chrominance samples comprise samples of first and second chrominance components, and the technique comprises applying the direction mapping discussed above step in respect of the first chrominance component (such as Cb); and providing a different prediction mode in respect of the second chrominance component (such as Cr), which may (for example) involve predicting the second chrominance component from samples of the first chrominance component.

The video data can be in a 4:2:2 format, for example.

In the case of a decoder or decoding method, the prediction directions may be detected by detecting data defining the prediction directions in the encoded video data.

In general terms, embodiments of the disclosure can provide for independent prediction modes for the chrominance components (for example, for each of the luminance and chrominance components separately). These embodiments relate to video coding methods in which luminance and chrominance samples of an image are predicted from other respective reference samples derived from the same image according to a prediction direction associated with a sample to be predicted, the chrominance samples having a lower horizontal and/or vertical sampling rate than the luminance samples so that the ratio of luminance horizontal resolution to chrominance horizontal resolution is different to the ratio of luminance vertical resolution to chrominance vertical resolution so that a block of luminance samples has a different aspect ratio to a corresponding block of chrominance samples, and the chrominance samples representing first and second chrominance components.

The intra frame mode selector 520 selects a prediction mode defining a selection of one or more reference samples for predicting a current chrominance sample of the first chrominance component (such as Cb). It also selects a different prediction mode defining a different selection of one or more reference samples for predicting a current chrominance sample of the second chrominance component (such as Cr), co-sited with the current chrominance sample of the first chrominance component.

A reference sample filter can optionally be applied to horizontal samples or vertical samples (or both). As discussed above, the filter can be a 3-tap normalized "1 2 1" filter, currently applied to all luma reference samples except the bottom left and top right (the samples of a N×N block are gathered together to form a single 1D array of size 2N+1, and then optionally filtered). In embodiments of the disclosure it is applied only the first (left hand edge) or last (top edge) N+1 chroma samples for 4:2:2, but noting that the bottom left, top right and top left would then not be adjusted; or all chroma samples (as for luma), for 4:2:2 and 4:4:4.

Embodiments of the disclosure can also provide video coding or decoding methods, apparatus or programs in which luminance and first and second chrominance component samples are predicted (for example, from other respective reference samples or values) according to a prediction mode associated with a sample to be predicted, involving predicting samples of the second chrominance component from samples of the first chrominance component. In some embodiments the prediction mode associated with a sample to be predicted can indicate a prediction direction defining one or more other respective reference samples from which that sample is to be predicted.

Embodiments of the disclosure can also provide video coding or decoding methods, apparatus or programs in which luminance and first and second chrominance component samples are predicted from other respective reference samples according to a prediction direction associated with a sample to be predicted, involving filtering the reference samples.

Figure 19:
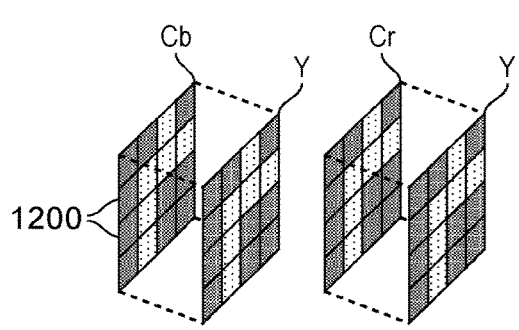
FIG. 19 schematically illustrates the use of co-located information from chroma and luma blocks.
Figure 20:
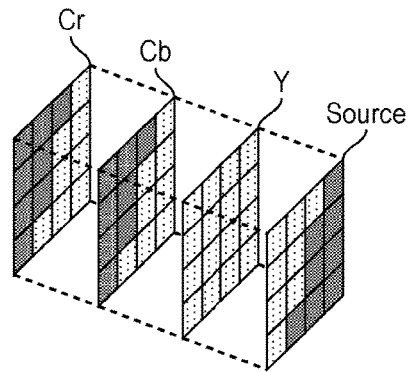
FIG. 20 schematically illustrates a situation in which co-located information from one chroma channel is used in respect of another chroma channel.

As discussed with reference to FIGS. 19 and 20, it is possible that the different prediction mode comprises a mode by which samples of the second chrominance component are predicted from samples of the first chrominance component.

Note that modes 0 and 1 are not angular prediction modes and so are not included in this procedure. The effect of the procedure shown above is to map the chroma prediction directions onto the luma prediction directions in FIG. 24.

For 4:2:0, when either a purely horizontal prediction mode (luma mode 10) or a purely vertical prediction mode (luma mode 26) is selected, the top or left edges of the predicted TU are subject to filtering for the luma channel only. For the horizontal prediction mode, the top row is filtered in the vertical direction. For the vertical prediction mode, the left column is filtered in the horizontal direction.

Filtering a column of samples in the horizontal direction can be understood as applying a horizontally oriented filter to each sample in turn of the column of samples. So, for an individual sample, its value will be modified by the action of the filter, based on a filtered value generated from the current value of that sample and of one or more other samples at sample positions displaced from that sample in a horizontal direction (that is, one or more other samples to the left and/or right of the sample in question).

Filtering a row of samples in the vertical direction can be understood as applying a vertically oriented filter to each sample in turn of the row of samples. So, for an individual sample, its value will be modified by the action of the filter, based on a filtered value generated from the current value of that sample and of one or more other samples at sample positions displaced from that sample in a vertical direction (that is, one or more other samples above and/or below the sample in question).

One purpose of the edge pixel filtering process described above is to aim to reduce block based edge effects in the prediction thereby aiming to reduce energy in the residual image data.

In embodiments of the disclosure, a corresponding filtering process is also provided for chroma TUs in 4:4:4 and 4:2:2. Taking into account the horizontal subsampling, one proposal is only to filter the top row of the chroma TU in 4:2:2, but to filter both the top row and left column (as appropriate, according to the selected mode) in 4:4:4. It is considered appropriate to filter only in these regions so as to avoid filtering out too much useful detail, which (if filtered out) would lead to an increased energy of the residual data.

For 4:2:0, when DC mode is selected, the top and/or left edges of the predicted TU are subject to filtering for the luma channel only.

The filtering may be such that in DC Mode, the filter does a (1×neighbouring outside sample+3*edge sample)/4 averaging operation for all samples on both edges. However, for the top left the filter function is (2×current sample+1×above sample+1×left sample)/4.

The H/V filter is an average between neighbouring outside sample and edge sample.

In embodiments of the disclosure, this filtering process is also provided for chroma TUs in 4:4:4 and 4:2:2. Again, taking into account the horizontal subsampling, in some embodiments of the disclosure, only the top row of the chroma samples is filtered for 4:2:2, but the top row and left column of the chroma TU are filtered for 4:4:4.

Accordingly, this technique can apply in respect of a video coding or decoding method, apparatus or program in which luminance and chrominance samples in a 4:4:4 format or a 4:2:2 format are predicted from other respective samples according to a prediction direction associated with blocks of samples to be predicted.

In embodiments of the technique, a prediction direction is detected in respect of a current block to be predicted. A predicted block of chrominance samples is generated according to other chrominance samples defined by the prediction direction. If the detected prediction direction is substantially vertical (for example, being within +/−n angle modes of the exactly vertical mode where n is (for example) 2), the left column of samples is filtered (for example, in a horizontal direction) in the predicted block of chrominance samples. Or, if the detected prediction direction is substantially horizontal (for example, being within +/−n angle modes of the exactly horizontal mode, where n is (for example) 2), the top row of samples is filtered (for example, in a vertical direction) in the predicted block of chrominance samples. Then the difference between the filtered predicted chrominance block and the actual chrominance block is encoded, for example as residual data. Alternatively, the test could be for an exactly vertical or horizontal mode rather than a substantially vertical or horizontal mode. The tolerance of +/−n could be applied to one of the tests (vertical or horizontal) but not the other.

Inter-Prediction

It is noted that inter prediction in HEVC already allows rectangular PUs, so 4:2:2 and 4:4:4 modes are already compatible with PU inter-prediction processing.

Each frame of a video image is a discrete sampling of a real scene, and as a result each pixel is a step-wise approximation of a real-world gradient in colour and brightness.

In recognition of this, when predicting the Y, Cb or Cr value of a pixel in a new video frame from a value in a previous video frame, the pixels in that previous video frame are interpolated to create a better estimate of the original real-world gradients, to allow a more accurate selection of brightness or colour for the new pixel. Consequently the motion vectors used to point between video frames are not limited to an integer pixel resolution. Rather, they can point to a sub-pixel position within the interpolated image.

4:2:0 Inter-Prediction

Figure 26:
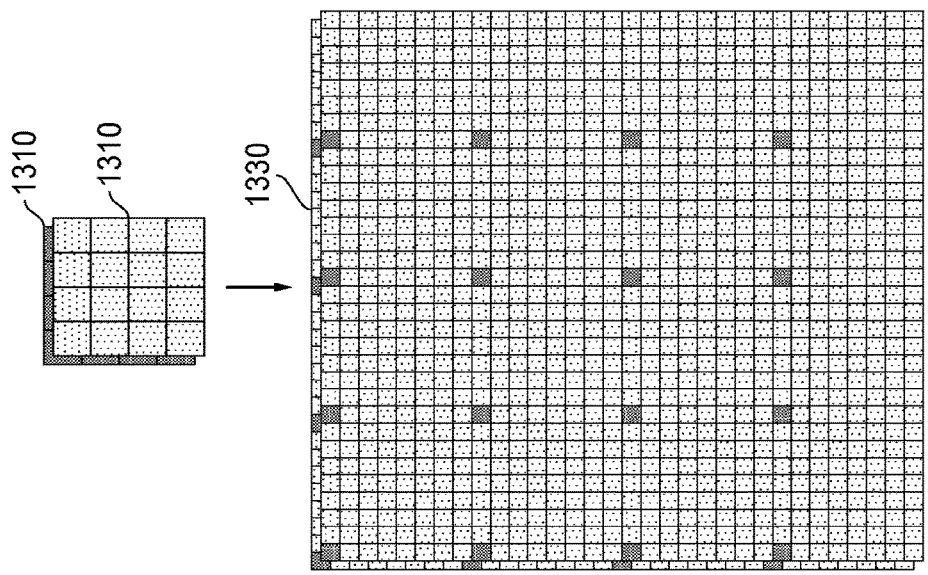
FIGS. 25-28 schematically illustrate luma and chroma pixel interpolation.
Figure 25:
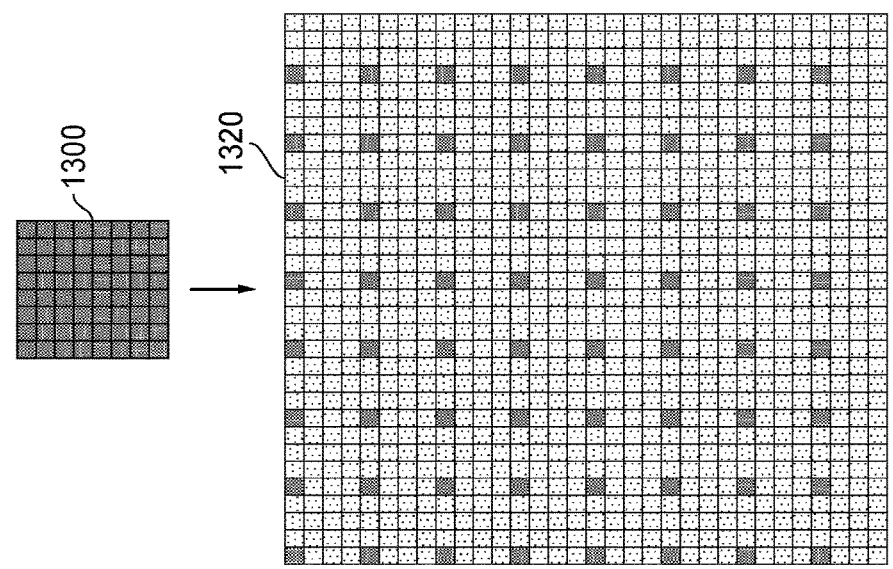

Referring now to FIGS. 25 and 26, in the 4:2:0 scheme as noted above typically an 8×8 luma PU 1300 will be associated with Cb and Cr 4×4 chroma PUs 1310. Consequently to interpolate the luma and chroma pixel data up to the same effective resolution, different interpolation filters are used.

For example for the 8×8 4:2:0 luma PU, interpolation is ¼ pixel, and so an 8-tap×4 filter is applied horizontally first, and then the same 8-tap×4 filter is applied vertically, so that the luma PU is effectively stretched 4 times in each direction, to form an interpolated array 1320 as shown in FIG. 25. Meanwhile the corresponding 4×4 4:2:0 chroma PU is ⅛ pixel interpolated to generate the same eventual resolution, and so a 4-tap×8 filter is applied horizontally first, then the same 4-tap×8 filter is applied vertically, so that the 4:2:0 chroma PUs are effectively stretched 8 times in each direction to form an array 1330, as shown in FIG. 26.

4:2:2 Inter-Prediction

A similar arrangement for 4:2:2 will now be described with reference to FIGS. 27 and 28, which illustrate a luma PU 1350 and a pair of corresponding chroma PUs 1360.

Figure 28:
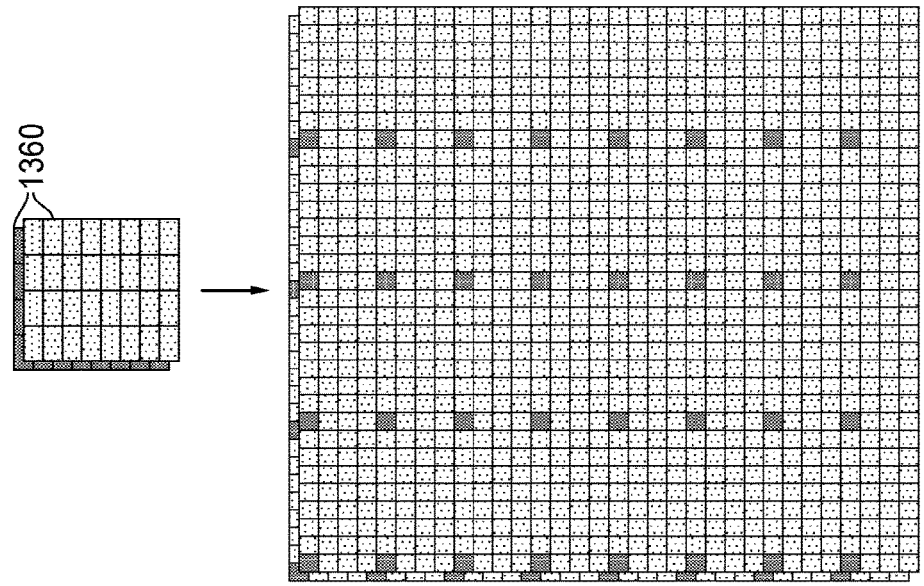

Referring to FIG. 28, as noted previously, in the 4:2:2 scheme the chroma PU 1360 can be non-square, and for the case of an 8×8 4:2:2 luma PU, will typically be a 4 wide×8 high 4:2:2 Chroma PU for each of the Cb and Cr channels. Note that the chroma PU is drawn, for the purposes of FIG. 28, as a square shaped array of non-square pixels, but in general terms it is noted that the PUs 1360 are 4 (horizontal)×8 (vertical) pixel arrays.

Whilst it may be possible therefore to use the existing 8-tap×4 luma filter vertically on the chroma PU, in an embodiment of the present disclosure it has been appreciated that the existing 4-tap×8 chroma filter would suffice for vertical interpolation as in practice one is only interested in the even fractional locations of the interpolated chroma PU.

Figure 27:
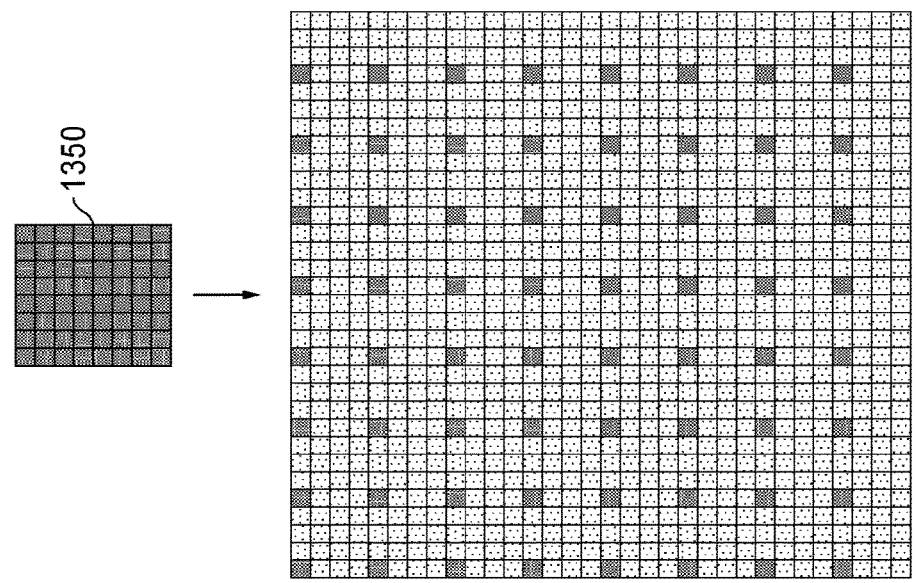
Figure 32:
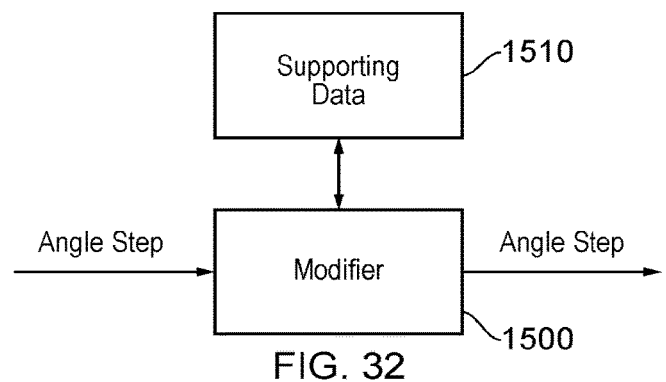
FIG. 32 schematically illustrates an arrangement for modifying an angle step.

Hence FIG. 27 shows the 8×8 4:2:2 luma PU 1350 interpolated as before with an 8-tap×4 filter, and the 4×8 4:2:2 chroma PUs 1360 interpolated with the existing 4-tap×8 chroma filter in the horizontal and vertical direction, but only with the even fractional results used for forming the interpolated image in the vertical direction.

These techniques are applicable to video coding or decoding methods, apparatus or programs using inter-image prediction to encode input video data in which each chrominance component has 1/Mth of the horizontal resolution of the luminance component and 1/Nth of the vertical resolution of the luminance component, where M and N are integers equal to 1 or more, For example, For 4:2:2, M=2, N=1. For 4:2:0, M=2, N=2.

The frame store 570 is operable to store one or more images preceding a current image.

The interpolation filter 580 is operable to interpolate a higher resolution version of prediction units of the stored images so that the luminance component of an interpolated prediction unit has a horizontal resolution P times that of the corresponding portion of the stored image and a vertical resolution Q times that of the corresponding portion of the stored image, where P and Q are integers greater than 1. In the current examples, P=Q=4 so that the interpolation filter 580 is operable to generate an interpolated image at ¼ sample resolution.

The motion estimator 550 is operable to detect inter-image motion between a current image and the one or more interpolated stored images so as to generate motion vectors between a prediction unit of the current image and areas of the one or more preceding images.

The motion compensated predictor 540 is operable to generate a motion compensated prediction of the prediction unit of the current image with respect to an area of an interpolated stored image pointed to by a respective motion vector.

Returning to a discussion of the operation of the interpolation filter 580, embodiments of this filter are operable to apply applying a xR horizontal and xS vertical interpolation filter to the chrominance components of a stored image to generate an interpolated chrominance prediction unit, where R is equal to (U×M×P) and S is equal to (V×N×Q), U and V being integers equal to 1 or more; and to subsample the interpolated chrominance prediction unit, such that its horizontal resolution is divided by a factor of U and its vertical resolution is divided by a factor of V, thereby resulting in a block of MP×NQ samples.

So, in the case of 4:2:2, the interpolation filter 580 applies a ×8 interpolation in the horizontal and vertical directions, but then vertically subsamples by a factor of 2, for example by using every $2^{nd}$ sample in the interpolated output.

This technique therefore allows the same (for example, ×8) filter to be used in respect of 4:2:0 and 4:2:2, but with a further step of subsampling where needed with 4:2:2.

In embodiments of the disclosure, as discussed, the interpolated chrominance prediction unit has a height in samples twice that of a 4:2:0 format prediction unit interpolated using the same xR and xS interpolation filters.

The need to provide different filters can be avoided or alleviated using these techniques, and in particular by using the same xR horizontal and xS vertical interpolation filters, in respect of 4:2:0 input video data and 4:2:2 input video data.

As discussed, the step of subsampling the interpolated chrominance prediction unit comprises using every Vth sample of the interpolated chrominance prediction unit in the vertical direction, and/or using every Uth sample of the interpolated chrominance prediction unit in the vertical direction.

Embodiments of the disclosure can involve deriving a luminance motion vector for a prediction unit; and independently deriving one or more chrominance motion vectors for that prediction unit.

In embodiments of the disclosure, at least one of R and S is equal to 2 or more, and in embodiments of the disclosure the xR horizontal and xS vertical interpolation filters are also applied to the luminance components of the stored image.

4:4:4 Inter-Prediction Variants

By extension, the same principle of only using the even fractional results for the existing 4-tap×8 chroma filter can be applied both vertically and horizontally for the 8×8 4:4:4 chroma PUs.

Further to these examples, the ×8 chroma filter may be used for all interpolation, including luma.

Further Inter-Prediction Variants

In one implementation of motion vector (MV) derivation, one vector is produced for a PU in a P-slice (and two vectors for a PU in a B-slice (where a P-slice takes predictions from a preceding frame, and a B-slice takes predictions from a preceding and following frame, in a similar manner to MPEG P and B frames). Notably, in this implementation in the 4:2:0 scheme the vectors are common to all channels, and moreover, the chroma data need not be used to calculate the motion vectors. In other words, all the channels use a motion vector based on the luma data.

In an embodiment of the present disclosure, in the 4:2:2 scheme the chroma vector could be derived so as to be independent from luma (i.e. a single vector for the Cb and Cr channels could be derived separately), and in the 4:4:4 scheme chroma vectors could further be independent for each of the Cb and Cr channels.

Embodiments of the disclosure can provide a video coding or decoding method in which luminance and chrominance samples of an image are predicted from other respective reference samples derived from the same image according to a prediction mode associated with a sample to be predicted, the chrominance samples representing first and second chrominance components; the method comprising: selecting, for at least some samples, the same prediction mode for each of the luminance and chrominance components corresponding to an image region.

Embodiments of the disclosure can provide a video coding or decoding method in which luminance and chrominance samples of an image are predicted from other respective reference samples derived from the same image according to a prediction mode associated with a sample to be predicted, the chrominance samples representing first and second chrominance components; the method comprising: selecting, for at least some samples, different respective prediction modes for each of the luminance and chrominance components corresponding to an image region.

In either case, either the same prediction mode or different respective prediction modes can be used for each of the luminance and chrominance components corresponding to an image region, the selection being made according to an image sequence, an image, or a region of an image.

To select a prediction mode scheme in an encoding operation, the embodiments can for example carry out a first trial encoding of an image region using the same prediction mode for the luminance and chrominance components; carry out a second trial encoding of that image region using different respective prediction modes for the luminance and chrominance components; and select either the same prediction mode or different respective prediction modes for use in respect of a picture sequence, a picture, or a region of a picture on the basis of the data encoded by the first and second trial encodings.

The processing of the trial results can, in embodiments of the disclosure, involve detecting one or more predetermined properties of the data encoded by the first and second trial encodings; and selecting either the same prediction mode or different respective prediction modes for use in respect of a picture sequence, a picture, or a region of a picture on the basis of the detected one or more properties. The one or more properties can, for example, comprise properties selected from the set consisting of: image noise; image distortion; and image data quantity. The selection can be made for individual image slices or image blocks. Embodiments of the disclosure are operable to associate information with the encoded video signal (for example, as part of the encoded data stream, as one or more data flags within the data stream) indicating: whether the same prediction modes or different prediction modes are used; and in the case that the same prediction mode is used, an identification of that single prediction mode; or in the case that different respective prediction modes are used, an identification of those different respective prediction modes, for example using the numbering scheme discussed in this application in respect of prediction modes.

For embodiments carrying out a decoding operation, the method may comprise: detecting information associated with video data for decoding, the information defining whether the same prediction mode or different prediction modes are associated with the video data for decoding. If such information (for example, a one-bit flag at a predetermined position with respect to the data stream) indicates that the same prediction modes are used, the decoder applies the prediction mode information defined in respect of one component (such as luma) to the decoding of the other components (such as chroma). Otherwise, the decoder applies the individually specified prediction modes to each component.

In embodiments of the disclosure, as discussed, the image forms part of a 4:2:2 or a 4:4:4 video signal.

Transforms

In HEVC, most images are encoded as motion vectors from previously encoded/decoded frames, with the motion vectors telling the decoder where, in these other decoded frames, to copy good approximations of the current image from. The result is an approximate version of the current image. HEVC then encodes the so-called residual, which is the error between that approximate version and the correct image. This residual requires much less information than specifying the actual image directly. However, it is still generally preferable to compress this residual information to reduce the overall bitrate further.

In many encoding methods including HEVC, such data is transformed into the spatial frequency domain using an integer cosine transform (ICT), and typically some compression is then achieved by retaining low spatial frequency data and discarding higher spatial frequency data according to the level of compression desired.

4:2:0 Transforms

The spatial frequency transforms used in HEVC are conventionally ones that generate coefficients in powers of 4 (for example 64 frequency coefficients) as this is particularly amenable to common quantisation/compression methods. The square TUs in the 4:2:0 scheme are all powers of 4 and hence this is straightforward to achieve.

If the NSQT options are enabled, some non-square transforms are available for non-square TUs, such as 4×16, but again notably these result in 64 coefficients, i.e. again a power of 4.

4:2:2 and 4:4:4 Transform Variants

The 4:2:2 scheme can result in non-square TUs that are not powers of 4; for example a 4×8 TU has 32 pixels, and 32 is not a power of 4.

In an embodiment of the present disclosure therefore, a non-square transform for a non-power of 4 number of coefficients may be used, acknowledging that modifications may be required to the subsequent quantisation process.

Alternatively, in an embodiment of the present disclosure non-square TUs are split into square blocks having a power of 4 area for transformation, and then the resulting coefficients can be interleaved.

For example, for 4×8 blocks odd/even vertical samples can be split into two square blocks. Alternatively, for 4×8 blocks the top 4×4 pixels and the bottom 4×4 pixels could form two square blocks. Alternatively again, for 4×8 blocks a Haar wavelet decomposition can be used to form a lower and an upper frequency 4×4 block.

Any of these options may be made available, and the selection of a particular alternative may be signalled to or derived by the decoder.

Other Transform Modes

In the 4:2:0 scheme there is a proposed flag (the so-called 'qpprime_y_zero_transquant_bypass_flag') allowing the residual data to be included in the bit stream losslessly (i.e. without being transformed, quantised or further filtered). In the 4:2:0 scheme the flag applies to all channels.

Accordingly, such embodiments represent a video coding or decoding method, apparatus or program in which luminance and chrominance samples are predicted and the difference between the samples and the respective predicted samples is encoded, making use of an indicator configured to indicate whether luminance difference data is to be included in an output bitstream losslessly; and to independently indicate whether chrominance difference data is to be included in the bitstream losslessly.

In an embodiment of the present disclosure, it is proposed that the flag for the luma channel is separate to the chroma channels. Hence for the 4:2:2 scheme, such flags should be provided separately for the luma channel and for the chroma channels, and for the 4:4:4 scheme, such flags should be provided either separately for the luma and chroma channels, or one flag is provided for each of the three channels. This recognises the increased chroma data rates associated with the 4:2:2 and 4:4:4 schemes, and enables, for example, lossless luma data together with compressed chroma data.

For intra-prediction coding, mode-dependent directional transform (MDDT) allows the horizontal or vertical ICT (or both ICTs) for a TU to be replaced with an Integer Sine Transform depending upon the intra-prediction direction. In the 4:2:0 scheme this is not applied to chroma TUs. However in an embodiment of the present disclosure it is proposed to apply it to 4:2:2 and 4:4:4 chroma TUs, noting that the IST is only currently defined for a 4 sample transform dimensions (either horizontally or vertically), and therefore cannot currently be applied vertically to a 4×8 chroma TU. MDDT will be discussed further below.

In methods of video coding, the various embodiments of the disclosure can be arranged so as to indicate whether luminance difference data is to be included in an output bitstream losslessly; and independently to indicate whether chrominance difference data is to be included in the bitstream losslessly, and to encode or include the relevant data in the form defined by such indications.

Quantisation

In the 4:2:0 scheme, the quantisation calculation is the same for chrominance as for luminance. Only the quantisation parameters (QPs) differ.

QPs for chrominance are calculated from the luminance QPs as follows:

$$Qp_{Cb} = \text{scalingTable}[Qp_{luminance} + \text{chroma\_qp\_index\_offset}]$$

$$Qp_{Cr} = \text{scalingTable}[Qp_{luminance} + \text{second\_chroma\_qp\_index\_offset}]$$

where the scaling table is defined as seen in FIG. 29a or 29b (for 4:2:0 and 4:2:2 respectively), and "chroma_qp_index_offset" and "second_chroma_qp_index_offset" are defined in the picture parameter set and may be the same or different for Cr and Cb. In other words, the value in square brackets defines in each case an "index" into the scaling table (FIG. 29a and FIG. 29b) and the scaling table then gives a revised value of Qp ("value").

Note that "chroma_qp_index_offset" and "second_chroma_qp_index_offset" may instead be referred to as cb_qp_offset and cr_qp_offset respectively.

Chrominance channels typically contain less information than luminance and hence have smaller-magnitude coefficients; this limitation on the chrominance QP may prevent all chrominance detail being lost at heavy quantisation levels.

The QP-divisor relationship in the 4:2:0 is a logarithmic one such that an increase of 6 in the QP is equivalent to a doubling of the divisor (the quantisation step size discussed elsewhere in this description, though noting that it may be further modified by Qmatrices before use). Hence the largest difference in the scaling table of 51−39=12 represents a factor-of-4 change in the divisor.

However, in an embodiment of the present disclosure, for the 4:2:2 scheme, which potentially contains twice as much chroma information as the 4:2:0 scheme, the maximum chrominance QP value in the scaling table may be raised to 45 (i.e. halving the divisor). Similarly for the 4:4:4 scheme, the maximum chrominance QP value in the scaling table may be raised to 51 (i.e. the same divisor). In this case the scaling table is in effect redundant, but may be retained simply for operational efficiency (i.e. so that the system works by reference to a table in the same way for each scheme). Hence more generally in an embodiment of the present disclosure the chroma QP divisor is modified responsive to the amount of information in the coding scheme relative to the 4:2:0 scheme.

Accordingly, embodiments of the disclosure apply to a video coding or decoding method operable to quantise blocks of frequency-transformed luminance and chrominance component video data in a 4:4:4 or a 4:2:2 format according to a selected quantisation parameter which defines a quantisation step size. A quantisation parameter association (such as, for example, the appropriate table in FIG. 29a or 29b) is defined between luminance and chrominance quantisation parameters, where the association is such that a maximum chrominance quantisation step size is less than a maximum luminance quantisation step size for the 4:2:2 format (for example, 45) but equal to the maximum luminance quantisation step size for the 4:4:4 format (for example, 51). The quantisation process operates in that each component of the frequency-transformed data is divided by a respective value derived from the respective quantisation step size, and the result is rounded to an integer value, to generate a corresponding block of quantised spatial frequency data.

It will be appreciated that the dividing and rounding steps are indicative examples of a generic quantising stage, according to the respective quantisation step size (or data derived from it, for example by the application of Qmatrices).

Embodiments of the disclosure include the step of selecting a quantisation parameter or index (QP for luminance) for quantising the spatial frequency coefficients, the quantisation parameter acting as a reference to a respective one of a set of quantisation step sizes according to the QP tables applicable to luminance data. The process of defining the quantisation parameter association can then comprise: for chrominance components, referencing a table of modified quantisation parameters (such as the table of FIG. 29a or 29b) according to the selected quantisation parameter, which in turn can involve (i) for the first chrominance component, adding a first offset (such as chroma_qp_index_offset) to the quantisation parameter and selecting the modified quantisation index corresponding to the entry, in the table, for the quantisation index plus the first offset; and (ii) for the second chrominance component, adding a second offset (such as second_chroma_qp_index_offset) to the quantisation parameter and selecting the modified quantisation index corresponding to the entry, in the table, for the quantisation index plus the second offset; and referencing a respective quantisation step size in the set according to the quantisation parameter for the luminance data and the first and second modified quantisation indices for the first and second chrominance components. Viewed in a different way, this is an example of a process involving selecting a quantisation parameter for quantising the spatial frequency coefficients, the quantisation parameter acting as a reference to a respective one of a set of quantisation step sizes; and in which the defining step comprises: for chrominance components, referencing a table of modified quantisation parameters according to the selected quantisation parameter, the referencing step comprising: for each chrominance component, adding a respective offset to the quantisation parameter and selecting the modified quantisation parameter corresponding to the entry, in the table, for the quantisation parameter plus the respective offset; and referencing a respective quantisation step size in the set according to the quantisation parameter for the luminance data and the first and second modified quantisation parameters for the first and second chrominance components.

The techniques are particularly applicable to arrangements in which successive values of the quantisation step sizes in the set are related logarithmically, so that a change in quantisation parameter of m (where m is an integer) represents a change in quantisation step size by a factor of p (where p is an integer greater than 1). In the present embodiments, m=6 and p=2.

In embodiments of the disclosure, as discussed above, a maximum luminance quantisation parameter is 51; a maximum chrominance quantisation parameter is 45 for the 4:2:2 format; and a maximum chrominance quantisation parameter is 51 for the 4:4:4 format.

In embodiments of the disclosure, the first and second offsets can be communicated in association with the encoded video data.

In 4:2:0 the transform matrices A are initially created (by the transform unit 340) from those of a true normalised N×N DCT A' using:

$$A_{ij} = int(64 \times \sqrt{N} \times A'_{ij})$$

where i and j indicate a position within the matrix. This scaling with respect to a normalised transform matrix provides an increase in precision, avoids the need for fractional calculations and increases the internal precision.

Ignoring differences due to rounding of Aij, since X is multiplied by both A and $A^T$ (the transposition of the matrix A) the resulting coefficients differ from those of a true normalised M×N (M=height; N=width) DCT by a common scaling factor of:

$$(64 \times \sqrt{N})(64 \times \sqrt{M}) = 4096\sqrt{NM}$$

Note that the common scaling factor could be different to this example. Note also that matrix multiplying by both A and $A^T$ can be carried out in various ways, such as the so-called Butterfly method. The significant fact is whether the operation that is carried out is equivalent to a traditional matrix multiplication, not whether it is performed in a particular traditional order of operations.

This scaling factor is equivalent to a binary left-shift bitwise operation by a number of bits transformShift, since in HEVC this results in a power of 2:

transformShift=(12+0.5 $\log_2(N)$+0.5 $\log_2(M)$)

To reduce the requirement on internal bit-precision, the coefficients are right-shifted (using positive rounding) twice during the transform process:

shift1=$\log_2(N)$+bitDepth−9 shift2=$\log_2(M)$+6

As a result, the coefficients as they leave the forward transform process and enter the quantiser are effectively left-shifted by:

$$\begin{aligned}resultingShift &= (12 + 0.5\log_2(NM)) - (shift1 + shift2)\\ &= (12 + 0.5\log_2(N) + 0.5\log_2(M)) -\\ &\quad (\log_2(N) + bitDepth - 9 + \log_2(M) + 6)\\ &= 15 - (0.5\log_2(N) + 0.5\log_2(M) + bitDepth)\end{aligned}$$

In 4:2:0, the frequency separated (for example, DCT) coefficients generated by the frequency transform are a factor of ($2^{resultingShift}$) larger than those that a normalised DCT would produce.

In some embodiments of the disclosure, the blocks are either square or rectangular with a 2:1 aspect ratio. Therefore, for a block size of N×M, either:

N=M, in which case, resultingShift is an integer and S=N=M=sqrt(NM); or 0.5N=2M or 2N=0.5M, in which case resultingShift is still an integer and S=sqrt(NM)

resultingShift=15−(0.5 $\log_2(N)$+0.5 $\log_2(M)$+bitDepth)=15−($\log_2(S)$+bitDepth)

The coefficients are subsequently quantised, where the quantising divisor is derived according to the quantisation parameter QP.

Note that resultingShift is equivalent to an integer, so the common scaling factor is an integer power of 2, the overall left-shift 'resultingShift' of the transform process is also accounted for at this stage by applying an equal but opposite right-shift, 'quantTransformRightShift'.

This bit-shift operation is possible because resultingShift is an integer.

Also note that the divisor-QP (quantisation parameter or index) relationship follows a base-2 power curve, as mentioned above, in that an increase in QP by 6 has the effect of doubling the divisor whereas an increase in QP by 3 has the effect of increasing the divisor by a factor of sqrt(2) (square root of 2).

Due to the chroma format in 4:2:2, there are more TU width:height (N:M) ratios:

N=M (from before) where S=N=M=sqrt(NM) (resultingShift is an integer)

0.5N=2M and 2N=0.5M, (from before), where S=sqrt(NM) (resultingShift is an integer)

N=2M where S=sqrt(NM)

2M=N where S=sqrt(NM)

4N=0.5M where S=sqrt(NM)

resultingShift=15−($\log_2(S)$+bitDepth)

In these latter three situations, resultingShift is not an integer. For example, this may apply where at least some of the blocks of video data samples comprise M×N samples, where the square root of N/M is not equal to an integer power of 2. Such block sizes can occur in respect of chroma samples in some of the present embodiments.

Accordingly, in such instances, the following techniques are relevant, that is to say, in video coding or decoding methods, apparatus or programs operable to generate blocks of quantised spatial frequency data by performing frequency-transformation on blocks of video data samples using a transform matrix comprising an array of integer values which are each scaled with respect to respective values of a normalized transform matrix by an amount dependent upon a dimension of the transform matrix, and to quantise the spatial frequency data according to a selected quantisation step size, having the step of frequency-transforming a block of video data samples by matrix-multiplying the block by the transform matrix and the transposition of the transform matrix to generate a block of scaled spatial frequency coefficients which are each larger, by a common scaling factor (for example, resultingShift), than the spatial frequency coefficients which would result from a normalized frequency-transformation of that block of video data samples.

Therefore at the quantisation stage, an appropriate bit-shift operation cannot be used to cancel out the operation in a simple manner.

A solution to this is proposed as follows:

At the quantiser stage, apply a right shift:

quantTransformRightShift=15−log 2(S')−bitDepth

Where the value S' is derived such that resultingShift−quantTransformRightShift=+½ quantTransformRightShift is an integer

The difference between shifts of ½ is equivalent to multiplication by sqrt(2), i.e. at this point the coefficients are sqrt(2) times larger than they should be, making the bit shift an integer bit shift.

For the quantisation process, apply a quantisation parameter of (QP+3), meaning that the quantising divisor is effectively increased by a factor of sqrt(2), thus cancelling out the sqrt(2) scale factor from the previous step.

Accordingly, these steps can be summarised (in the context of a video coding or decoding method (or corresponding apparatus or program) operable to generate blocks of quantised spatial frequency data by performing frequency-transformation on blocks of video data samples using a transform matrix comprising an array of integer values which are each scaled with respect to respective values of a normalized transform matrix, and to quantise the spatial frequency data according to a selected quantisation step size, involving frequency-transforming a block of video data samples by matrix-multiplying the block by the transform matrix and the transposition of the transform matrix to generate a block of scaled spatial frequency coefficients which are each larger, by a common scaling factor, than the spatial frequency coefficients which would result from a normalized frequency-transformation of that block of video data samples) as follows: selecting a quantisation step size for quantising the spatial frequency coefficients; applying an n-bit shift (for example, quantTransformRightShift) to divide each of the scaled spatial frequency coefficients by a factor of $2^n$, where n is an integer; and detecting a residual scaling factor (for example, resultingShift−quantTransformRightShift), being the common scaling factor divided by $2^n$.

For example, in the situation discussed above, the quantisation step size is then according to the residual scaling factor to generate a modified quantisation step size; and each of the scaled spatial frequency coefficients in the block is divided by a value dependent upon the modified quantisation step size and rounding the result to an integer value, to generate the block of quantised spatial frequency data. As discussed, the modification of the quantisation step size can be carried out simply by adding an offset to QP so as to select a different quantisation step size when QP is mapped into the table of quantisation step sizes.

The coefficients are now of the correct magnitude for the original QP.

The transform matrix can comprise an array of integer values which are each scaled with respect to respective values of a normalized transform matrix by an amount dependent upon a dimension of the transform matrix.

It follows that the required value for S' can always be derived as follows:

$$S'=\text{sqrt}(2*M*N)$$

As an alternative proposal, S' could be derived such that:

$$\text{resultingShift}-\text{quantTransformRightShift}=-\tfrac{1}{2}$$

In this case, S'=sqrt(½*M*N), and the applied quantisation parameter is (QP−3)

In either of these cases, (adding 3 to QP or subtracting 3 from QP), the step of selecting the quantisation step size comprises selecting a quantisation index (for example, QP), the quantisation index defining a respective entry in a table of quantisation step sizes, and the modifying step comprises changing the quantisation index so as to select a different quantisation step size, such that the ratio of the different quantisation step size to the originally selected quantisation step size is substantially equal to the residual scaling factor.

This works particularly well where, as in the present embodiments, successive values of the quantisation step sizes in the table are related logarithmically, so that a change in quantisation index (for example, QP) of m (where m is an integer) represents a change in quantisation step size by a factor of p (where p is an integer greater than 1). In the present embodiments, m=6 and p=2, so that an increase of 6 in QP represents a doubling of the applied quantisation step size, and a decrease in QP of 6 represents a halving of the resulting quantisation step size.

As discussed above, the modification can be carried out by selecting a quantisation index (for example, a base QP) in respect of luminance samples; generating a quantisation index offset, relative to the quantisation index selected for the luminance samples, for samples of each or both chrominance components; changing the quantisation index offset according to the residual scaling factor; and communicating the quantisation index offset in association with the coded video data. In embodiments of HEVC, QP offsets for the two chroma channels are sent in the bit stream. These steps correspond to a system in which the QP offset (to account for the residual scaling factor) of +/−3 could be incorporated into these offsets, or they could be incremented/decremented when they are used to derive the chroma QP.

Note that the QP offset does not have to be +/−3 if differently shaped blocks were used; it is just that +/−3 represents an offset applicable to the block shapes and aspect ratios discussed above in respect of 4:2:2 video, for example.

In some embodiments, n (the bit shift as applied) is selected so that $2^n$ is greater than or equal to the common scaling factor. In other embodiments, n is selected so that $2^n$ is less than or equal to the common scaling factor. In embodiments of the disclosure (using either of these arrangements), a bit shift n can be selected so as to be the next nearest (in either direction) to the common scaling factor, so that the residual scaling factor represents a factor having a magnitude of less than 2.

In other embodiments, the modification of the quantisation step size can simply be performed by multiplying the quantisation step size by a factor dependent upon the residual scaling factor. That is to say, the modification need not involve modifying the index QP.

Note also that the quantisation step size as discussed is not necessarily the actual quantisation step size by which a transformed sample is divided. The quantisation step size derived in this way can be further modified. For example, in some arrangements, the quantisation step size is further modified by respective entries in a matrix of values (Qmatrix) so that different final quantisation step sizes are used at different coefficient positions in a quantised block of coefficients.

It is also notable that in the 4:2:0 scheme, the largest chroma TU is 16×16, whereas for the 4:2:2 scheme 16×32 TUs are possible, and for the 4:4:4 scheme, 32×32 chroma TUs are possible. Consequently in an embodiment of the present disclosure quantisation matrices (Qmatrices) for 32×32 chroma TUs are proposed. Similarly, Qmatrices should be defined for non-square TUs such as the 16×32 TU, with one embodiment being the subsampling of a larger square Q matrix Qmatrices could be defined by any one of the following:
values in a grid (as for 4×4 and 8×8 Qmatrices);
interpolated spatially from smaller or larger matrices;
in HEVC larger Qmatrices can be derived from respective groups of coefficients of smaller reference ones, or smaller matrices can be sub-sampled from larger matrices. Note that this interpolation or subsampling can be carried out within a channel ratio—for example, a larger matrix for a channel ratio can be interpolated from a smaller one for that channel ratio.
relative to other Qmatrices (i.e. difference values, or deltas);
hence only the deltas need to be sent.

Taking a small example just for illustrative purposes, a particular matrix for one channel ratio could be defined, such as a 4×4 matrix in respect of 4:2:0

(a b)

(c d)

where a, b, c and d are respective coefficients. This acts as a reference matrix.

Embodiments of the disclosure could then define a set of difference values for a similar-sized matrix in respect of another channel ratio:

(diff1 diff2)

(diff3 diff4)

so that in order to generate the Qmatrix for the other channel ratio, the matrix of differences is matrix-added to the reference matrix.

Instead of differences, a matrix of multiplicative factors could be defined for the other channel ratio, such that either (i) the matrix of multiplicative factors is matrix-multiplied with the reference matrix to generate the Qmatrix for the other channel ratio, or (ii) each coefficient in the reference matrix is individually multiplied by a respective factor to generate the Qmatrix for the other channel ratio.

as a function of another Qmatrix;
e.g. a scaling ratio relative to another matrix (so that each of a, b, c and d in the above example is multiplied by the same factor, or has the same difference added to it). This reduces the data requirements for transmitting the difference or factor data.

hence only the coefficients of the functions need to be sent (such as the scaling ratio), as an equation/function (e.g. piece-wise linear curve, exponential, polynomial);

hence only the coefficients of the equations need to be sent to derive the matrix, or any combination of the above. For example, each of a, b, c and d could in fact be defined by a function which could include a dependence upon the coefficient position (i,j) within the matrix. (I, j) could represent, for example, the coefficient position from left to right followed by the coefficient position from top to bottom of the matrix. An example is:

$$coefficient_{i,j}=3i+2j$$

Note that Qmatrices can be referred to as Scaling Lists within the HEVC environment. In embodiments in which the quantisation is applied after the scanning process, the scanned data may be a linear stream of successive data samples. In such instances, the concept of a Qmatrix still applies, but the matrix (or Scanning List) may be considered as a 1×N matrix, such that the order of the N data values within the 1×N matrix corresponds to the order of scanned samples to which the respective Qmatrix value is to be applied. In other words, there is a 1:1 relationship between data order in the scanned data, spatial frequency according to the scan pattern, and data order in the 1×N Qmatrix.

Note that it is possible, in some implementations, to bypass or omit the DCT (frequency separation) stage, but to retain the quantisation stage.

Other useful information includes an optional indicator of to which other matrix the values are related, i.e. the previous channel or the first (primary) channel; for example the matrix for Cr could be a scaled factor of a matrix for Y, or for Cb, as indicated.

Accordingly, embodiments of the disclosure can provide a video coding or decoding method (and a corresponding apparatus or computer program) operable to generate blocks of quantised spatial frequency data by (optionally) performing frequency-transformation on blocks of video data samples and quantising the video data (such as the spatial frequency data) according to a selected quantisation step size and a matrix of data modifying the quantisation step size for use at different respective block positions within an ordered block of samples (such as an ordered block of frequency-transformed samples), the method being operable with respect to at least two different chrominance subsampling formats.

For at least one of the chrominance subsampling formats, one or more quantisation matrices are defined as one or more predetermined modifications with respect to one or more reference quantisation matrices defined for a reference one of the chrominance subsampling formats.

In embodiments of the disclosure, the defining step comprises defining one or more quantisation matrices as a matrix of values each interpolated from a respective plurality of values of a reference quantisation matrix. In other embodiments, the defining step comprises defining one or more quantisation matrices as a matrix of values each subsampled from values of a reference quantisation matrix.

In embodiments of the disclosure, the defining step comprises defining one or more quantisation matrices as a matrix of differences with respect to corresponding values of a reference quantisation matrix.

In embodiments of the disclosure, the defining step comprises defining one or more quantisation matrices as a predetermined function of values of a reference quantisation matrix. In such instances, the predetermined function may be a polynomial function.

In embodiments of the disclosure, one or both of the following is provided, for example as part of or in association with the coded video data: (i) reference-indicator data to indicate, with respect to encoded video data, the reference quantisation matrix; and (ii) modification-indicator data to indicate, with respect to encoded data values, the one or more predetermined modifications.

These techniques are particularly applicable where two of the chrominance subsampling formats are 4:4:4 and 4:2:2 formats.

The number of Q Matrices in HEVC 4:2:0 is currently 6 for each transform size: 3 for the corresponding channels, and one set for intra and for inter. In the case of a 4:4:4 GBR scheme, it will be appreciated that either one set of quantisation matrices could be used for all channels, or three respective sets of quantisation matrices could be used.

In embodiments of the disclosure, at least one of the matrices is a 1×N matrix. This would be the case in (as described here) one or more of the matrices is in fact a Scaling List or the like, being a linear 1×N ordered array of coefficients.

The proposed solutions involve incrementing or decrementing the applied QP. However this could be achieved in a number of ways:

In HEVC, QP offsets for the two chroma channels are sent in the bit stream. The +/−3 could be incorporated into these offsets, or they could be incremented/decremented when they are used to derive the chroma QP.

As discussed, above, in HEVC, (luma QP+chroma offset) is used as an index to a table in order to derive the chroma QP. This table could be modified to incorporate the +/−3 (i.e. by incrementing/decrementing the values of the original table by 3)

After the chroma QP has been derived, as per the normal HEVC process, the results could then be incremented (or decremented) by 3.

As an alternative to modifying the QP, a factor of sqrt(2) or 1/sqrt(2) can be used to modify the quantisation coefficients.

For forward/inverse quantisation, the division/multiplication processes are implemented by using (QP % 6) as an index to a table to obtain a quantisation coefficient or quantisation step size, inverseQStep/scaledQStep. (Here, QP % 6 signifies QP modulo 6). Note that, as discussed above, this may not represent the final quantisation step size which is applied to the transformed data; it may be further modified by the Qmatrices before use.

The default tables in HEVC are of length 6, covering an octave (a doubling) of values. This is simply a means of reducing storage requirements; the tables are extended for actual use by selecting an entry in the table according to the modulus of QP (mod 6) and then multiplying or dividing by an appropriate power of 2, dependent upon the difference of (QP−QP modulus 6) from a predetermined base value.

This arrangement could be varied to allow for the offset of +/−3 in the QP value. The offset can be applied in the table look-up process, or the modulus process discussed above could instead be carried out using the modified QP. Assuming the offset is applied at the table look-up, however, additional entries in the table can be provided as follows: One alternative is to extend the tables by 3 entries, where the new entries are as follows (for the index values of 6-8).

The example table shown in FIG. 30 would be indexed by [(QP % 6)+3] (a "QP increment method"), where the notation QP % 6 signifies "QP modulus 6".

The example table shown in FIG. 31 would be indexed by [(QP % 6)−3] (a "QP decrement method"), having extra entries for the index values of −1 to −3:

Entropy Encoding

Basic entropy encoding comprises assigning codewords to input data symbols, where the shortest available codewords are assigned to the most probable symbols in the input data. On average the result is a lossless but much smaller representation of the input data.

This basic scheme can be improved upon further by recognising that symbol probability is often conditional on recent prior data, and consequently making the assignment process context adaptive.

In such a scheme, context variables (CVs) are used to determine the choice of respective probability models, and such CVs are provided for in the HEVC 4:2:0 scheme.

To extend entropy encoding to the 4:2:2 scheme, which for example will use 4×8 chroma TUs rather than 4×4 TUs for an 8×8 luma TU, optionally the context variables can be provided for by simply vertically repeating the equivalent CV selections.

However, in an embodiment of the present disclosure the CV selections are not repeated for the top-left coefficients (i.e. the high-energy, DC and/or low spatial frequency coefficients), and instead new CVs are derived. In this case, for example, a mapping may be derived from the luma map. This approach may also be used for the 4:4:4 scheme.

During coding, in the 4:2:0 scheme, a so-called zig-scan scans through the coefficients in order from high to low frequencies. However, again it is noted that the chroma TUs in the 4:2:2 scheme can be non-square, and so in an embodiment of the present disclosure a different chroma scan is proposed with the angle of the scan be tilted to make it more horizontal, or more generally, responsive to the aspect ratio of the TU.

Similarly, the neighborhood for significance map CV selection and the c1/c2 system for greater-than-one and greater-than-two CV selection may be adapted accordingly.

Likewise, in an embodiment of the present disclosure the last significant coefficient position (which becomes the start point during decoding) could also be adjusted for the 4:4:4 scheme, with last-significant positions for chroma TUs being coded differentially from the last-significant position in the co-located luma TU.

The coefficient scanning can also be made prediction mode dependent for certain TU sizes. Hence a different scan order can be used for some TU sizes dependent on the intra-prediction mode.

In the 4:2:0 scheme, mode dependent coefficient scanning (MDCS) is only applied for 4×4/8×8 luma TUs and 4×4 chroma TUs for intra prediction. MDCS is used dependent on the intra-prediction mode, with angles +/−4 from the horizontal and vertical being considered.

In an embodiment of the present disclosure, it is proposed that in the 4:2:2 scheme MDCS is applied to 4×8 and 8×4 chroma TUs for intra prediction. Similarly, it is proposed that in the 4:4:4 scheme MDCS is applied to 8×8 and 4×4 chroma TUs. MDCS for 4:2:2 may only be done in the horizontal or vertical directions, and that the angle ranges may differ for 4:4:4 chroma vs. 4:4:4 luma vs. 4:2:2 chroma vs. 4:2:2 luma vs. 4:2:0 luma.

In-Loop Filters

Deblocking

Deblocking is applied to all CU, PU and TU boundaries, and the CU/PU/TU shape is not taken into account. The filter strength and size is dependent on local statistics, and deblocking has a granularity of 8×8 Luma pixels.

Consequently it is anticipated that the current deblocking applied for the 4:2:0 scheme should also be applicable for the 4:2:2 and 4:4:4 schemes.

Sample Adaptive Offsetting

In sample adaptive offsetting (SAO) each channel is completely independent. SAO splits the image data for each channel using a quad-tree, and the resulting blocks are at least one LCU in size. The leaf blocks are aligned to LCU boundaries and each leaf can run in one of three modes, as determined by the encoder ("Central band offset", "Side band offset" or "Edge offset"). Each leaf categorises its pixels, and the encoder derives an offset value for each of the 16 categories by comparing the SAO input data to the source data. These offsets are sent to the decoder. The offset for a decoded pixel's category is added to its value to minimise the deviation from the source.

In addition, SAO is enabled or disabled at picture level; if enabled for luma, it can also be enabled separately for each chroma channel. SAO will therefore be applied to chroma only if it is applied to luma.

Consequently the process is largely transparent to the underlying block scheme and it is anticipated that the current SAO applied for the 4:2:0 scheme should also be applicable for the 4:2:2 and 4:4:4 schemes.

Adaptive Loop Filtering

In the 4:2:0 scheme, adaptive loop filtering (ALF) is disabled by default. However, in principle (i.e. if allowed) then ALF would be applied to the entire picture for chroma.

In ALF, luma samples may be sorted into one of a number of categories, as determined by the HEVC documents; each category uses a different Wiener-based filter.

By contrast, in 4:2:0 chroma samples are not categorised—there is just one Wiener-based filter for Cb, and one for Cr.

Hence in an embodiment of the present disclosure, in light of the increased chroma information in the 4:2:2 and 4:4:4 schemes, it is proposed that the chroma samples are categorised; for example with K categories for 4:2:2 and J categories for 4:4:4.

Whilst in the 4:2:0 scheme ALF can be disabled for luma on a per-CU basis using an ALF control flag (down to the CU-level specified by the ALF control depth), it can only be disabled for chroma on a per-picture basis. Note that in HEVC, this depth is currently limited to the LCU level only.

Consequently in an embodiment of the present disclosure, the 4:2:2 and 4:4:4 schemes are provided with one or two channel specific ALF control flags for chroma.

Syntax

In HEVC, syntax is already present to indicate 4:2:0, 4:2:2 or 4:4:4 schemes, and is indicated at the sequence level. However, in an embodiment of the present disclosure it is proposed to also indicate 4:4:4 GBR coding at this level.

MDDT and MDCS

The use of mode dependent directional transforms and mode dependent coefficient scanning will now be described. Note that both may be implemented in the same system, or one may be used and the other not, or neither may be used.

MDCS will be described first, with reference to FIGS. 34 to 38.

Figure 35:
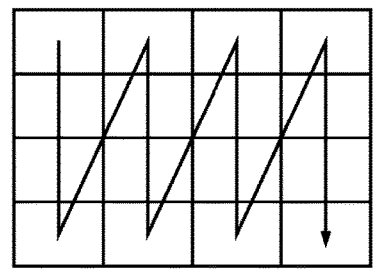

A so-called up-right diagonal scan pattern was described above with reference to FIG. 16. The scan pattern is used to derive an order by which frequency-separated coefficients, such as DCT coefficients, are processed. The up-right diagonal pattern is one example of a scan pattern, but other patterns are available. Two further examples are shown schematically in FIGS. 34 and 35, this time using the example of a 4×4 block. These are: a horizontal scan pattern (FIG. 34), and a vertical scan pattern (FIG. 35).

In MDCS, a scan pattern is selected from a group of two or more candidate scan patterns in dependence upon the prediction mode in use.

The present example concerns a group of three candidate scan patterns, the up-right diagonal pattern, the horizontal pattern and the vertical pattern. But a different group of two or more candidate patterns could be used.

Figure 36:
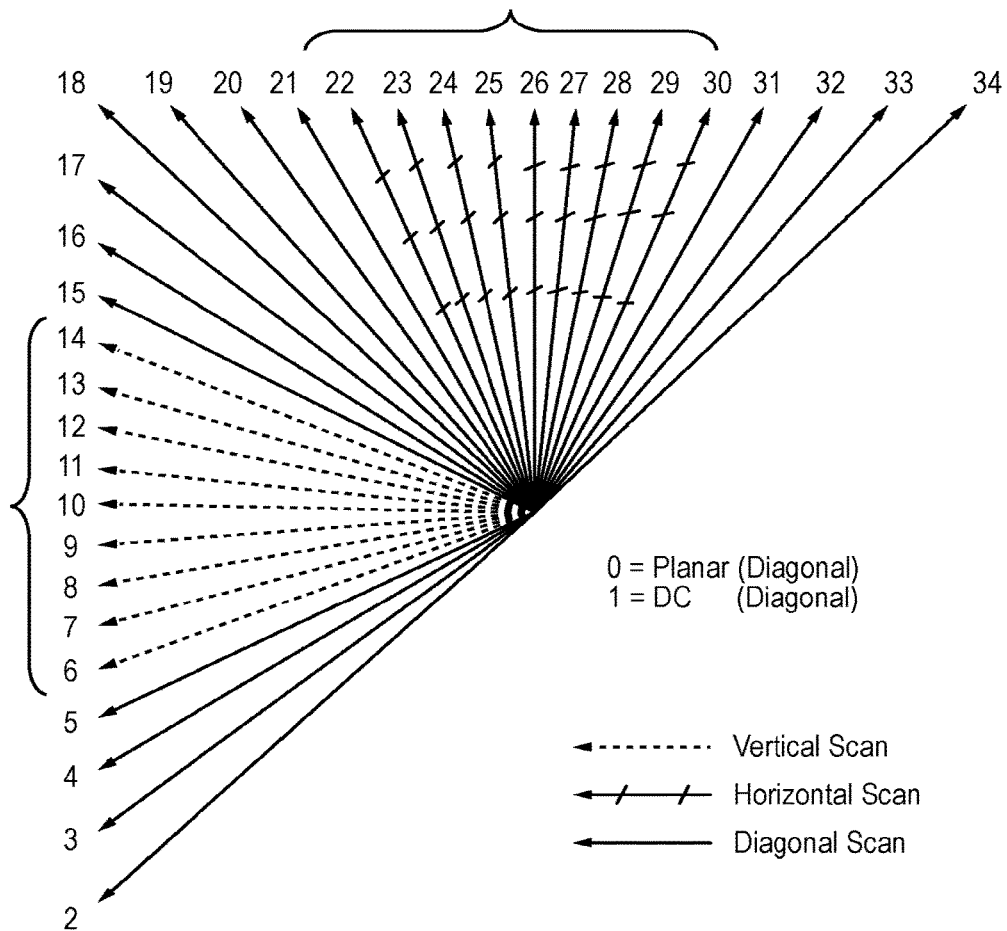
FIG. 36 schematically illustrates the selection of scan pattern according to prediction mode.

Referring to FIG. 36, the vertical scan pattern is used for modes 6 to 14, which are modes that are within a threshold angle (or mode number) of horizontal (predominantly horizontal). The horizontal scan pattern is used for modes 22 to 30, which are modes that are within a threshold angle (or mode number) of vertical (predominantly vertical). The up-right diagonal scan, referred to in FIG. 36 as just the "diagonal" scan, is used for other modes.

Figure 37:
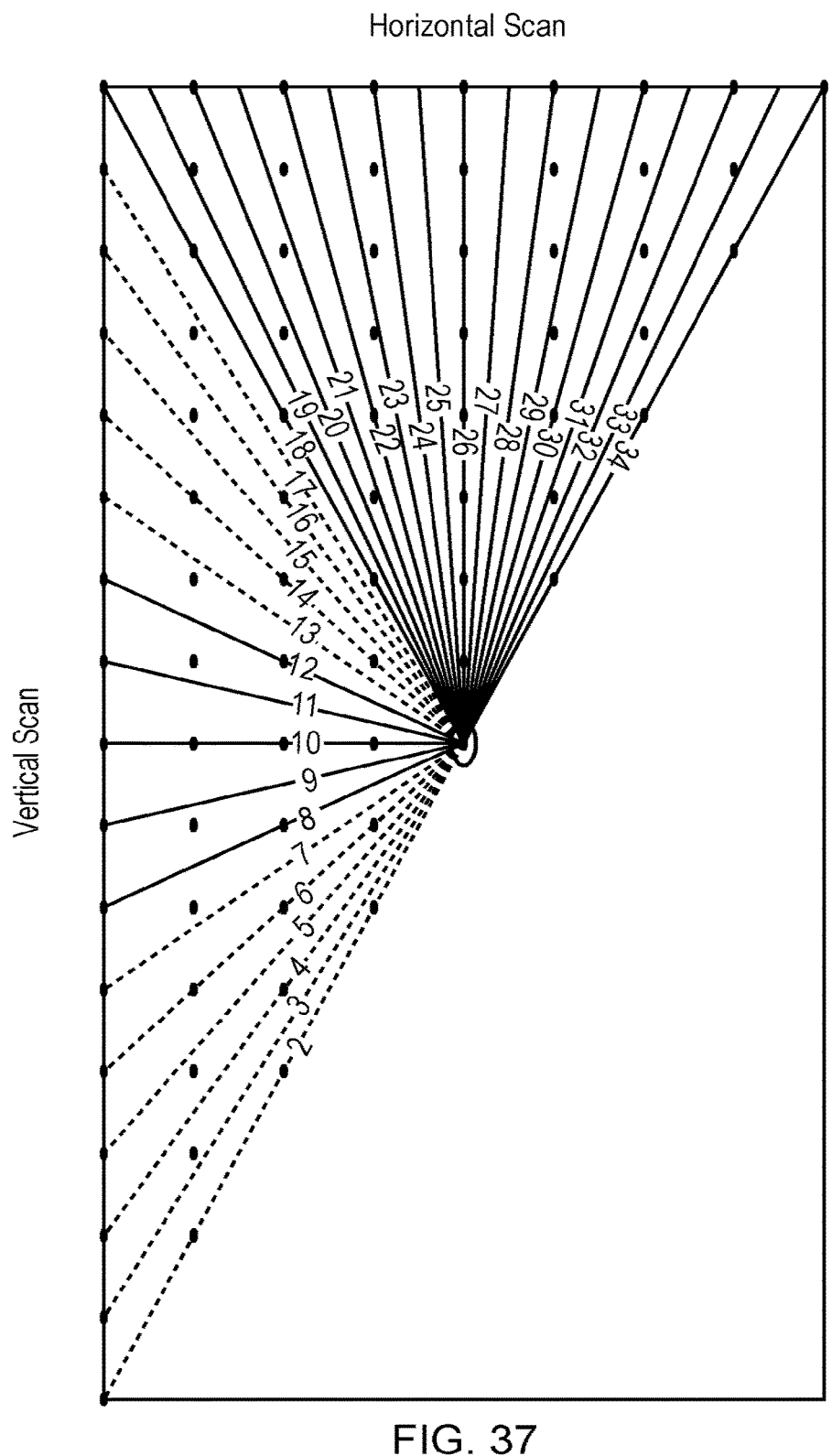
FIG. 37 schematically illustrates the selection of scan pattern according to prediction mode for a rectangular chroma block.

FIG. 37 schematically illustrates a possible mapping of two candidate scan patterns (vertical and horizontal) to the directional prediction modes applicable to a rectangular array of chroma samples. The pattern is different to that used (FIG. 36) for luma samples.

Figure 38:
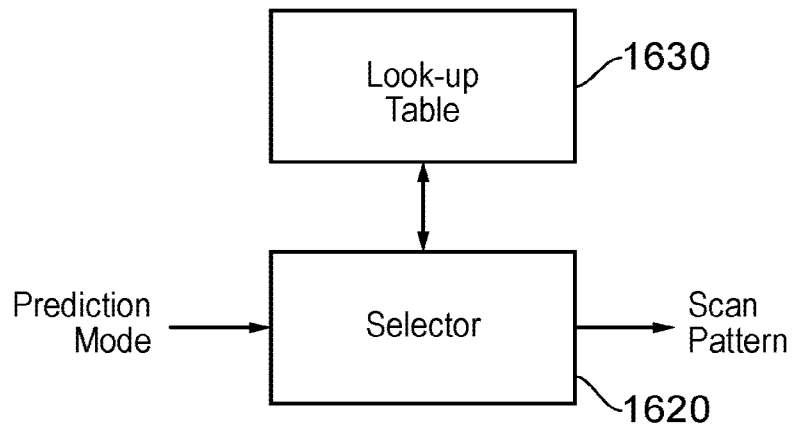
FIG. 38 schematically illustrates an arrangement for selecting a scan pattern.

FIG. 38 schematically illustrates an arrangement for selecting a scan pattern. This can form part of the functionality of the controller 343, for example.

A selector 1620 is responsive to a prediction mode for the current block and a look-up table 1630 which maps prediction mode to scan pattern. The selector 1620 outputs data indicative of the selected scan pattern.

MDCS may be enabled for 4:2:2 and 4:4:4. The mapping of scan patterns to prediction modes may be the same as for 4:2:0, or may be different. Each channel ratio may have a respective mapping (in which case the selector 1620 may be responsive to the channel ratio as well) or the mapping could be consistent across channel ratios. MDCS may be applied only to certain block sizes, for example block sizes no greater than a threshold block size. For example, the maximum TU sizes to which MDCS is applied may be:

| Format | Luma | Chroma |
| --- | --- | --- |
| 4:2:0 | 8 × 8 | 4 × 4 |
| 4:2:2 | 8 × 8 | 4 × 8 |
| 4:4:4 | 8 × 8 | 8 × 8 |

For chroma, MDCS may be disabled, limited to 4×4 (luma) TUs only or limited to TUs using only horizontal or vertical scan. The implementation of the MDCS feature may vary with channel ratio.

Embodiments of the disclosure therefore provide a method of coding 4:2:2 or 4:4:4: video data in which differences between predicted and original samples are frequency-separated and encoded, comprising: predicting luminance and/or chrominance samples of an image from other respective reference samples derived from the same image according to a prediction mode associated with a sample to be predicted, the prediction mode being selected for each of a plurality of blocks of samples, from a set of two or more candidate prediction modes; detecting differences between the samples and the respective predicted samples; frequency-separating the detected differences for a block of samples, using a frequency-separation transform, to generate a corresponding set of frequency-separated coefficients; selecting a scan pattern from a set of two or more candidate scan patterns, each scan pattern defining an order of encoding the set of frequency-separated coefficients, in dependence upon the prediction mode for that block of samples using a mapping provided (for example by the controller 343) between scan pattern and prediction mode, the mapping between different, as between chrominance and luminance samples, for at least the 4:4:4: format (so, in other words, the mapping is different for 4:4:4 chroma and 4:4:4 luma data, and may or may not be different as between 4:2:2 luma and 4:2:2 chroma data); and encoding the frequency-separated difference data in an order of frequency-separated coefficients according to the selected scan pattern.

The mapping may be different for 4:2:2 luminance and chrominance data.

The mapping may be different for 4:2:2 and 4:4:4 video data.

In embodiments of the disclosure, the size of a current block of luminance samples is 4×4 or 8×8 samples. Alternatively, embodiments of the disclosure comprise selecting the size of the current block of samples from a set of candidate sizes; and applying the step of selecting a scan pattern if the selected block size is one of a predetermined subset of the set of candidate sizes. In this way, the mapping process can be applied in respect of some block sizes but not others. The mapping may be applied (for 4:2:2) only in respect of luminance samples.

In embodiments of the disclosure, the set of candidate scan patterns is different for use in respect of luminance and chrominance samples.

The selecting step may be configured to select a horizontal scan pattern in respect of a set of predominantly horizontal prediction modes, to select a vertical scan pattern in respect of a set of predominantly vertical prediction modes, and to select a diagonal scan pattern in respect of other prediction modes.

Embodiments of the disclosure also provide a method of decoding 4:2:2 or 4:4:4 video data in which differences between predicted and original samples are frequency-separated and encoded, comprising: predicting luminance and/or chrominance samples of an image from other respective reference samples derived from the same image according to a prediction mode associated with a sample to be predicted, the prediction mode being selected for each of a plurality of blocks of samples, from a set of two or more candidate prediction modes; selecting a scan pattern from a set of two or more candidate scan patterns, each scan pattern defining an order of encoding the set of frequency-separated coefficients, in dependence upon the prediction mode for that block of samples using a mapping between scan pattern and prediction mode, the mapping between different, as between chrominance and luminance samples, for at least the 4:4:4: format (so, in other words, the mapping is different for 4:4:4 chroma and 4:4:4 luma data, and may or may not be different as between 4:2:2 luma and 4:2:2 chroma data); and decoding frequency-separated difference data representing a frequency-separated version of data indicative of differences between the samples to be decoded and respective predicted samples, in an order of frequency-separated coefficients according to the selected scan pattern.

Figure 39:
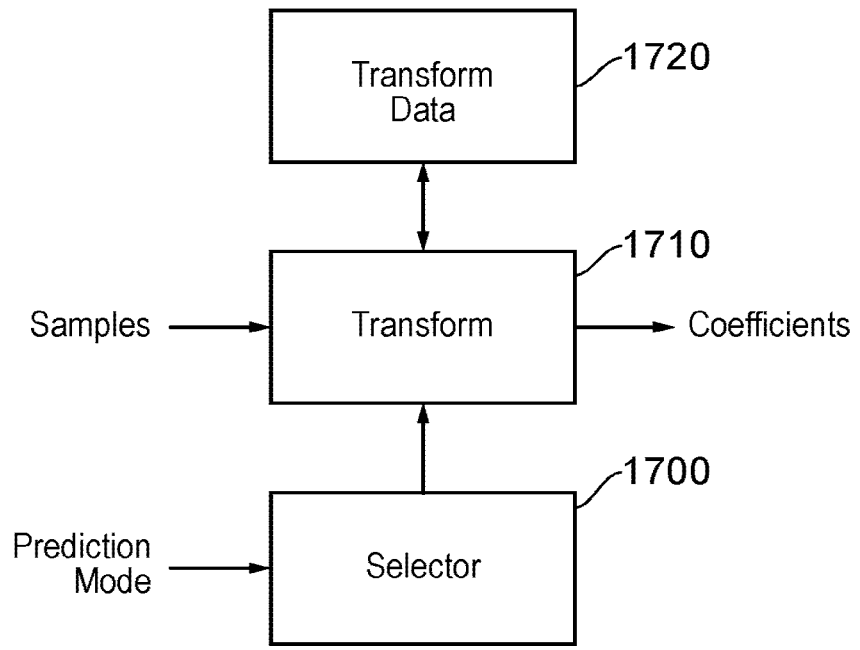
FIG. 39 schematically illustrates an arrangement for selecting a frequency-separation transform.
Figure 41D:
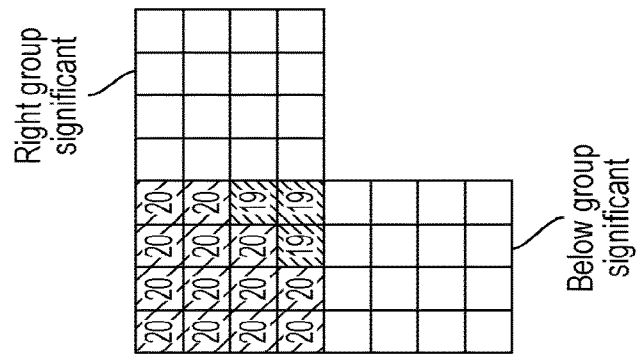
FIGS. 41A-41D schematically illustrate a previously proposed neighborhood allocation.
Figure 41C:
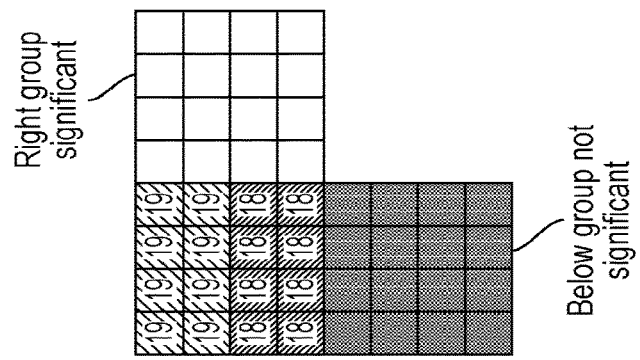
Figure 41B:
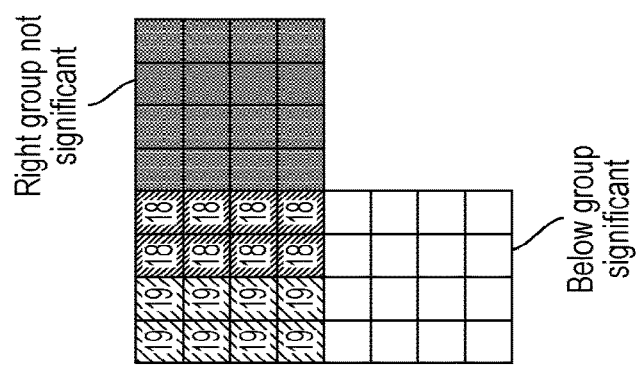
Figure 41A:
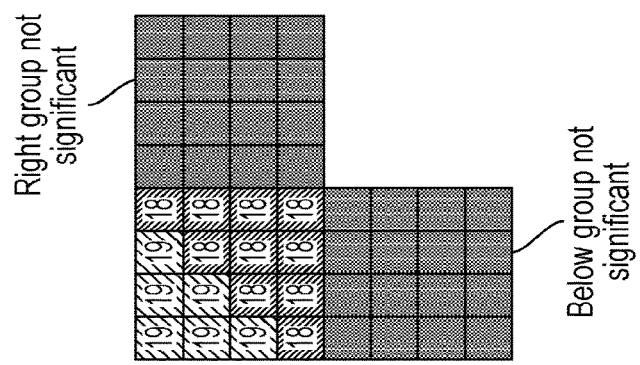

With regard to MDDT, FIG. 39 schematically illustrates an arrangement for selecting a frequency-separating transform according to prediction mode. The arrangement may form part of the functionality of the transform unit or of the controller.

A selector 1700 receives data defining the current prediction mode and selects a transform (from a set of two or more candidate transforms) in dependence upon that mode. The transform is applied by a transform engine 1710 to convert image samples into frequency-transformed coefficients, on the basis of data indicative of the required transform, stored in a transform data store.

Examples of candidate transforms include the discrete cosine transform (DCT), the discreet sine transform (DST), the Karhunen-Loeve transform; and transforms defined by respective row and column matrices for matrix-multiplication by the current block of samples.

MDDT may be enabled, for example, in respect of 4×4 chroma blocks in a 4:4:4 system. However, in embodiments of the disclosure, MDDT is enabled in respect of 4:2:2 data.

Accordingly, embodiments of the disclosure can provide a method of coding 4:2:2 or 4:4:4 video data, comprising: predicting luminance and/or chrominance samples of an image from other respective reference samples derived from the same image according to a prediction mode associated with a sample to be predicted, the prediction mode being selected for each of a plurality of blocks of samples, from a set of two or more candidate prediction modes; detecting differences between the samples and the respective predicted samples; selecting a frequency-separation transform from two or more candidate frequency separation transforms according to the prediction mode associated with a current block of samples using a mapping (provided, for example, by the controller 343) between transform and prediction mode, the mapping being different, as between chrominance and luminance samples, for at least the 4:4:4: format (so, in other words, the mapping is different for 4:4:4 chroma and 4:4:4 luma data, and may or may not be different as between 4:2:2 luma and 4:2:2 chroma data); and encoding the detected differences by frequency-separating the differences, using the selected frequency-separation transform.

The candidate transforms may comprise two or more transforms selected from the list consisting of: the discrete cosine transform; the discrete sine transform; the Karhunen-Loeve transform; and transforms defined by respective row and column matrices for matrix-multiplication by the current block of samples (so that, for example, a transform is defined by $TXT^T$, where T is the transform matrix, the superscript T signifies the transpose of the matrix, and X signifies a block of samples in matrix form).

As before, in embodiments of the disclosure the prediction mode associated with a block of samples to be predicted indicates a prediction direction defining one or more other respective reference samples from which each sample of that block is to be predicted, or may indicate a dc prediction mode for example.

In embodiments of the disclosure a mapping provided between prediction mode and frequency-separation transform may be different between luminance and chrominance data for the 4:2:2 format.

In embodiments of the disclosure, the size of a current block of luminance samples is 4×4 samples. Alternatively, the method may comprise selecting the size of the current block of samples from a set of candidate sizes; and applying the step of selecting a frequency-separation transform if the selected block size is one of a predetermined subset of the set of candidate sizes, so that MDDT is used only for some but not all block (for example, TU) sizes.

In embodiments of the disclosure, the step of encoding the detected differences comprises selecting a scan pattern from a set of two or more candidate scan patterns, each scan pattern defining an order of encoding the set of frequency-separated coefficients, in dependence upon the prediction mode for that block of samples; and encoding the frequency-separated difference data in an order of frequency-separated coefficients according to the selected scan pattern. In other words, this represents a system which uses both MDCS and MDDT.

Coded Block Flag

The coded block flag (CBF) is used to indicate—for a luma TU—whether that TU contains any non-zero coefficients. It provides a simple yes/no answer which allows the encoding process to skip blocks which have no data to be encoded.

In some arrangements, CBFs are used for chroma data, but are provided at each splitting level. This is because chroma components often have a lower amount of information and so a chroma block could be found to contain zero data at a higher splitting level than that at which a corresponding luma block is found to contain no data.

In some embodiments, however, chroma is treated exactly the same as luma for the purposes of allocating CBF flags.

CABAC Encoding and Context Modelling

FIG. 40 schematically illustrates the operation of a CABAC entropy encoder.

The CABAC encoder operates in respect of binary data, that is to say, data represented by only the two symbols 0 and 1. The encoder makes use of a so-called context modelling process which selects a "context" or probability model for subsequent data on the basis of previously encoded data. The selection of the context is carried out in a deterministic way so that the same determination, on the basis of previously decoded data, can be performed at the decoder without the need for further data (specifying the context) to be added to the encoded datastream passed to the decoder.

Referring to FIG. 40, input data to be encoded may be passed to a binary converter 1900 if it is not already in a binary form; if the data is already in binary form, the converter 1900 is bypassed (by a schematic switch 1910). In the present embodiments, conversion to a binary form is actually carried out by expressing the quantised DCT (or other frequency-separated) coefficient data as a series of binary "maps", which will be described further below.

The binary data may then be handled by one of two processing paths, a "regular" and a "bypass" path (which are shown schematically as separate paths but which, in embodiments of the disclosure discussed below, could in fact be implemented by the same processing stages, just using slightly different parameters). The bypass path employs a so-called bypass coder 1920 which does not necessarily make use of context modelling in the same form as the regular path. In some examples of CABAC coding, this bypass path can be selected if there is a need for particularly rapid processing of a batch of data, but in the present embodiments two features of so-called "bypass" data are noted: firstly, the bypass data is handled by the CABAC encoder (1950, 1960), just using a fixed context model representing a 50% probability; and secondly, the bypass data relates to certain categories of data, one particular example being coefficient sign data. Otherwise, the regular path is selected by schematic switches 1930, 1940. This involves the data being processed by a context modeller 1950 followed by a coding engine 1960.

The entropy encoder shown in FIG. 40 encodes a block of data (that is, for example, data corresponding to a block of coefficients relating to a block of the residual image) as a single value if the block is formed entirely of zero-valued data. For each block that does not fall into this category, that is to say a block that contains at least some non-zero data, a "significance map" is prepared. The significance map indicates whether, for each position in a block of data to be encoded, the corresponding coefficient in the block is non-zero. The significance map data, being in binary form, is itself CABAC encoded. The use of the significance map assists with compression because no data needs to be encoded for a coefficient with a magnitude that the significance map indicates to be zero. Also, the significance map can include a special code to indicate the final non-zero coefficient in the block, so that all of the final high frequency/trailing zero coefficients can be omitted from the encoding. The significance map is followed, in the encoded bitstream, by data defining the values of the non-zero coefficients specified by the significance map.

Further levels of map data are also prepared and are CABAC encoded. An example is a map which defines, as a binary value (1=yes, 0=no) whether the coefficient data at a map position which the significance map has indicated to be "non-zero" actually has the value of "one". Another map specifies whether the coefficient data at a map position which the significance map has indicated to be "non-zero" actually has the value of "two". A further map indicates, for those map positions where the significance map has indicated that the coefficient data is "non-zero", whether the data has a value of "greater than two". Another map indicates, again for data identified as "non-zero", the sign of the data value (using a predetermined binary notation such as 1 for +, 0 for −, or of course the other way around).

In embodiments of the disclosure, the significance map and other maps are generated from the quantised DCT coefficients, for example by the scan unit 360, and is subjected to a zigzag scanning process (or a scanning process selected from those discussed above) before being subjected to CABAC encoding.

In general terms, CABAC encoding involves predicting a context, or a probability model, for a next bit to be encoded, based upon other previously encoded data. If the next bit is the same as the bit identified as "most likely" by the probability model, then the encoding of the information that "the next bit agrees with the probability model" can be encoded with great efficiency. It is less efficient to encode that "the next bit does not agree with the probability model", so the derivation of the context data is important to good operation of the encoder. The term "adaptive" means that the context or probability models are adapted, or varied during encoding, in an attempt to provide a good match to the (as yet uncoded) next data.

Using a simple analogy, in the written English language, the letter "U" is relatively uncommon. But in a letter position immediately after the letter "Q", it is very common indeed. So, a probability model might set the probability of a "U" as a very low value, but if the current letter is a "Q", the probability model for a "U" as the next letter could be set to a very high probability value.

CABAC encoding is used, in the present arrangements, for at least the significance map and the maps indicating whether the non-zero values are one or two. Bypass processing—which in these embodiments is identical to CABAC encoding but for the fact that the probability model is fixed at an equal (0.5:0.5) probability distribution of 1s and 0s, is used for at least the sign data and the map indicating whether a value is >2. For those data positions identified as >2, a separate so-called escape data encoding can be used to encode the actual value of the data. This may include a Golomb-Rice encoding technique.

The CABAC context modelling and encoding process is described in more detail in WD4: Working Draft 4 of High-Efficiency Video Coding, JCTVC-F803_d5, Draft ISO/IEC 23008-HEVC; 201x(E) 2011 Oct. 2028.

The context variables are reset at the end of processing a slice.

Reference will now be made to a method of video data coding, comprising: predicting blocks of luminance and/or chrominance samples of an image from other respective reference samples or values; detecting differences between the samples in a block and the respective predicted samples; frequency-separating the detected differences in respect of each block so as to generate a corresponding array of frequency-separated coefficients ordered according to increasing spatial frequencies represented by the coefficients; and entropy-encoding the frequency-separated coefficients using a context adaptive arithmetic code which encodes coefficients with respect to context variables indicative of the probability of a coefficient having a particular coefficient value; in which the entropy-encoding step comprises: partitioning each array into two or more coefficient groups, the groups being non-square sub-arrays; and selecting a context variable to encode a coefficient according to the spatial frequencies represented by that coefficient and in dependence upon the values of coefficients in one or more nearby groups of coefficients in that array or an array corresponding to a neighbouring block of samples.

This is sometimes known as neighbourhood context variable allocation, which allows for the allocation pattern of context variable to coefficient position to be set on a sub-array by sub-array basis (a sub-array being a portion of a block of coefficients) according to whether there are any non-zero coefficients in neighbouring sub-arrays. The scan pattern selected for use with the frequency-separated data may be relevant, such that the entropy-encoding step comprises encoding the coefficients of an array in an order dependent upon a scan pattern selected from a set of one or more candidate scan patterns. Each sub-array of coefficients can be considered as a successive set of n coefficients in the order defined by the scan pattern applicable to that array, where n is an integer factor of the number of coefficients in the array. For example, n may be 16.

FIGS. 41A to 41D schematically illustrate the situation for previously proposed neighbourhood allocation.

In embodiments of the disclosure, the selecting step allocates coefficients in a group to one of a set of candidate context variables so that, within each group, successive subsets of coefficients, in the scan order, are allocated to respective ones of the candidate context variables. In the examples shown in FIGS. 42A to 43B, a vertical scan order is used and allocations are made in that order. In FIG. 44, a horizontal scan order is used and allocations are made in that order.

As mentioned, the selecting step depends upon whether the nearby coefficients have a zero value. There may be two candidate context variables for each group of coefficients.

Turning now to FIGS. 42A, 42B, 43A, 43B and 44, the format of the drawings shown is that the coefficients are ordered within an array so that horizontal spatial frequency increases from left to right in the array and vertical spatial frequency increases from top to bottom in an array.

There are two options for how to deal with missing data (for example, data at the edges of a picture or slice, or data that has not yet been encoded. In one option (FIG. 42A), if a group of coefficients nearby a current group has not yet been frequency-separated, the selecting step assigns zero values to that group for the purposes of selecting a context variable for a coefficient in the current group. In another option (FIG. 42B), if a first group of coefficients nearby a current group has not yet been frequency-separated, but a second group neighbouring a current group has been frequency-separated, then the selecting assigns the values of the second group to the first group for the purposes of selecting a context variable for a coefficient in the current group.

Figures 42A, 42B:
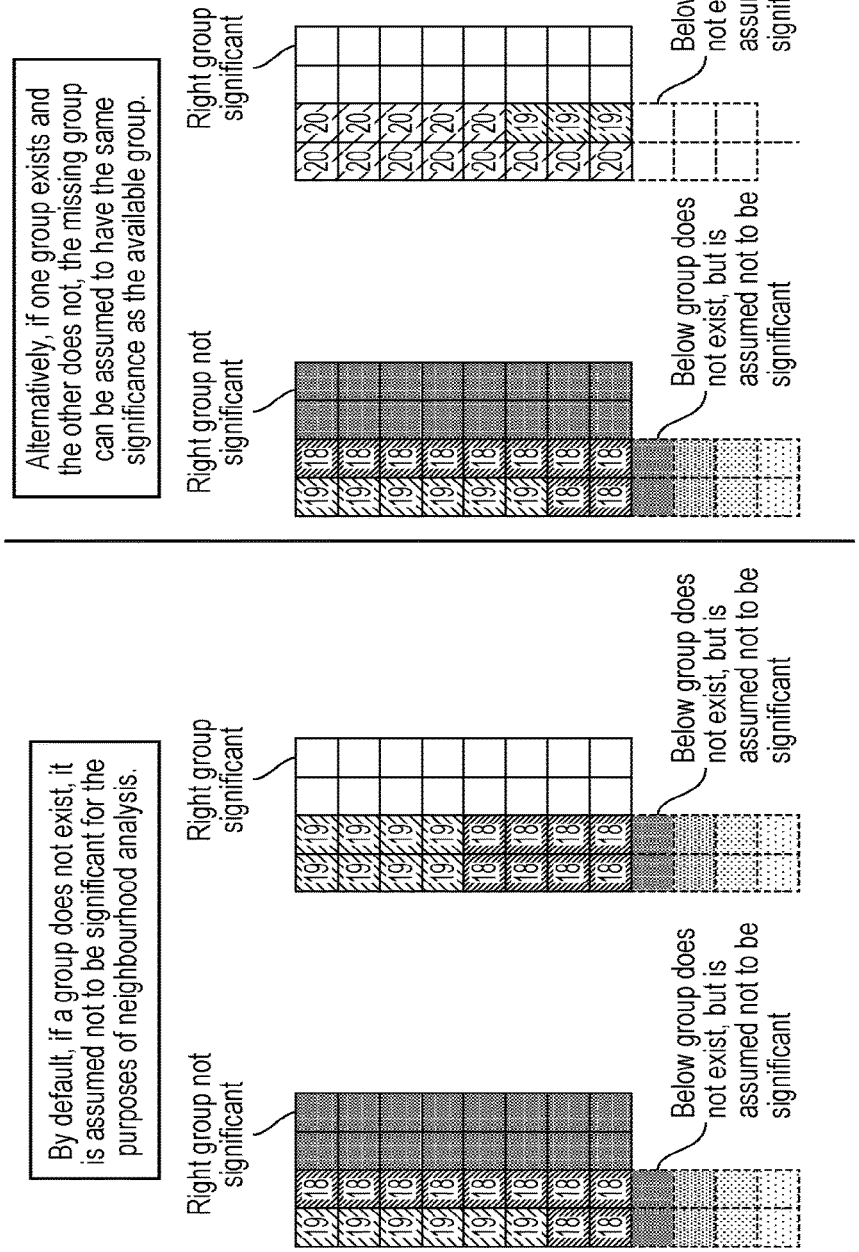

Referring to FIGS. 42A to 42B, if both the groups to the right and below the current group contain non-zero coefficient data, then one context variable is allocated by the selecting step to the first m coefficients of the current group in the scan order and another context variable to the remaining coefficients of the current group. If the group to the right of the current group has non-zero data but the group below the current group does not, then one context variable is allocated by the selecting step to an upper half of the current group and another context variable to the remaining coefficients of the current group. If the group below the current group has non-zero data but the group to the right of the current group does not, then one context variable is allocated by the selecting step to the first p coefficients of the current group in the scan order and another context variable to the remaining coefficients of the current group. If the group below the current group has non-zero data but the group to the right of the current group does not, then one context variable is allocated by the selecting step to an left half of the current group and another context variable to the remaining coefficients of the current group. In the examples shown, m and p are integers, and m does not equal p. In particular, in the examples shown, a current group comprises a sub-array of 8×2 or 2×8 coefficients; and m=13 and p=6.

The method shown is applicable to blocks of samples which have a size of at least 8 samples in at least one dimension. An example is an 8×8 block or bigger.

The technique is useable whether at least some of the blocks of samples (TUs) are square, or at least some of the blocks of samples (TUs) are non-square.

Figure 45:
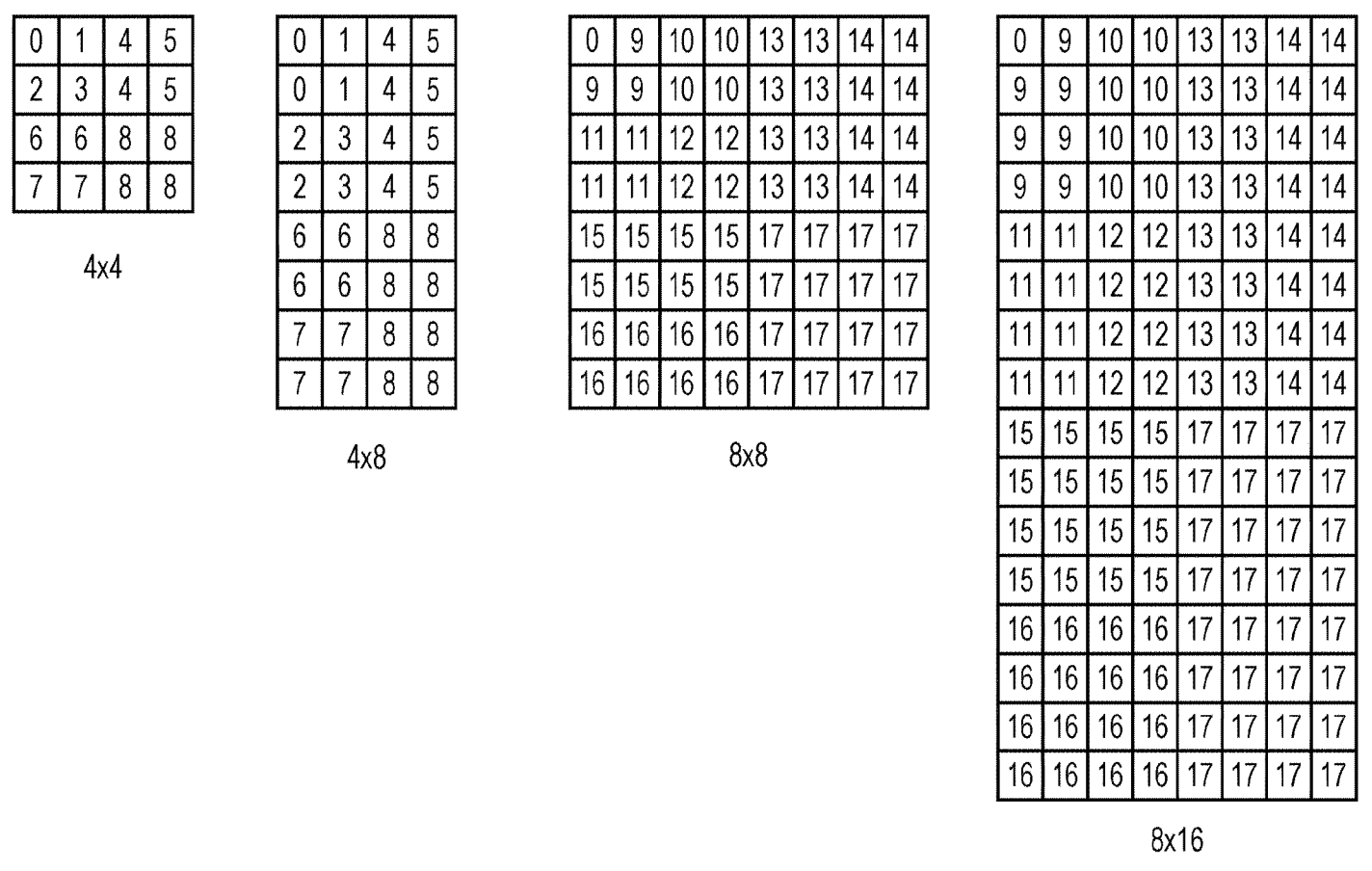

Referring now to FIG. 45, embodiments of the disclosure also provide a method of video data coding, comprising: predicting blocks of luminance and/or chrominance samples of an image from other respective reference samples or values; detecting differences between the samples in a block and the respective predicted samples; frequency-separating the detected differences in respect of each block so as to generate a corresponding array of frequency-separated coefficients ordered according to the spatial frequencies represented by the coefficients, one of the coefficients representing a dc value of the block; and entropy-encoding the frequency-separated coefficients using a context adaptive arithmetic code which encodes coefficients with respect to context variables indicative of the probability of a coefficient having a particular coefficient value; in which the entropy-encoding step comprises: partitioning each array into two or more coefficient groups, the groups being non-square sub-arrays; and generating an allocation of context variables to encode respective coefficients generated in respect of a non-square sub-array according to the spatial frequencies represented by that coefficient, by position-repeating the context variable allocations applicable to a square sub-array, but not position-repeating the allocation of a context variable to the dc coefficient. As shown in FIG. 45, the allocation pattern for the 8×16 sub-array is a value-repeated pattern derived from the 8×8 sub-array allocation pattern, but the dc allocation (the top left corner as drawn) is not value-repeated. In other words, the context variable allocated to the dc coefficient is not allocated to any other coefficient.

Data Signals

It will be appreciated that data signals generated by the variants of coding apparatus discussed above, and storage or transmission media carrying such signals, are considered to represent embodiments of the present disclosure.

Where methods of processing, coding or decoding are discussed above, it will be appreciated that apparatus configured to perform such methods are also considered to represent embodiments of the disclosure. It will also be appreciated that video storage, transmission, capture and/or display apparatus incorporating such techniques is considered to represent an embodiment of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

Respective features of embodiments are defined by the following numbered clauses:

1. A method of video data coding, comprising:
   predicting blocks of luminance and/or chrominance samples of an image from other respective reference samples or values;
   detecting differences between the samples in a block and the respective predicted samples;
   frequency-separating the detected differences in respect of each block so as to generate a corresponding array of frequency-separated coefficients ordered according to increasing spatial frequencies represented by the coefficients; and
   entropy-encoding the frequency-separated coefficients using a context adaptive arithmetic code which encodes coefficients with respect to context variables indicative of the probability of a coefficient having a particular coefficient value;
   in which the entropy-encoding step comprises:
   partitioning each array into two or more coefficient groups, the groups being non-square sub-arrays; and
   selecting a context variable to encode a coefficient according to the spatial frequencies represented by that coefficient and in dependence upon the values of coefficients in one or more nearby groups of coefficients in that array or an array corresponding to a neighbouring block of samples.

2. A method according to clause 1, in which the entropy-encoding step comprises encoding the coefficients of an array in an order dependent upon a scan pattern selected from a set of one or more candidate scan patterns.

3. A method according to clause 2, in which each group of coefficients in an array comprises a successive set of n coefficients in the order defined by the scan pattern applicable to that array, where n is an integer factor of the number of coefficients in the array.

4. A method according to clause 3, in which n is 16.

5. A method according to any one of the preceding clauses, in which the selecting step allocated coefficients in a group to one of a set of candidate context variables so that, within each group, successive subsets of coefficients, in the scan order, are allocated to respective ones of the candidate context variables.

6. A method according to any one of the preceding clauses, in which the selecting step depends upon whether the nearby coefficients have a zero value.

7. A method according to clause 6, there being two candidate context variables for each group of coefficients.

8. A method according to clause 6 or clause 7, in which:
the coefficients are ordered within an array so that horizontal spatial frequency increases from left to right in the array and vertical spatial frequency increases from top to bottom in an array;
if both the groups to the right and below the current group contain non-zero coefficient data, then one context variable is allocated by the selecting step to the first m coefficients of the current group in the scan order and another context variable to the remaining coefficients of the current group;
if the group to the right of the current group has non-zero data but the group below the current group does not, then one context variable is allocated by the selecting step to an upper half of the current group and another context variable to the remaining coefficients of the current group;
if the group below the current group has non-zero data but the group to the right of the current group does not, then one context variable is allocated by the selecting step to the first p coefficients of the current group in the scan order and another context variable to the remaining coefficients of the current group; and
if the group below the current group has non-zero data but the group to the right of the current group does not, then one context variable is allocated by the selecting step to an left half of the current group and another context variable to the remaining coefficients of the current group;
where m and p are integers, and m does not equal p.

9. A method according to clause 8, in which a current group comprises a sub-array of 8×2 or 2×8 coefficients; and m=13 and p=6.

10. A method according to any one of clauses 6 to 9, in which, if a group of coefficients nearby a current group has not yet been frequency-separated, the selecting step assigns zero values to that group for the purposes of selecting a context variable for a coefficient in the current group.

11. A method according to any one of clauses 6 to 9, in which, if a first group of coefficients nearby a current group has not yet been frequency-separated, but a second group neighbouring a current group has been frequency-separated, then the selecting assigns the values of the second group to the first group for the purposes of selecting a context variable for a coefficient in the current group 12. A method according to any one of the preceding clauses, in which the blocks of samples have a size of at least 8 samples in at least one dimension.

13. A method according to any one of the preceding clauses, in which at least some of the blocks of samples are square.

14. A method according to any one of the preceding clauses, in which at least some of the blocks of samples are non-square.

15. A method of video data coding, comprising:
predicting blocks of luminance and/or chrominance samples of an image from other respective reference samples or values;
detecting differences between the samples in a block and the respective predicted samples;
frequency-separating the detected differences in respect of each block so as to generate a corresponding array of frequency-separated coefficients ordered according to the spatial frequencies represented by the coefficients, one of the coefficients representing a dc value of the block; and
entropy-encoding the frequency-separated coefficients using a context adaptive arithmetic code which encodes coefficients with respect to context variables indicative of the probability of a coefficient having a particular coefficient value;
in which the entropy-encoding step comprises:
partitioning each array into two or more coefficient groups, the groups being non-square sub-arrays; and
generating an allocation of context variables to encode respective coefficients generated in respect of a non-square sub-array according to the spatial frequencies represented by that coefficient, by position-repeating the context variable allocations applicable to a square sub-array, but not position-repeating the allocation of a context variable to the dc coefficient.

16. A method according to clause 15, in which, in respect of the non-square block, the context variable allocated to the dc coefficient is not allocated to any other coefficient.

17. Computer software which, when executed by a computer, causes the computer to carry out a method according to any one of the preceding clauses.

18. A machine-readable non-transitory storage medium which stores software according to clause 17.

19. A data signal comprising coded data generated according to the method of any one of clauses 1 to 16.

20. Video data coding apparatus, comprising:
a predictor configured to predict blocks of luminance and/or chrominance samples of an image from other respective reference samples or values;
a detector configured to detect differences between the samples in a block and the respective predicted samples;
a transform unit configured to frequency-separate the detected differences in respect of each block so as to generate a corresponding array of frequency-separated coefficients ordered according to increasing spatial frequencies represented by the coefficients; and
an entropy encoder configured to entropy-encode the frequency-separated coefficients using a context adaptive arithmetic code which encodes coefficients with respect to context variables indicative of the probability of a coefficient having a particular coefficient value;
in which:
the entropy-encoder is configured to partition each array into two or more coefficient groups, the groups being non-square sub-arrays, and to select a context variable to encode a coefficient according to the spatial frequencies represented by that coefficient and in dependence upon the values of coefficients in one or more nearby groups of coefficients in that array or an array corresponding to a neighbouring block of samples.

21. Video data coding apparatus, comprising:
a predictor configured to predict blocks of luminance and/or chrominance samples of an image from other respective reference samples or values;
a detector configured to detect differences between the samples in a block and the respective predicted samples;
a transform unit configured to frequency-separate the detected differences in respect of each block so as to generate a corresponding array of frequency-separated coefficients ordered according to the spatial frequencies represented by the coefficients, one of the coefficients representing a dc value of the block; and an entropy encoder configured to entropy-encode the frequency-separated coefficients using a context adaptive arithmetic code which encodes coefficients with respect to context variables indicative of the probability of a coefficient having a particular coefficient value;

in which the entropy encoder is configured to partition each array into two or more coefficient groups, the groups being non-square sub-arrays, and to generate an allocation of context variables to encode respective coefficients generated in respect of a non-square sub-array according to the spatial frequencies represented by that coefficient, by position-repeating the context variable allocations applicable to a square sub-array, but not position-repeating the allocation of a context variable to the dc coefficient.

22. Video storage, transmission, capture or display apparatus comprising apparatus according to clause 21 or clause 22.

Further respective embodiments are defined by the following numbered clauses:

1. A video coding or decoding method in which luminance and chrominance samples of an image are predicted from other respective reference samples derived from the same image according to a prediction mode associated with a sample to be predicted, the chrominance samples representing first and second chrominance components;

the method comprising:

selecting, for at least some samples, the same prediction mode for each of the luminance and chrominance components corresponding to an image region.

2. A video coding or decoding method in which luminance and chrominance samples of an image are predicted from other respective reference samples derived from the same image according to a prediction mode associated with a sample to be predicted, the chrominance samples representing first and second chrominance components;

the method comprising:

selecting, for at least some samples, different respective prediction modes for each of the luminance and chrominance components corresponding to an image region.

3. A method according to clause 1 or clause 2, comprising the step of:

selecting either the same prediction mode or different respective prediction modes for each of the luminance and chrominance components corresponding to an image region, the selection being made according to an image sequence, an image, or a region of an image.

4. A method according to clause 3, comprising, for an encoding operation:

carrying out a first trial encoding of an image region using the same prediction mode for the luminance and chrominance components;

carrying out a second trial encoding of that image region using different respective prediction modes for the luminance and chrominance components; and selecting either the same prediction mode or different respective prediction modes for use in respect of a picture sequence, a picture, or a region of a picture on the basis of the data encoded by the first and second trial encodings.

5. A method according to clause 4, comprising the step of:

detecting one or more predetermined properties of the data encoded by the first and second trial encodings; and selecting either the same prediction mode or different respective prediction modes for use in respect of a picture sequence, a picture, or a region of a picture on the basis of the detected one or more properties.

6. A method according to clause 5, in which the one or more properties comprise properties selected from the set consisting of:

image noise;
image distortion; and
image data quantity.

7. A method according to any one of clauses 4 to 6, in which the selection is made for individual image slices or image blocks.

8. A method according to any one of clauses 4 to 7, comprising:

associating information with the encoded video signal indicating:

whether the same prediction modes or different prediction modes are used; and in the case that the same prediction mode is used, an identification of that single prediction mode; or in the case that different respective prediction modes are used, an identification of those different respective prediction modes.

9. A method according to any one of clauses 1 to 3, in which, for a decoding operation, the method comprises:

detecting information associated with video data for decoding, the information defining whether the same prediction mode or different prediction modes are associated with the video data for decoding.

10. A method according to any one of the preceding clauses, in which the image forms part of a 4:2:2 or a 4:4:4 video signal.

11. Computer software which, when executed by a computer, causes the computer to carry out a method according to any one of the preceding clauses.

12. A machine-readable non-transitory storage medium which stores software according to clause 11.

13. A data signal comprising coded data generated according to the method of any one of clauses 1 to 10.

14. A video coding or decoding apparatus in which luminance and chrominance samples of an image are predicted from other respective reference samples derived from the same image according to a prediction mode associated with a sample to be predicted, the chrominance samples representing first and second chrominance components;

the apparatus comprising a controller configured to select, for at least some samples, the same prediction mode for each of the luminance and chrominance components corresponding to an image region.

15. A video coding or decoding apparatus in which luminance and chrominance samples of an image are predicted from other respective reference samples derived from the same image according to a prediction mode associated with a sample to be predicted, the chrominance samples representing first and second chrominance components;

the apparatus comprising a controller configured to select, for at least some samples, different respective prediction modes for each of the luminance and chrominance components corresponding to an image region.

16. Apparatus according to clause 14 or clause 15, in which the controller is configured to select either the same prediction mode or different respective prediction modes for each of the luminance and chrominance components corresponding to an image region, according to an image sequence, an image, or a region of an image.

17. Video storage, transmission, capture or display apparatus comprising apparatus according to any one of clauses 14 to 16.

The invention claimed is:

1. A data decoding apparatus comprising:
    parameter detector circuitry configured to detect from a received bitstream whether intra prediction is enabled in the data and for detecting a prediction mode for a block of samples represented in the bitstream based on detection of whether a chrominance format of the received bitstream is 4:2:2, 4:4:4, or 4:2:0;
    selector circuitry configured to determine a scan pattern from a plurality of scan patterns for scanning frequency coefficients, the scan patterns being associated with the detected prediction mode by a mapping, chrominance and luminance samples being arranged in blocks, and the mapping being different for the chrominance and luminance samples when the chrominance format is 4:2:2 and the blocks of the chrominance samples have a different aspect ratio relative to blocks of the luminance samples; and
    decoder circuitry configured to scan frequency coefficients representing the blocks of chrominance samples and the blocks of luminance samples in an order of the determined scan pattern, which depends on the detected prediction mode, to decode video data from the bitstream, and to output an image signal for generation of a reconstructed output image and/or a predicted image signal.

2. A data decoding apparatus according to claim 1, wherein the parameter detector circuitry is configured to detect parameter information in the bitstream indicating whether intra prediction is enabled and the prediction mode for a block of samples.

3. A data decoding apparatus according to claim 1, where the mapping is stored data in a look up table.

4. A data decoding apparatus according to claim 1, wherein the decoder circuitry is further configured to apply filtering as part of the decoding the video data.

5. A data decoding apparatus according to claim 1, wherein the prediction mode for a block of samples is a prediction direction.

6. A data decoding apparatus according to claim 5, wherein the prediction mode is selected from among 33 prediction directions.

7. A data decoding apparatus according to claim 1, wherein the selector circuitry is configured to determine a horizontal scan pattern in respect for a predominantly vertical prediction mode, to determine a vertical scan pattern in respect of predominantly horizontal prediction modes, and to determine a diagonal scan pattern in respect of other prediction modes.

8. A data decoding apparatus according to claim wherein the bitstream represents 4:2:2 video data, and the mapping is different for 4:2:2 blocks of luminance samples and 4:2:2 blocks of chrominance samples.

9. A data decoding apparatus according to claim 8, wherein the blocks of luminance samples are 8×8 blocks and the blocks of chrominance samples are 4×8 blocks.

10. A data decoding apparatus according to claim 8, wherein the 4:2:2 blocks of luminance samples and 4:2:2 blocks of luminance samples are Transform Units.

11. A data decoding apparatus according to claim wherein the bitstream represents 4:2:2 video data.

12. A data decoding method comprising:
    detecting from a received bitstream whether intra prediction is enabled in the data;
    detecting a prediction mode for a block of samples represented in the bitstream based on detection of whether a chrominance format of the received bitstream is 4:2:2, 4:4:4, or 4:2:0;
    determining a scan pattern from a plurality of scan patterns for scanning frequency coefficients, the scan patterns being associated with the detected prediction mode by a mapping, chrominance and luminance samples being arranged in blocks, and the mapping being different for the chrominance and luminance samples, when the chrominance format is 4:2:2 and the blocks of the chrominance samples have a different aspect ratio relative to blocks of the luminance samples;
    scanning frequency coefficients representing the blocks of chrominance samples and blocks of luminance samples in an order of the determined scan pattern, which depends on the detected prediction mode;
    decoding video data from the bitstream; and
    outputting an image signal for generation of a reconstructed output image and/or a predicted image signal.

13. A data decoding method according to claim 12, further comprising:
    determining a horizontal scan pattern in respect for a predominantly vertical prediction mode;
    determining a vertical scan pattern in respect of predominantly horizontal prediction modes; and
    determining a diagonal scan pattern in respect of other prediction modes.

14. A data decoding method according to claim 12, wherein the bitstream represents 4:2:2 video data, and the mapping is different for 4:2:2 blocks of luminance samples and 4:2:2 blocks of chrominance samples.

15. A data decoding apparatus according to claim 12, wherein the bitstream represents 4:2:2 video data.

16. A non-transitory storage medium comprising computer executable instructions, which when executed by a computer cause the computer to carry out the method according to claim 12.

17. A video storage, reception, capture or display apparatus comprising the data decoding apparatus of claim 1.

18. A video capture apparatus comprising electronic memory and a display configured under the control of a processor to display video data decoded by the apparatus of claim 1.

19. A data decoding apparatus according to claim 1, wherein the mapping of the chrominance and luminance samples is such that a first plurality of luminance prediction directions substantially align with respective chrominance prediction directions, and a second plurality of luminance prediction directions do not substantially align with any chrominance prediction directions.

* * * * *